US010726532B2

(12) United States Patent
Bovik et al.

(10) Patent No.: US 10,726,532 B2
(45) Date of Patent: Jul. 28, 2020

(54) MEASUREMENT OF NON-UNIFORMITY NOISE

(71) Applicant: Board of Regents, The University of Texas System, Austin, TX (US)

(72) Inventors: Alan Bovik, Austin, TX (US); Todd Goodall, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 110 days.

(21) Appl. No.: 15/758,631

(22) PCT Filed: Aug. 31, 2016

(86) PCT No.: PCT/US2016/049652
§ 371 (c)(1),
(2) Date: Mar. 8, 2018

(87) PCT Pub. No.: WO2017/091268
PCT Pub. Date: Jun. 1, 2017

(65) Prior Publication Data
US 2019/0043184 A1 Feb. 7, 2019

Related U.S. Application Data

(60) Provisional application No. 62/232,617, filed on Sep. 25, 2015.

(51) Int. Cl.
*H04N 5/365* (2011.01)
*G06T 7/00* (2017.01)
*G06T 5/00* (2006.01)

(52) U.S. Cl.
CPC ............ *G06T 7/0002* (2013.01); *G06T 5/002* (2013.01); *G06T 2207/10016* (2013.01);
(Continued)

(58) Field of Classification Search
CPC ......... G06T 7/0002; G06T 2207/10016; G06T 2207/10048; G06T 2207/20072; G06T 2207/30168
See application file for complete search history.

(56) References Cited

U.S. PATENT DOCUMENTS 7,294,817 B2 * 11/2007 Voigt .................. H04N 5/33
  250/208.1
7,782,378 B2 * 8/2010 Zhang .................. G06T 5/002
  348/241

(Continued)

OTHER PUBLICATIONS

International Preliminary Report on Patentability for International Application No. PCT/US2016/049652 dated Mar. 27, 2018, pp. 1-4.
(Continued)

*Primary Examiner* — Gregory M Desire
(74) *Attorney, Agent, or Firm* — Robert A. Voigt, Jr.; Winstead PC

(57) ABSTRACT

A method, system and computer program product for measuring non-uniformity noise produced in images or videos (e.g., infrared images or videos). Images or videos, such as infrared images or videos, are captured. A model of scene statistics (statistical model of pictures, images or videos representative of pictures, images or videos, respectively, that are captured of the physical world) is utilized to measure the non-uniformity noise in the captured images or videos by exploiting exhibited characteristics for non-uniformity noise in the captured images or videos. A number signifying a magnitude of non-uniformity for each image or video frame is then generated. In this manner, non-uniformity noise produced in images or videos is measured.

27 Claims, 57 Drawing Sheets

(52) U.S. Cl.
CPC .............. *G06T 2207/10048* (2013.01); *G06T 2207/20072* (2013.01); *G06T 2207/30168* (2013.01)

(56) References Cited

U.S. PATENT DOCUMENTS

| | | | |
|---|---|---|---|
| 7,933,464 B2* | 4/2011 | Zhang | G06T 3/4053 |
| | | | 382/215 |
| 8,736,683 B2* | 5/2014 | Cao | H04N 9/045 |
| | | | 348/187 |
| 9,277,148 B2* | 3/2016 | Bovik | G06K 9/036 |
| 2008/0218610 A1 | 9/2008 | Chapman et al. | |
| 2012/0120255 A1 | 5/2012 | Cao et al. | |
| 2014/0064636 A1 | 3/2014 | Zhang et al. | |
| 2019/0043184 A1* | 2/2019 | Bovik | G06T 7/0002 |
| 2019/0362484 A1* | 11/2019 | Po | G06N 5/046 |
| 2020/0036889 A1* | 1/2020 | Udayakumar | H04N 5/23245 |

OTHER PUBLICATIONS

International Search Report for International Application No. PCT/US2016/049652 dated May 19, 2017, pp. 1-2.
Written Opinion of the International Searching Authority for International Application No. PCT/US2016/049652 dated May 19, 2017, pp. 1-3.
Goodall et al., "Tasking on Natural Statistics of Infrared Images," IEEE Transactions on Image Processing, vol. 25, Issue 1, Jan. 2016, pp. 65-79.
Goodall et al., "Non-uniformity Correction of IR Images using Natural Scene Statistics," Global Signal and Information Processing (GlobalSIP), Dec. 14-16, 2015, pp. 230-234.

* cited by examiner

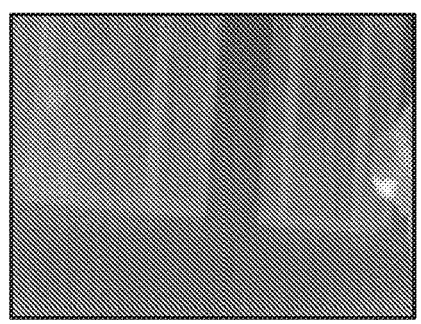
FIG. 2A
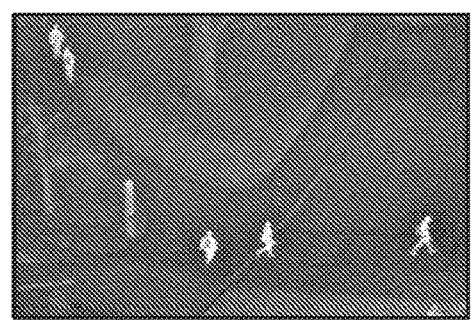
FIG. 2B
FIG. 2C
NIST
KASER
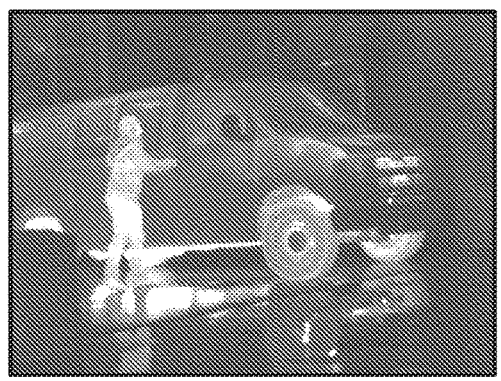
MORRIS
OSU
FIG. 3

TABLE 1
CAMERAS ASSOCIATED WITH THE 4 LWIR DATABASES

| Database | Detector Material | Lens Diameter (mm) | Bit Depth | Resolution | Sensitivity (mK) |
|---|---|---|---|---|---|
| OSU | Ferro-Electric | 75 | 8 | 360x240 | 100 |
| MORRIS | Microbolometer | 50 | 8 | 384x288 | 60 |
| NIST | Microbolometer | 10 | 14 | 640x480 | 55 |
| KASER | unknown | unknown | 8 | 640x480 | unknown |

FIG. 4

|  | Pristine | Distortion Level 1 | Distortion Level 2 | Distortion Level 3 |
|---|---|---|---|---|
| H | FIG. 6A | FIG. 6B | FIG. 6C | FIG. 6D |
| V | FIG. 6E | FIG. 6F | FIG. 6G | FIG. 6H |
| D1 | FIG. 6I | FIG. 6J | FIG. 6K | FIG. 6L |
| D2 | FIG. 6M | FIG. 6N | FIG. 6O | FIG. 6P |

FIG. 6

|     | Pristine | Distortion Level 1 | Distortion Level 2 | Distortion Level 3 |
| --- | --- | --- | --- | --- |
| PD1 | FIG. 7A | FIG. 7B | FIG. 7C | FIG. 7D |
| PD2 | FIG. 7E | FIG. 7F | FIG. 7G | FIG. 7H |
| PD3 | FIG. 7I | FIG. 7J | FIG. 7K | FIG. 7L |
| PD4 | FIG. 7M | FIG. 7N | FIG. 7O | FIG. 7P |
| PD5 | FIG. 7Q | FIG. 7R | FIG. 7S | FIG. 7T |
| PD6 | FIG. 7U | FIG. 7V | FIG. 7W | FIG. 7X |
| PD7 | FIG. 7Y | FIG. 7Z | FIG. 7AA | FIG. 7AB |

FIG. 7

|  | Pristine | Distortion Level 1 | Distortion Level 2 | Distortion Level 3 |
|---|---|---|---|---|
| $d_1^{0°}$ | FIG. 8A | FIG. 8B | FIG. 8C | FIG. 8D |
| $d_1^{30°}$ | FIG. 8E | FIG. 8F | FIG. 8G | FIG. 8H |
| $d_1^{60°}$ | FIG. 8I | FIG. 8J | FIG. 8K | FIG. 8L |
| $d_1^{90°}$ | FIG. 8M | FIG. 8N | FIG. 8O | FIG. 8P |
| $d_1^{120°}$ | FIG. 8Q | FIG. 8R | FIG. 8S | FIG. 8T |
| $d_1^{150°}$ | FIG. 8U | FIG. 8V | FIG. 8W | FIG. 8X |

FIG. 8

TABLE II
FEATURE SUMMARY FOR MSCN ($f$), PAIRWISE PRODUCTS ($pp$), PAIRED LOG-DERIVATIVES ($pd$), AND STEERABLE PYRAMID SUBBANDS ($sp$) FOR THE FIRST SCALE

| Feature ID | Feature Description | Computation Procedure |
|---|---|---|
| $f_1 - f_2$ | Shape and Variance | GGD fit to MSCN coefficients |
| $f_3 - f_4$ | Shape and Variance difference | GGD fit to right and left halves of MSCN coefficients |
| $pp_1 - pp_4$ | Shape, mean, left variance, right variance | AGGD fit to H pairwise products |
| $pp_5 - pp_8$ | Shape, mean, left variance, right variance | AGGD fit to V pairwise products |
| $pp_9 - pp_{12}$ | Shape, mean, left variance, right variance | AGGD fit to D1 pairwise products |
| $pp_{13} - pp_{16}$ | Shape, mean, left variance, right variance | AGGD fit to D2 pairwise products |
| $pd_1 - pd_2$ | Shape and Variance | GGD fit to PD1 pairwise log-derivative |
| $pd_3 - pd_4$ | Shape and Variance | GGD fit to PD2 pairwise log-derivative |
| $pd_5 - pd_6$ | Shape and Variance | GGD fit to PD3 pairwise log-derivative |
| $pd_7 - pd_8$ | Shape and Variance | GGD fit to PD4 pairwise log-derivative |
| $pd_9 - pd_{10}$ | Shape and Variance | GGD fit to PD5 pairwise log-derivative |
| $pd_{11} - pd_{12}$ | Shape and Variance | GGD fit to PD6 pairwise log-derivative |
| $pd_{13} - pd_{14}$ | Shape and Variance | GGD fit to PD6 pairwise log-derivative |
| $sp_1 - sp_2$ | Shape and Variance | GGD fit to $d_1^{0°}$ subband |
| $sp_3 - sp_4$ | Shape and Variance | GGD fit to $d_1^{30°}$ subband |
| $sp_5 - sp_6$ | Shape and Variance | GGD fit to $d_1^{60°}$ subband |
| $sp_7 - sp_8$ | Shape and Variance | GGD fit to $d_1^{90°}$ subband |
| $sp_9 - sp_{10}$ | Shape and Variance | GGD fit to $d_1^{120°}$ subband |
| $sp_{11} - sp_{12}$ | Shape and Variance | GGD fit to $d_1^{150°}$ subband |

FIG. 9

TABLE III
PREDICTING FOREGROUND AWN WITH BACKGROUND DISTORTION. SRCC AND LCC MEASURED OVER 1000 ITERATIONS USING 80/20 TRAIN/TEST SPLITS. "NONE" INDICATES NO BACKGROUND DISTORTION, $NU_H$ INDICATES PRESENCE OF HORIZONTAL STRIPING NU BACKGROUND DISTORTIONS, $NU_V$ INDICATES PRESENCE OF VERTICAL STRIPING NU BACKGROUND DISTORTIONS, AND $NU_{HV}$ INDICATES PRESENCE OF GRID-LIKE NU BACKGROUND DISTORTIONS. $L_1$ AND $L_2$ REFERS TO $L_1$ AND $L_2$ NORMS RESPECTIVELY. THE IQIs WERE USED IN PLACE OF SNR BECAUSE SNR ALONE PERFORMED EXTREMELY POORLY.

| NR Method | SRCC | | | | LCC | | | |
|---|---|---|---|---|---|---|---|---|
| | None | $NU_H$ | $NU_V$ | $NU_{HV}$ | None | $NU_H$ | $NU_V$ | $NU_{HV}$ |
| $f+pp+pd+sp$ | 0.974 | 0.966 | 0.964 | 0.966 | 0.977 | 0.969 | 0.967 | 0.969 |
| $f+pp+pd$ | 0.975 | 0.964 | 0.966 | 0.965 | 0.977 | 0.967 | 0.969 | 0.969 |
| $f+pp$ | 0.972 | 0.960 | 0.960 | 0.961 | 0.975 | 0.963 | 0.963 | 0.965 |
| $f+pd$ | 0.969 | 0.955 | 0.957 | 0.960 | 0.972 | 0.959 | 0.960 | 0.963 |
| $f$ | 0.963 | 0.950 | 0.952 | 0.954 | 0.966 | 0.953 | 0.957 | 0.958 |
| $pp$ | 0.967 | 0.962 | 0.961 | 0.961 | 0.971 | 0.965 | 0.965 | 0.965 |
| $pd$ | 0.955 | 0.948 | 0.953 | 0.948 | 0.959 | 0.953 | 0.956 | 0.952 |
| $sp$ | 0.957 | 0.964 | 0.955 | 0.957 | 0.957 | 0.960 | 0.952 | 0.956 |
| $Ro, L_1$ | 0.697 | 0.504 | 0.499 | 0.509 | 0.747 | 0.571 | 0.569 | 0.578 |
| $Ro, L_2$ | 0.714 | 0.567 | 0.556 | 0.593 | 0.718 | 0.583 | 0.565 | 0.600 |
| $ERo, L_1$ | 0.651 | 0.709 | 0.703 | 0.663 | 0.693 | 0.761 | 0.756 | 0.702 |
| $ERo, L_2$ | 0.795 | 0.695 | 0.619 | 0.736 | 0.786 | 0.693 | 0.609 | 0.710 |
| IQIs | 0.601 | 0.653 | 0.615 | 0.629 | 0.589 | 0.637 | 0.603 | 0.612 |

FIG. 13

TABLE IV
PREDICTING FOREGROUND NU WITH BACKGROUND DISTORTION. SRCC AND LCC MEASURED OVER 1000 ITERATIONS USING 80/20 TRAIN/TEST SPLITS. $NU_H$ REFERS TO HORIZONTAL STRIPING NU FOREGROUND DISTORTIONS, $NU_V$ REFERS TO VERTICAL STRIPING NU FOREGROUND DISTORTIONS, AND $NU_{HV}$ REFERS TO GRID-LIKE NU FOREGROUND DISTORTIONS. "NONE" REFERS TO ABSENCE OF BACKGROUND DISTORTION, AND "AWN" REFERS TO PRESENCE OF AWN BACKGROUND DISTORTION. $L_1$ AND $L_2$ REFERS TO $L_1$ AND $L_2$ NORMS RESPECTIVELY. THE IQIs WERE USED IN PLACE OF SNR BECAUSE SNR PERFORMED EXTREMELY POORLY.

| NR Method | SRCC | | | | | | LCC | | | | | |
|---|---|---|---|---|---|---|---|---|---|---|---|---|
| | $NU_H$ | | $NU_V$ | | $NU_{HV}$ | | $NU_H$ | | $NU_V$ | | $NU_{HV}$ | |
| | None | AWN | None | AWN | None | AWN | None | AWN | None | AWN | None | AWN |
| $f + pp + pd + sp$ | 0.975 | 0.973 | 0.970 | 0.969 | 0.977 | 0.969 | 0.976 | 0.973 | 0.972 | 0.971 | 0.978 | 0.969 |
| $f + pp + pd$ | 0.975 | 0.973 | 0.969 | 0.969 | 0.977 | 0.969 | 0.976 | 0.972 | 0.971 | 0.969 | 0.978 | 0.970 |
| $f + pp$ | 0.971 | 0.973 | 0.964 | 0.967 | 0.977 | 0.973 | 0.972 | 0.972 | 0.966 | 0.966 | 0.978 | 0.975 |
| $f + pd$ | 0.967 | 0.938 | 0.961 | 0.940 | 0.971 | 0.923 | 0.968 | 0.939 | 0.964 | 0.944 | 0.973 | 0.919 |
| $f$ | 0.940 | 0.897 | 0.949 | 0.895 | 0.951 | 0.866 | 0.942 | 0.888 | 0.951 | 0.891 | 0.952 | 0.851 |
| $pp$ | 0.970 | 0.972 | 0.966 | 0.969 | 0.976 | 0.975 | 0.971 | 0.972 | 0.968 | 0.968 | 0.977 | 0.976 |
| $pd$ | 0.961 | 0.930 | 0.957 | 0.939 | 0.965 | 0.916 | 0.962 | 0.932 | 0.959 | 0.942 | 0.966 | 0.916 |
| $sp$ | 0.961 | 0.964 | 0.967 | 0.965 | 0.973 | 0.963 | 0.962 | 0.963 | 0.966 | 0.966 | 0.973 | 0.962 |
| $Ro, L_1$ | 0.548 | 0.157 | 0.552 | 0.151 | 0.556 | 0.136 | 0.626 | 0.239 | 0.621 | 0.236 | 0.625 | 0.229 |
| $Ro, L_2$ | 0.572 | 0.213 | 0.609 | 0.244 | 0.548 | 0.183 | 0.533 | 0.237 | 0.575 | 0.274 | 0.502 | 0.212 |
| $ERo, L_1$ | 0.424 | 0.400 | 0.404 | 0.393 | 0.464 | 0.268 | 0.417 | 0.414 | 0.404 | 0.413 | 0.468 | 0.328 |
| $ERo, L_2$ | 0.565 | 0.191 | 0.642 | 0.336 | 0.646 | 0.222 | 0.565 | 0.283 | 0.678 | 0.401 | 0.647 | 0.308 |
| IQIs | 0.005 | 0.140 | 0.004 | 0.108 | 0.025 | 0.061 | 0.004 | 0.127 | 0.006 | 0.086 | 0.024 | 0.041 |

FIG. 14

TABLE V
AREAS UNDER THE ROC CURVES IN FIG. 17

| NR Feature Set | Area Under ROC Curve |
| --- | --- |
| $f + pp + pd + sp$ | 0.795 |
| $f + pp + pd$ | 0.711 |
| $f + pp$ | 0.723 |
| $f + pd$ | 0.675 |
| $f$ | 0.651 |
| $pp$ | 0.699 |
| $pd$ | 0.639 |
| $sp$ | 0.795 |
| IQIs | 0.735 |

FIG. 18

TABLE VI
MEDIAN SRCC AND LCC BETWEEN ACTUAL AND PREDICTED TTP FROM 1000 ITERATIONS

| NR Feature Set | SRCC | LCC |
| --- | --- | --- |
| $f + pp + pd + sp$ | 0.665 | 0.671 |
| $f + pp + pd$ | 0.640 | 0.646 |
| $f + pp$ | 0.582 | 0.601 |
| $f + pd$ | 0.609 | 0.613 |
| $f$ | 0.504 | 0.527 |
| $pp$ | 0.562 | 0.582 |
| $pd$ | 0.566 | 0.568 |
| $sp$ | 0.340 | 0.367 |
| IQIs | 0.621 | 0.630 |

FIG. 19

Please provide a rating of quality of the image and then press any key

Bad    Poor    Fair    Good    Excellent

TABLE VII
MEDIAN SRCC AND LCC BETWEEN DMOS AND PREDICTED DMOS
MEASURED OVER 1000 ITERATIONS

| NR Feature Set | Median SRCC | Median LCC |
|---|---|---|
| $f + pp + pd + sp$ | 0.815 | 0.820 |
| $f + pp + pd$ | 0.794 | 0.809 |
| $f + pp$ | 0.809 | 0.817 |
| $f + pd$ | 0.727 | 0.742 |
| $f$ | 0.714 | 0.736 |
| $pp$ | 0.794 | 0.809 |
| $pd$ | 0.696 | 0.732 |
| $sp$ | 0.825 | 0.828 |
| IQIs | 0.726 | 0.705 |
| Ro, $L_1$ | 0.135 | 0.189 |
| Ro, $L_2$ | 0.162 | 0.221 |
| ERo, $L_1$ | 0.570 | 0.576 |
| ERo, $L_2$ | 0.616 | 0.667 |

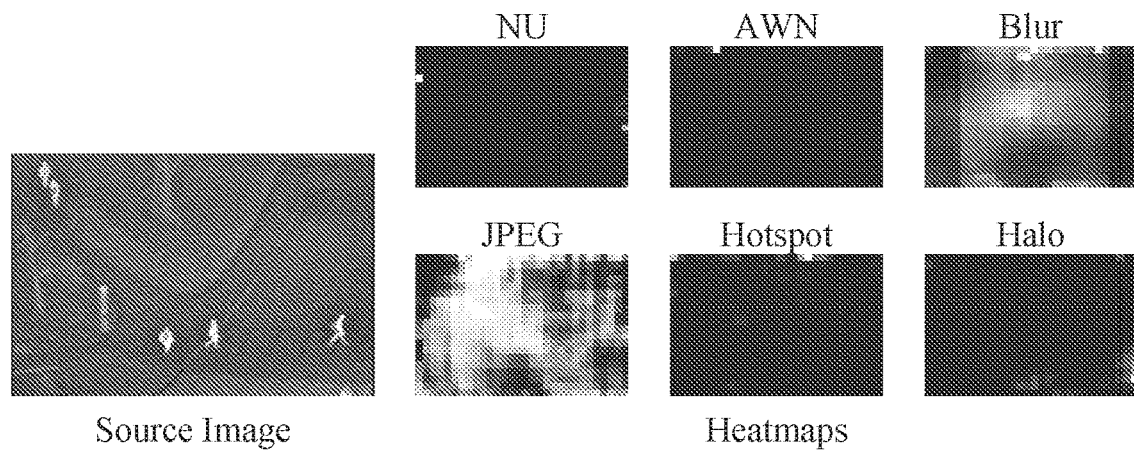
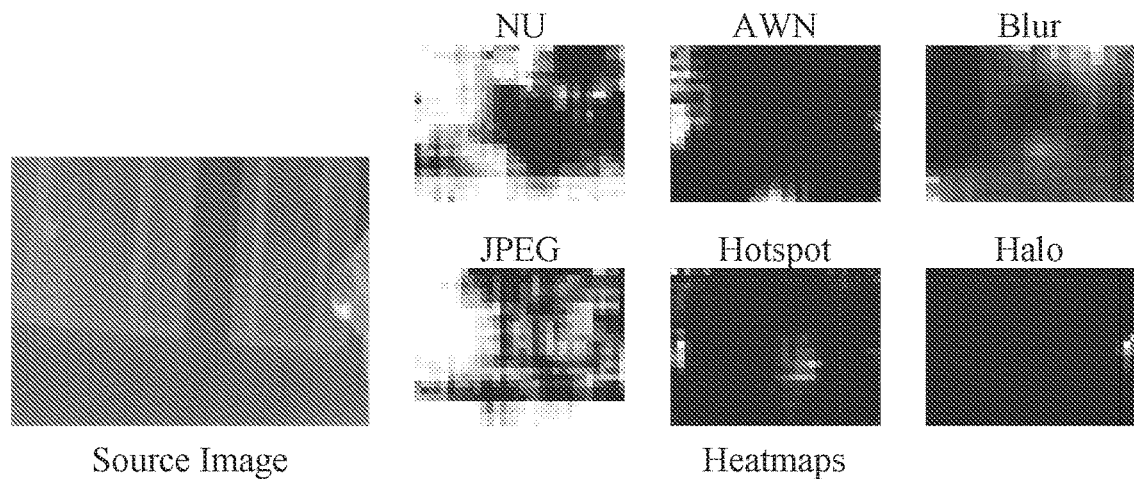
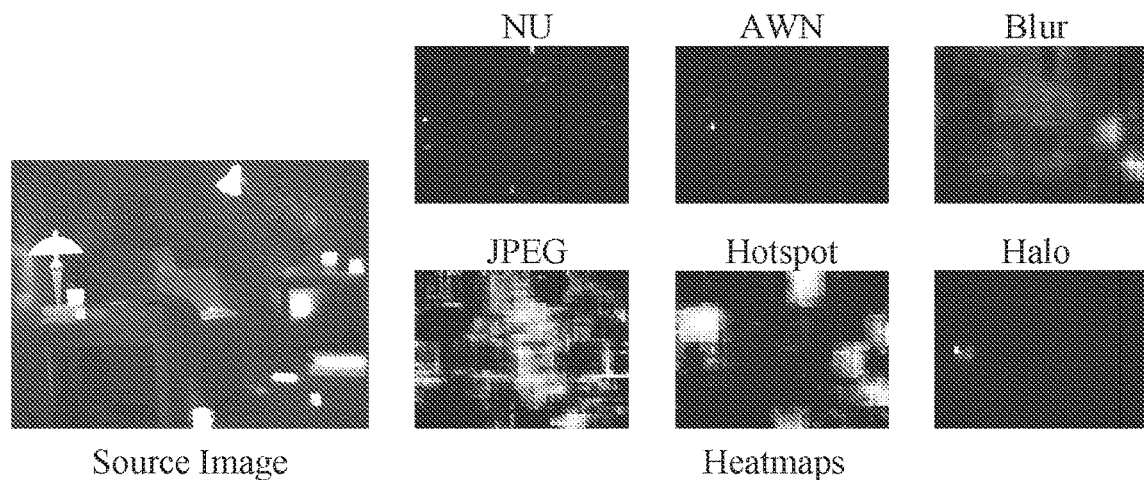
FIG. 25

MEASUREMENT OF NON-UNIFORMITY NOISE

CROSS REFERENCE TO RELATED APPLICATIONS

This application claims priority to U.S. Provisional Patent Application Ser. No. 62/232,617, entitled "Measurement of Additive Non-Uniformity Noise Produced in Infrared Images or Videos," filed Sep. 25, 2015, which is incorporated by reference herein in its entirety.

GOVERNMENT INTERESTS

This invention was made with government support under Grant No. 70NANB12H283 awarded by the National Institute of Standards and Technology. The U.S. government has certain rights in the invention.

TECHNICAL FIELD

The present invention relates generally to natural scene statistics, and more particularly to measuring non-uniformity noise produced in infrared images or videos.

BACKGROUND

Long Wavelength Infrared (LWIR) images have many uses in industry, military, medicine, and science. For example, nondestructive testing uses thermal imagers for detecting defect locations in manufactured materials, thereby allowing for better quality control. Unmanned Airborne Vehicles (UAV) and security cameras often couple a thermal imager with a visible light (VL) camera to enhance night vision for scouting and to improve automatic threat detection over large distances. Firefighters carry handheld imagers while scouting for critical burn points in burning buildings and possible thermal hazards. Thermographers use high-resolution thermal imagers for detecting inflammation, irregular blood-flow, and tumors.

Natural Scene Statistic (NSS) models describe statistical regularities that are observed on images taken of the natural world. Examples of NSS of visible light images include the 1/f behavior of the amplitude spectrum, the sparse coding characteristic of visual cortical filters in response to natural image stimuli, and the Gaussianity exhibited by visual signals following band-pass filter and adaptive gain control operations. Early cortical processing in higher mammalian visual systems appears to have adapted to these natural statistics, and much research into biological visual functioning has been guided by the "efficient coding" hypothesis, which assumes that visual neurons have adapted to efficiently encode natural visual stimuli.

Given their widespread use and application, LWIR images have been well studied. Sources of spatial noise and the effect of noise on minimum resolvable temperature differences (MTD) have been characterized as a function of frequency. Spatial noise has been further characterized in infrared (IR) images by using Principle Components Analysis (PCA) to separate spatial and temporal noise from a sequence of frames. Nonuniformity (NU) noise common in LWIR images expressed in the frequency domain has been modeled as distinct from independent spatial noise.

Although natural scene statistics have proven to be highly successful tools in applications on visible light images, the development and use of similar models has not been nearly as widespread on LWIR images. However, the statistics of visible-light and LWIR are predictably different. To measure NU, noise, blur, and changes in brightness, four Image Quality Indicators (IQIs) have been developed. To measure NU in LWIR images, a Roughness Index has been introduced to compute using discrete spatial derivatives. An improved index, the Effective Roughness Index, measures this roughness index using a high-pass image.

However, currently existing technologies, such as the signal-to-noise ratio, roughness index and the effective roughness index, do not provide an accurate and precise measurement of non-uniformity noise in an infrared image or video.

SUMMARY

In one embodiment of the present invention, a method for measuring non-uniformity noise produced in infrared images or videos comprises capturing infrared images or videos. The method further comprises utilizing, by a processor, a model of scene statistics to measure the non-uniformity noise in the captured infrared images or videos by exploiting exhibited characteristics for non-uniformity noise in the captured infrared images or videos. The method additionally comprises generating a number signifying a magnitude of non-uniformity for each infrared image or video frame.

Other forms of the embodiment of the method described above are in a system and in a computer program product.

In another embodiment of the present invention, a method for measuring non-uniformity noise produced in images or videos comprises capturing images or videos. The method further comprises utilizing, by a processor, a model of scene statistics to measure the non-uniformity noise in the captured images or videos by exploiting exhibited characteristics for non-uniformity noise in the captured images or videos. The method additionally comprises generating a number signifying a magnitude of non-uniformity for each image or video frame.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIG. 2A is an image exemplifying Non-Uniformity (NU) noise in accordance with an embodiment of the present invention;

FIG. 2B is an image exemplifying the "Halo Effect" in accordance with an embodiment of the present invention;

FIG. 2C is an image exemplifying hot-spot areas in accordance with an embodiment of the present invention;

FIG. 3 illustrates example images from four separate IR image databases in accordance with an embodiment of the present invention;

FIG. 4 is a table, Table 1, listing the uncooled thermal cameras associated with each IR image database in accordance with an embodiment of the present invention;

FIG. 9 is a table, Table II, which provides an overview of the MSCN (f), paired product (pp), paired log-derivative (pd), and steerable pyramid subband (sp) features in accordance with an embodiment of the present invention;

FIG. 13 is a table, Table III, that shows the correlation between the actual and predicted white noise variance in images with and without background NU distortion in accordance with an embodiment of the present invention;

FIG. 14 is a table, Table IV, that shows the correlation between actual and predicted NU magnitude in images with and without presence of background Additive White Noise (AWN) distortion in accordance with an embodiment of the present invention;

FIG. 18 is a table, Table V, which provides the areas under the ROC curves in accordance with an embodiment of the present invention;

FIG. 19 is a table, Table VI, which reports the median SRCC and LCC coefficients between actual and predicted Targeting Task Performance (TTP) from 1,000 iterations in accordance with an embodiment of the present invention;

FIG. 25 illustrates example distortion maps in accordance with an embodiment of the present invention.

DETAILED DESCRIPTION

While the following discusses the present invention in connection with measuring non-uniformity noise in infrared images or videos, the principles of the present invention may measure non-uniformity noise in other types of images or videos, such as but not limited to, X-ray images or videos, magnetic resonance imaging images or videos, millimeter wave images or videos and visible light images or videos. A person of ordinary skill in the art would be capable of applying the principles of the present invention to such implementations. Further, embodiments applying the principles of the present invention to such implementations would fall within the scope of the present invention.

Figure 1:
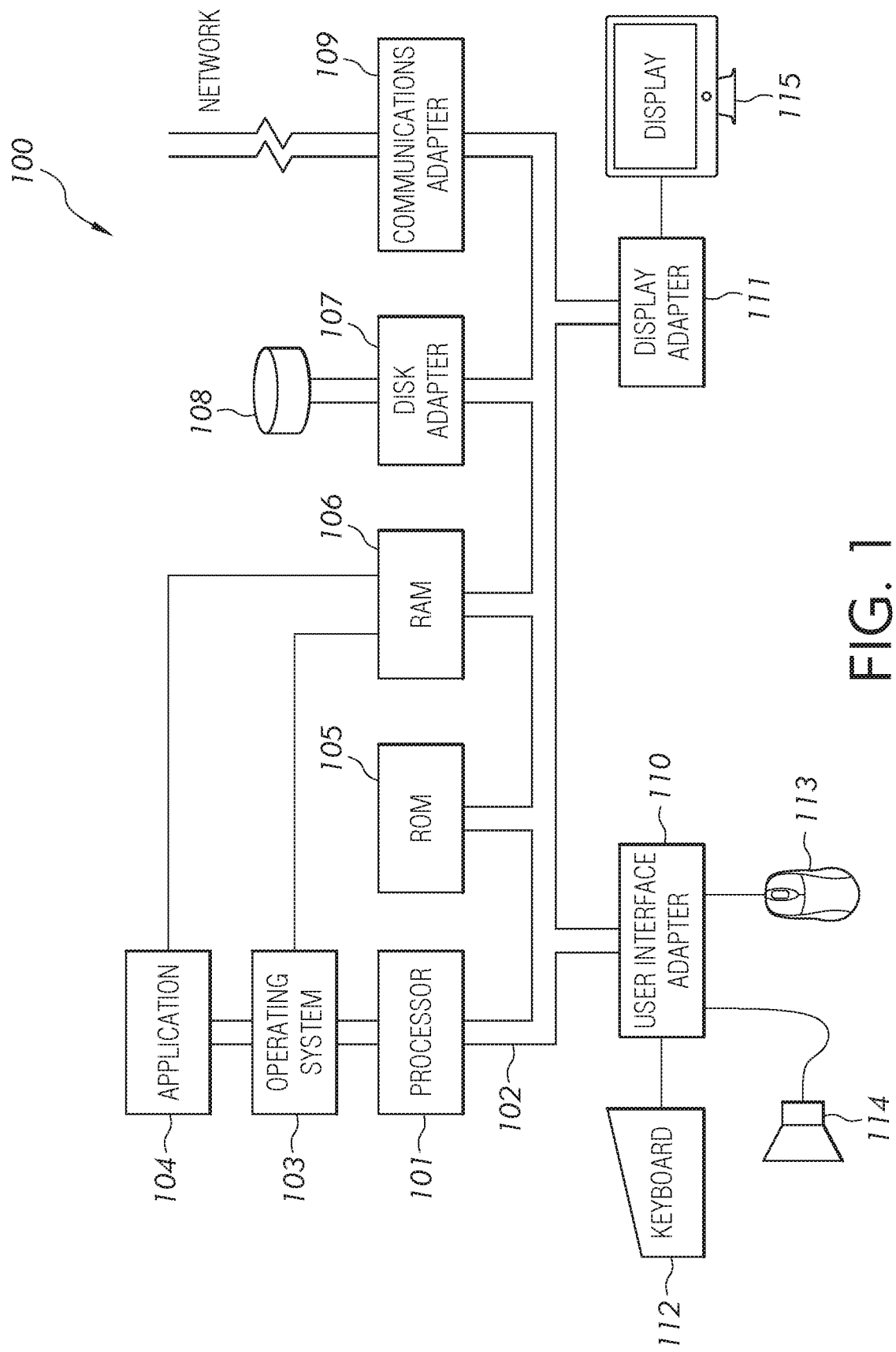
FIG. 1 illustrates an embodiment of the present invention of the hardware configuration of a computing device which is representative of a hardware environment for practicing the present invention.
Figure 5A:
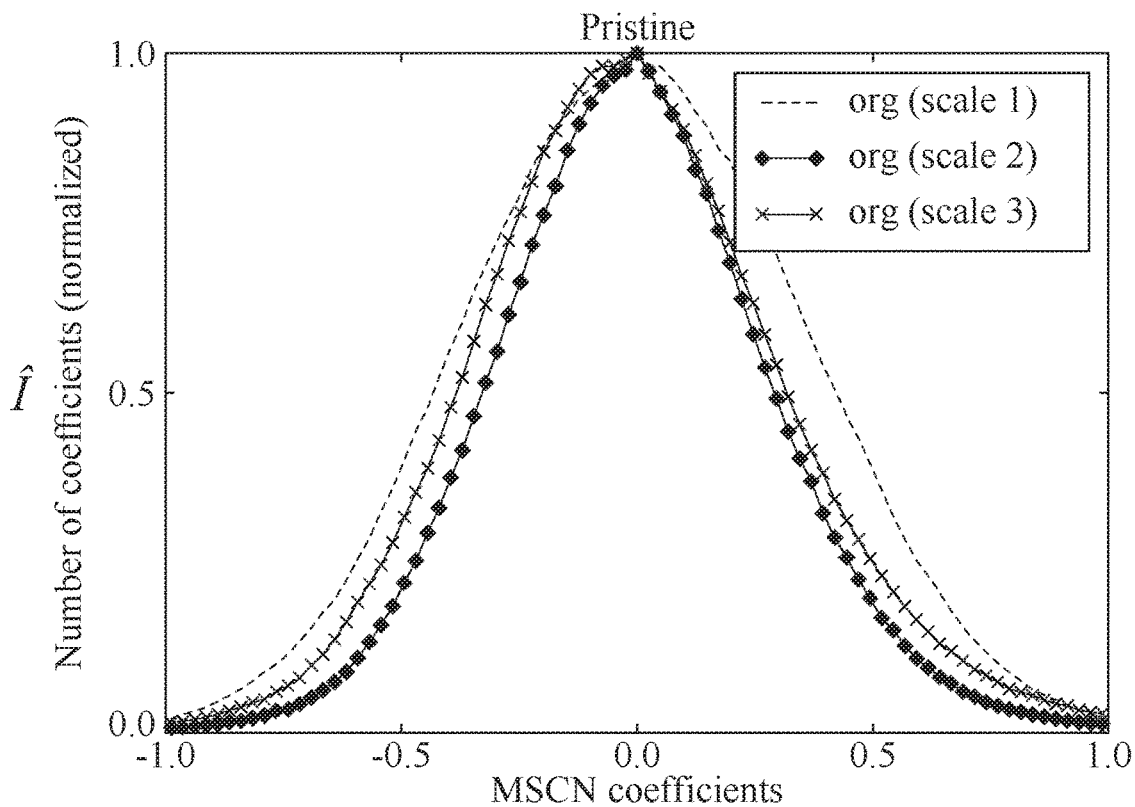
FIGS. 5A-5D illustrate the Mean-Subtracted Contrast Normalized (MSCN) histograms of natural LWIR images which appear similar (Gaussian) to those of visible light images in accordance with an embodiment of the present invention.
Figure 5B:
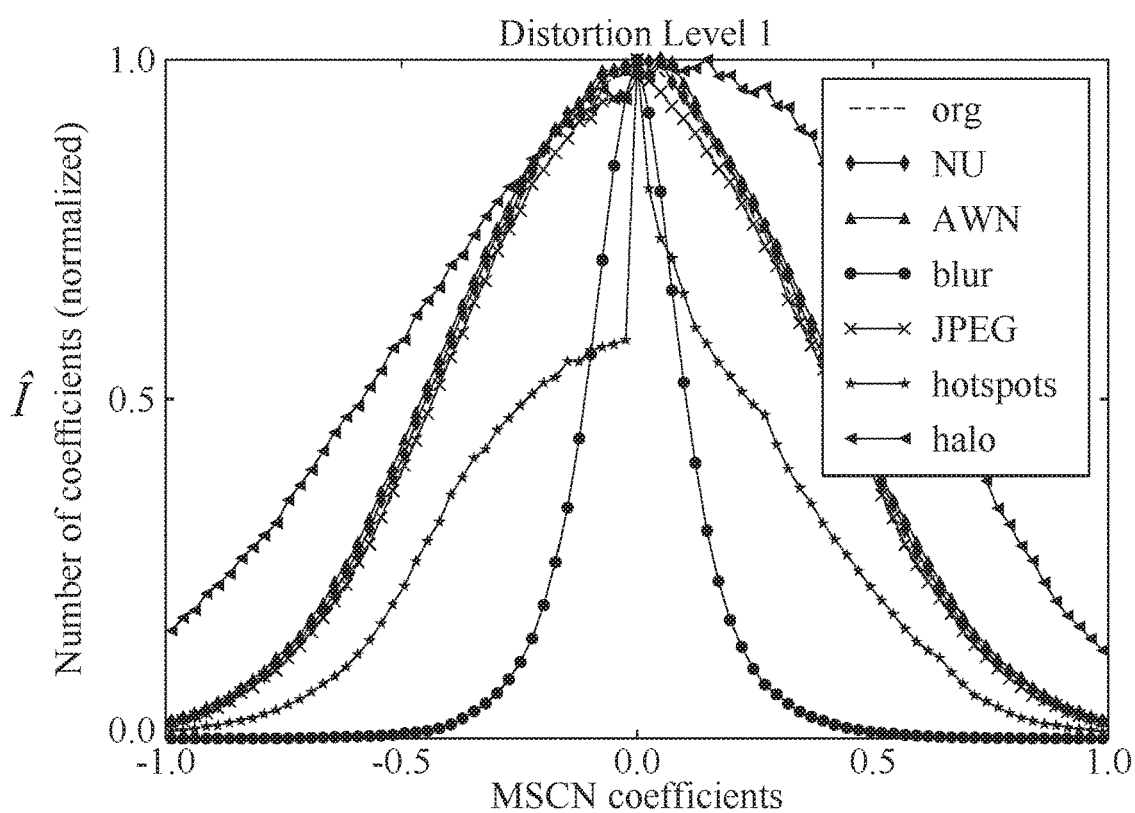
Figure 5C:
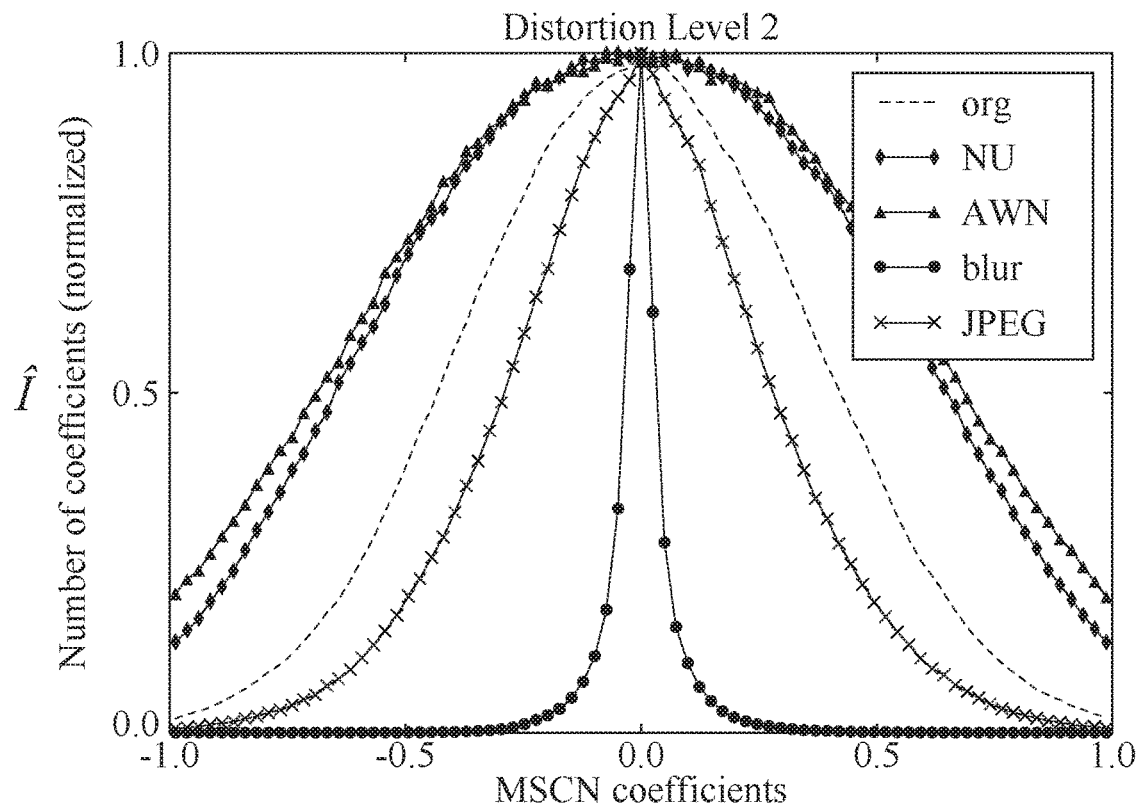
Figure 5D:
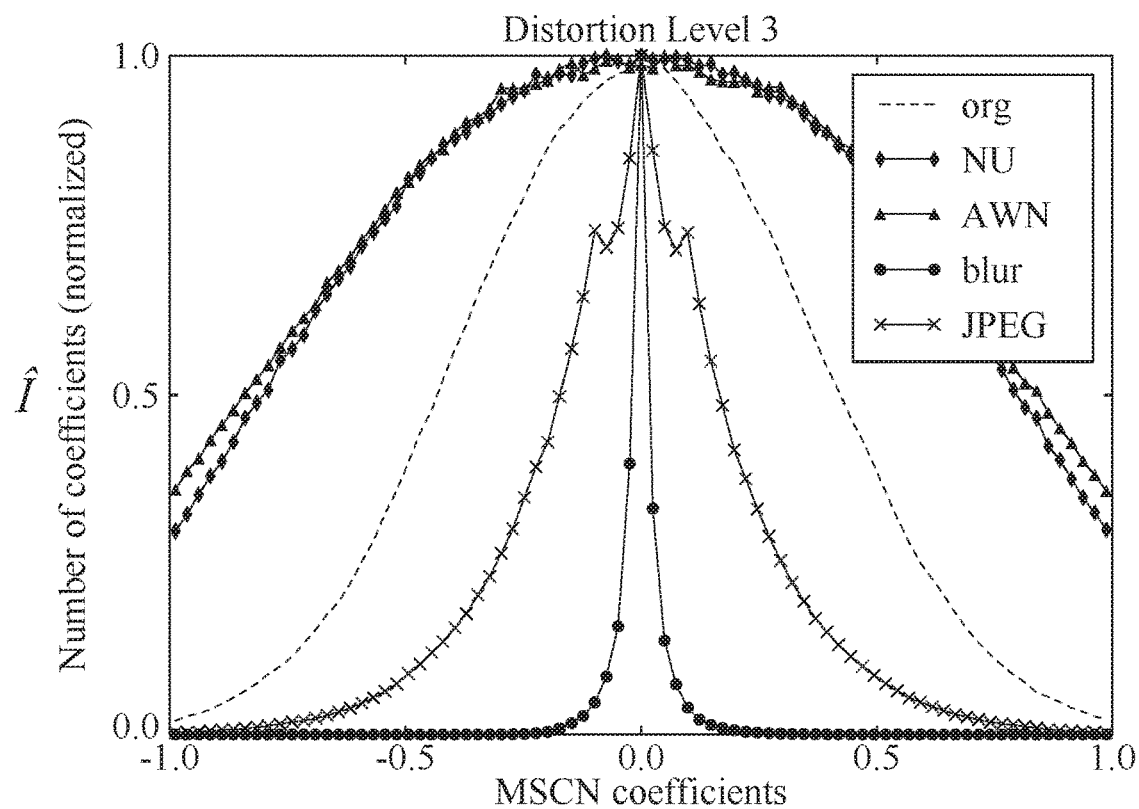

Referring now to the Figures in detail, FIG. 1 illustrates an embodiment of the present invention of the hardware configuration of computing device 100 which is representative of a hardware environment for practicing the present invention. Computing device 100 may be any type of computing device (e.g., portable computing unit, Personal Digital Assistant (PDA), smartphone, laptop computer, mobile phone, navigation device, game console, desktop computer system, workstation, Internet appliance and the like) configured with the capability of measuring non-uniformity noise produced in images or videos. Referring to FIG. 1, computing device 100 may have a processor 101 coupled to various other components by system bus 102. An operating system 103 may run on processor 101 and provide control and coordinate the functions of the various components of FIG. 1. An application 104 in accordance with the principles of the present invention may run in conjunction with operating system 103 and provide calls to operating system 103 where the calls implement the various functions or services to be performed by application 104. Application 104 may include, for example, an application for measuring non-uniformity noise produced in images or videos as discussed further below.

Referring again to FIG. 1, read-only memory ("ROM") 105 may be coupled to system bus 102 and include a basic input/output system ("BIOS") that controls certain basic functions of computing device 100. Random access memory ("RAM") 106 and disk adapter 107 may also be coupled to system bus 102. It should be noted that software components including operating system 103 and application 104 may be loaded into RAM 106, which may be computing device's 100 main memory for execution. Disk adapter 107 may be an integrated drive electronics ("IDE") adapter that communicates with a disk unit 108, e.g., disk drive. It is noted that the program for measuring non-uniformity noise produced in images or videos may reside in disk unit 108 or in application 104.

Computing device 100 may further include a communications adapter 109 coupled to bus 102. Communications adapter 109 may interconnect bus 102 with an outside network thereby allowing computing device 100 to communicate with other devices.

I/O devices may also be connected to computing device 100 via a user interface adapter 110 and a display adapter 111. Keyboard 112, mouse 113 and speaker 114 may all be interconnected to bus 102 through user interface adapter 110. A display monitor 115 may be connected to system bus 102 by display adapter 111. In this manner, a user is capable of inputting to computing device 100 through keyboard 112 or mouse 113 and receiving output from computing device 100 via display 115 or speaker 114. Other input mechanisms may be used to input data to computing device 100 that are not shown in FIG. 1, such as display 115 having touch-screen capability and keyboard 112 being a virtual keyboard. Computing device 100 of FIG. 1 is not to be limited in scope to the elements depicted in FIG. 1 and may include fewer or additional elements than depicted in FIG. 1.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A discussion regarding the characteristics of LWIR imagers and images is now deemed appropriate.

Thermal imagers have a spectral sensitivity in the 7 μm to 14 μm wavelength band. Thermal imagers are sensitive to the radiation emitted by objects in the scene and the background radiation reflected by those objects. The relationship between the irradiation collected at the sensor and the temperatures of imaged materials is nontrivial. For example, the material and surface properties of an object alter its emissivity. Similarly, the reflective properties of an object will vary the amount of background radiation reflected by the object and subsequently collected by the imager. All this variability can lead to errors in the measurement of an object's temperature. Although both cooled and uncooled thermal imagers exist, uncooled imagers are the most widely adopted and are the ones considered herein. Also known as Focal Plane Array (FPA) imagers, they are designed to use either an array of resistors (called a microbolometer) or an array of ferro-electric ceramic transistors. The microbolometer works by measuring changes in resistance corresponding to changes in temperature. The ferro-electric technology operates by measuring a temperature differential across a pyro-electric material, which is refreshed by a constantly spinning wheel, called the "chopper." As a result of the "chopper," the images obtained by these detectors exhibit additional or more severe artifacts, such as the "Halo Effect," which is lowering their adoption in the market. Unlike cooled detectors, the typical design of uncooled imagers does not allow adjustment of their sensor integration time, thus they usually capture images at a lower frame rate than cooled imagers. Overall, the main advantage of uncooled imagers over their cooled counterparts is their lower power consumption, cheaper components, and size.

Non-uniformity (NU) noise, as exemplified in the image in FIG. 2A in accordance with an embodiment of the present invention, is a distortion specific to LWIR images. NU is an additive fixed-pattern noise, which appears as a grid-like or striping pattern. These patterns result from manufacturing defects, dark current, and segmented sensor capture areas.

The "Halo Effect," depicted in FIG. 2B in accordance with an embodiment of the present invention, is another distortion, which occurs mostly in thermal cameras equipped with ferro-electric sensors. This effect causes the region surrounding a bright object to grow darker and it causes the region around dark objects to grow lighter. This effect can be caused by both the physical operation of cameras containing ferro-electric sensors and by the back-reflection of IR illumination sources. The "chopper" that modulates the signal for ferro-electric detectors fails to entirely shield incoming infrared light, which leads to overcompensation when subtracting the differential response from the average signal, thereby producing a halo. Reflective materials situated next to highly emissive materials within the scene have also been shown to produce a similar effect.

LWIR images commonly contain hot-spot areas exhibiting only small variations in image intensity that arise from highly emissive objects that stand out from the background as shown in FIG. 2C in accordance with an embodiment of the present invention. In general, LWIR images contain many smooth surfaces as a result of temperature diffusion. Hot-spots are less a distortion than a symptom of the environment, but they still produce interesting statistical regularities worthy of study.

Other unique degradations of LWIR images not covered herein include radiometric distortions, geometric distortions, noise from reflective materials, and the history effect. Radiometric distortion refers to non-linear mapping of thermal energy to pixel values in an image, which may destroy relevant sensitivity information. Geometric distortions occur when the sensors in the FPA are misaligned, causing blur. As previously discussed, materials imaged with an infrared camera are often assumed to be only emissive, but they can also be reflective causing false inferences. Lastly, heat in the LWIR band can fluctuate faster than the frame rate, which can be difficult to detect given the physical limits of infrared sensors. Geometric distortions are specific to individual imagers, radiometric distortions appear during the capture process, reflective noise measurements require knowledge of the captured objects, and the history effect is a time-varying distortion.

The same distortions that occur in visible light images can of course also occur in LWIR images. For example, blur may arise from camera destabilization, especially in handheld devices, non-optimal lens focus moving the depth of field away from the object of interest, or object motion. Sensor noise may be induced by light sensitivity based on the integration times of the sensors. Over and under-exposure can occur as a function of exposure time, or from quantization or local saturation. JPEG distortion, such as blocking artifacts and blurring, can also be present since most thermal cameras utilize the JPEG compression format.

The study of the NSS of LWIR images has benefited from the availability of four separate IR image databases which are denoted as NIST, KASER, MORRIS, and OSU. Example images from each database are provided in FIG. 3 in accordance with an embodiment of the present invention. The NIST database includes 180 images from indoor office and home environments each containing multiple hot objects and some containing fire hazards. The KASER database includes 37 images from outdoor environments taken using unknown camera models and suffering various distortions including non-uniformity, blur, and noise. The MORRIS database contains both indoor and outdoor images of urban environments including cars, pedestrians, and buildings. Finally, the OSU database contains images captured by a surveillance camera monitoring pathway intersections on the Ohio State University campus. Gathering a diverse set of images from a diversity of cameras allows for better generalization of the NSS of LWIR images.

The uncooled thermal cameras associated with each database are listed in Table I of FIG. 4 in accordance with an embodiment of the present invention. Images from the microbolometer sensor types appear smoother and cleaner than the images from the ferro-electric sensor type used in OSU. Images obtained from this camera required processing by an additional nonlinearity (using a log transform) in order that the NSS followed the same regularities observed in the images obtained from the other cameras. This non-linearity may be a result of the values being captured at the ferro-electric sensors being proportional to a non-linear function of luminance, like power.

All images were linearly mapped from their bit depth to the range 0 to 1 for comparability and ease of applying artificial distortions consistently. This does not change the image statistics beyond normalizing them to this range.

In a pioneering deep study of the statistics of visible light images, it has been observed that applying a local bandpass filter combined with a non-linear operation to a natural image has a decorrelating and gaussianizing effect. Highly successful Image Quality Assessment (IQA) models have used this property to measure distortions in images. Given an input luminance image, I, define its Mean-Subtracted Contrast Normalized (MSCN) coefficients $$\hat{I}(i, j) = \frac{I(i, j) - \mu(i, j)}{\sigma(i, j) + C}$$

over spatial indices with $i \in 1, 2 \ldots M$, $j \in 1, 2 \ldots N$, where M and N are the image height and width, respectively, C is a constant which prevents instabilities when the denominator tends toward zero. The factors $\mu$ and $\sigma$ are weighted estimates of the local luminance mean and standard deviation given by $$\mu(i, j) = \sum_{k=-K}^{K} \sum_{l=-L}^{L} w_{k,l} I_{k,l}(i, j)$$

and $$\sigma(i, j) = \sqrt{\sum_{k=-K}^{K} \sum_{l=-L}^{L} w_{k,l} (I_{k,l}(i, j) - \mu(i, j))^2}$$

where $w = \{w_{k,l} | k = -K, \ldots, K, l = -L, \ldots, L\}$ is a two-dimensional (2D) circularly-symmetric weighting function sampled out to three (3) standard deviations and normalized to unit volume.

The MSCN histograms of natural LWIR images appear similar (Gaussian) to those of visible light images, as shown in FIGS. 5A-5D in accordance with an embodiment of the present invention. To compute these histograms, coefficients were pooled by selecting center patches from images taken from the NIST and MORRIS databases.

The histograms of the pooled MSCN coefficients selected from center patches of LWIR images afflicted by three levels (severities) of common distortions (NU, AWN, blur, and JPEG) are compared in FIGS. 5A-5D. Only one distortion level for hotspot and halo types is available.

In the Blind/Referenceless Image Spatial QUality Evaluator (BRISQUE) model, the MSCN histograms are supplemented by empirical paired product distributions which are computed by multiplying neighboring MSCN coefficients. Four directional coefficient products are computed at each coordinate $$H(i,j) = \hat{I}(i,j)\hat{I}(i,j+1)$$

$$V(i,j) = \hat{I}(i,j)\hat{I}(i+1,j)$$

$$D1(i,j) = \hat{I}(i,j)\hat{I}(i+1,j+1)$$

$$D2(i,j) = \hat{I}(i,j)\hat{I}(i+1,j-1)$$

Figure 6A:
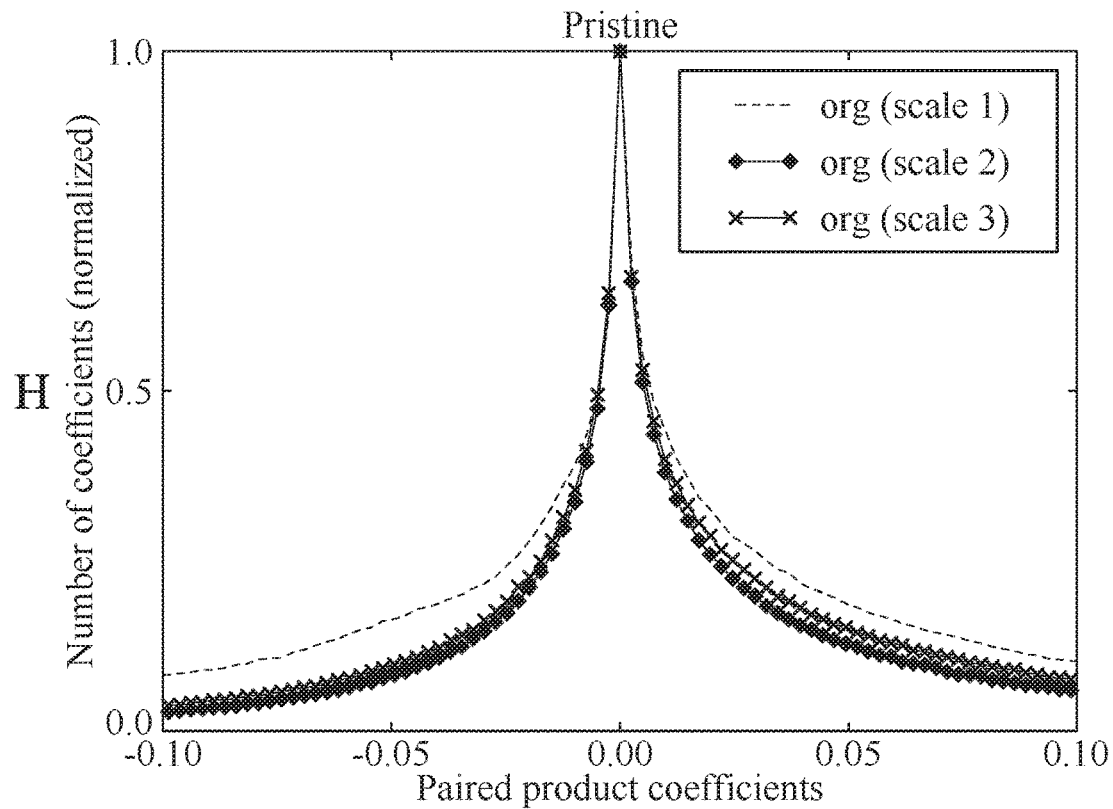
FIGS. 6A-6P illustrate the paired product histograms of center patches extracted from both NIST and MORRIS LWIR image databases in accordance with an embodiment of the present invention.
Figure 6B:
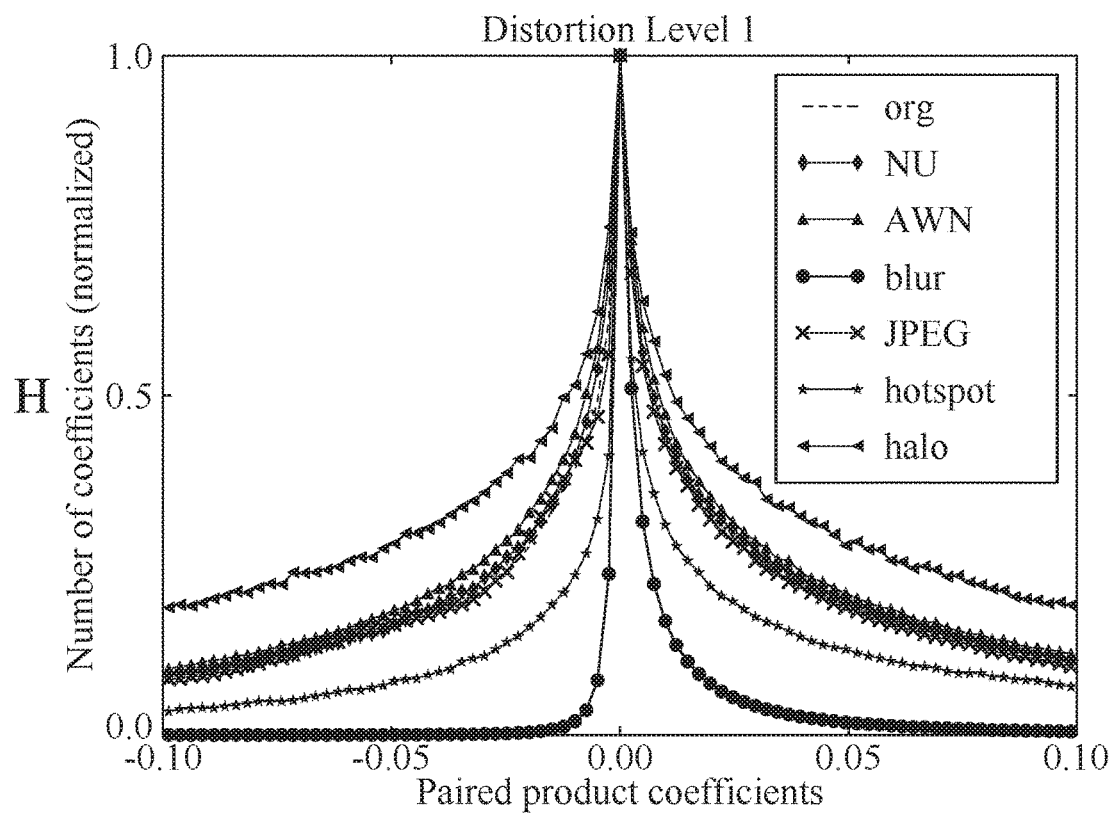
Figure 6C:
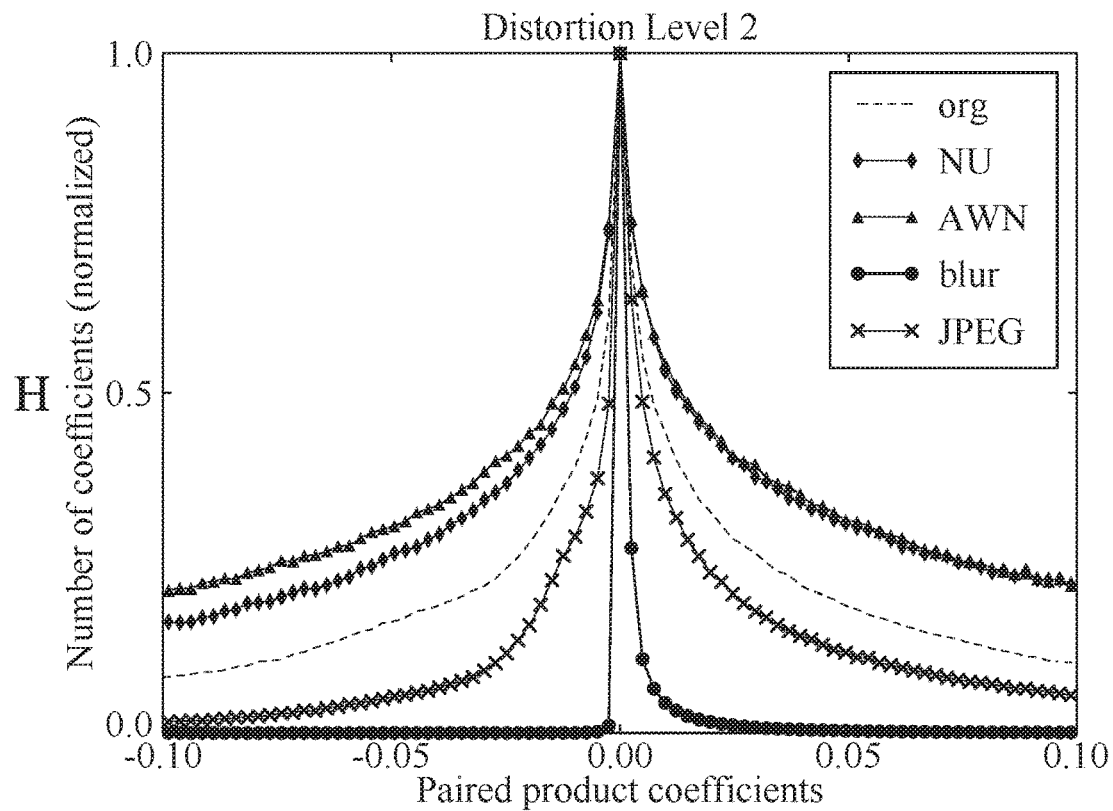
Figure 6D:
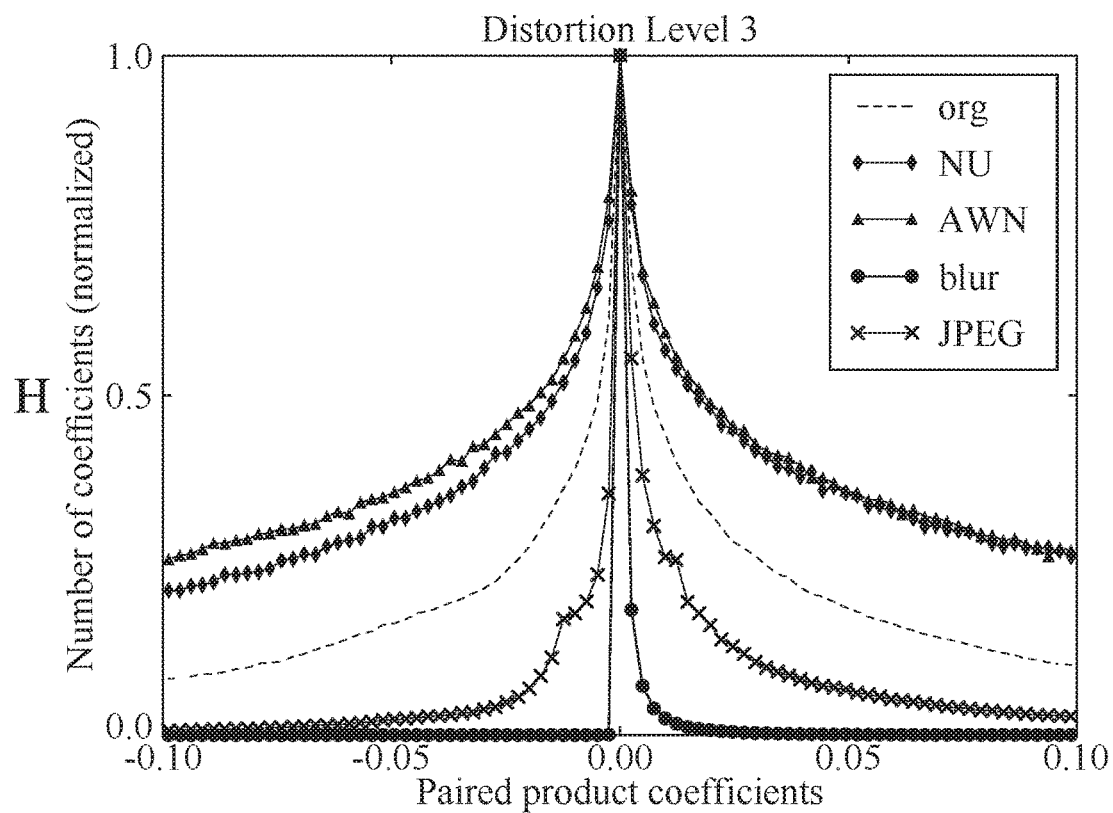
Figure 6E:
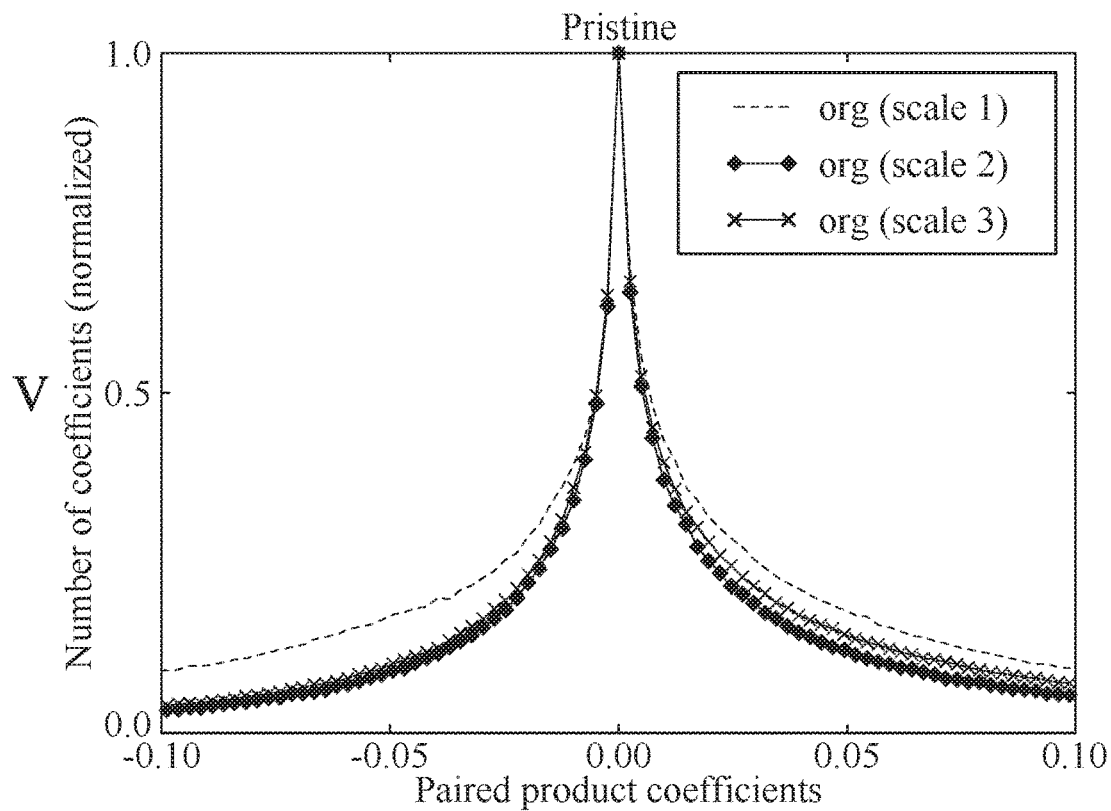
Figure 6F:
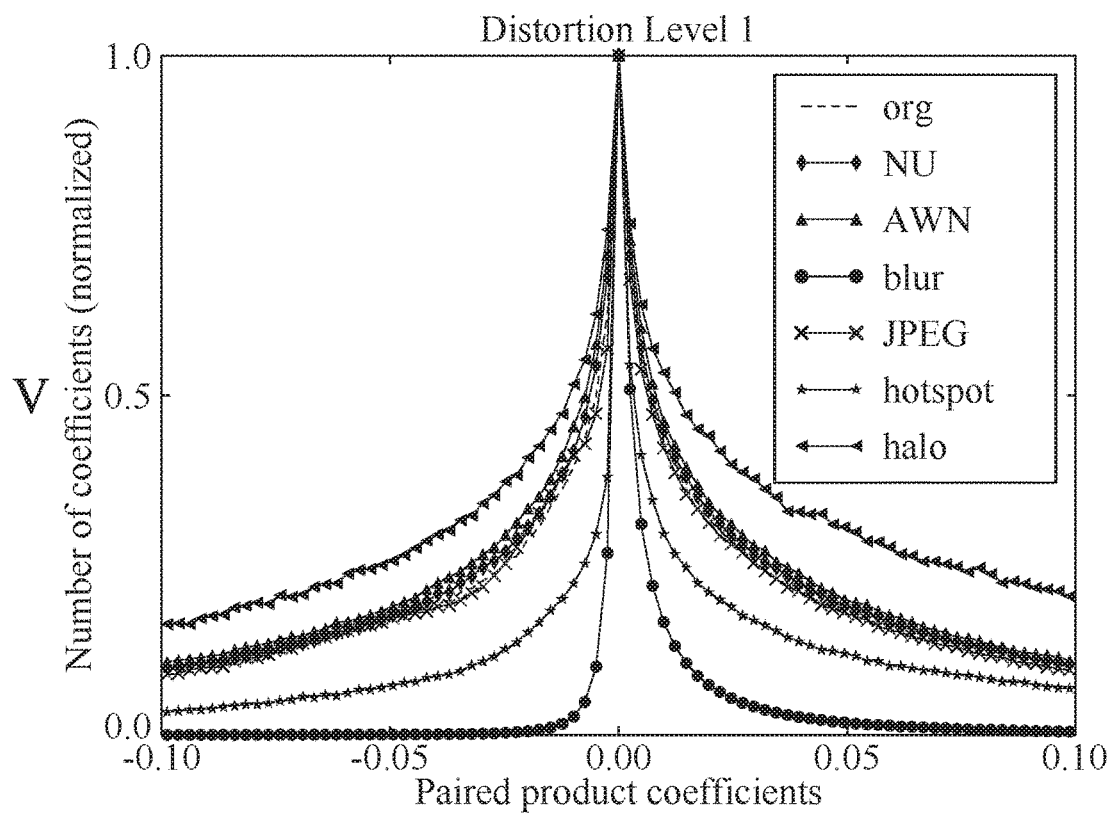
Figure 6G:
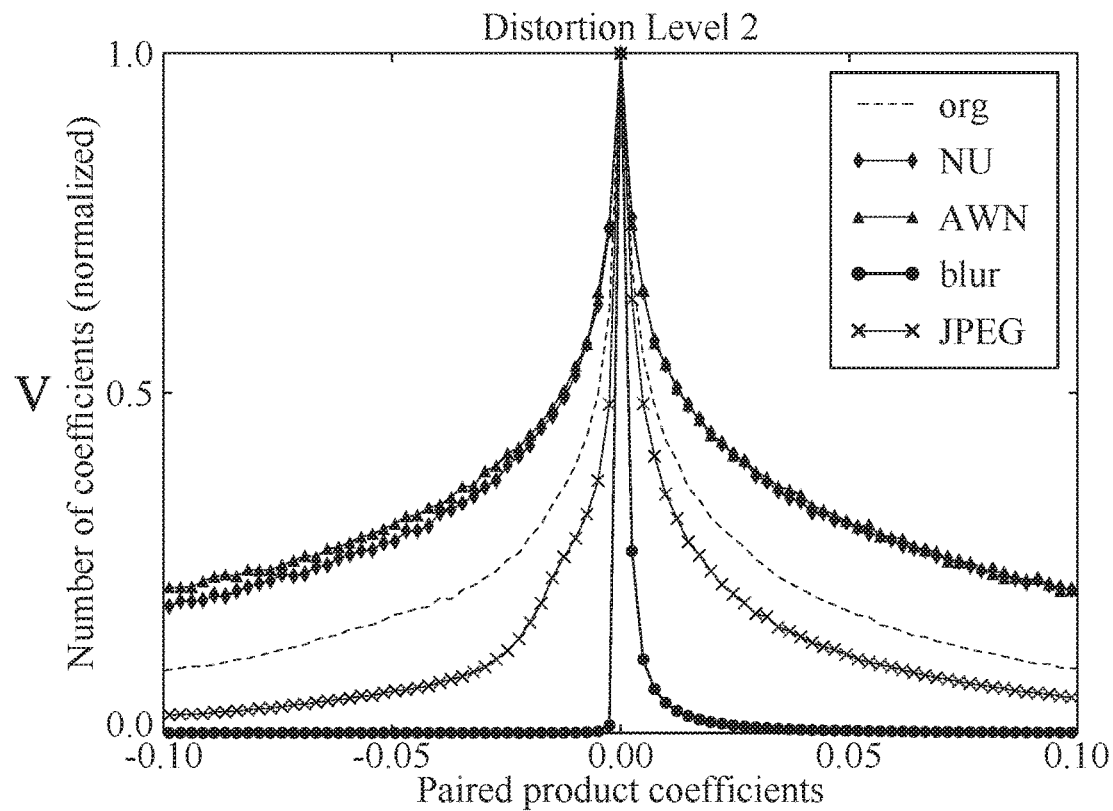
Figure 6H:
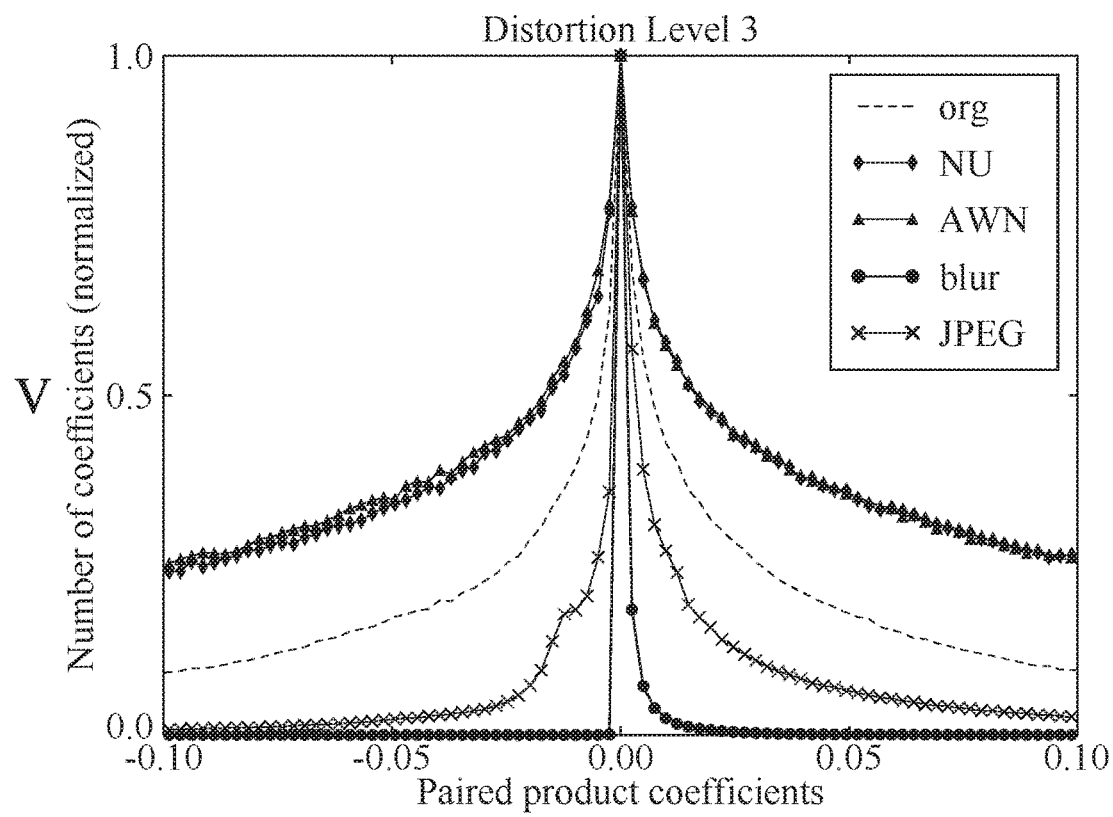
Figure 6I:
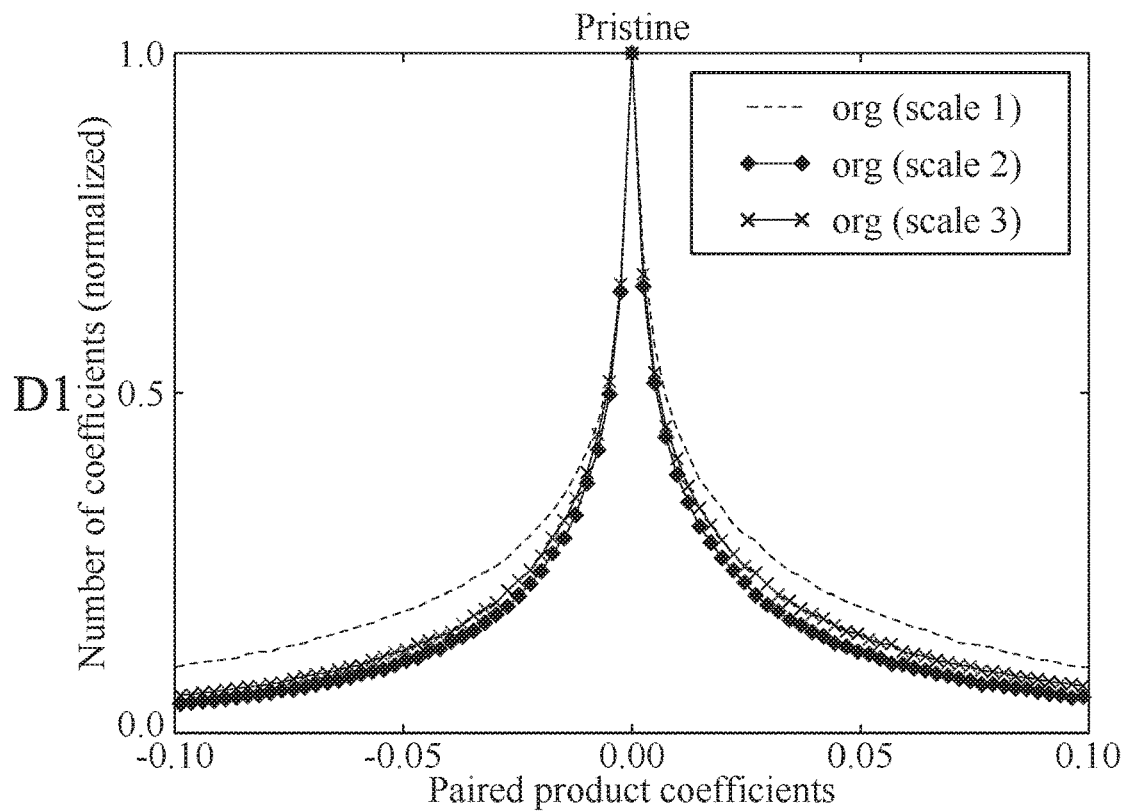
Figure 6J:
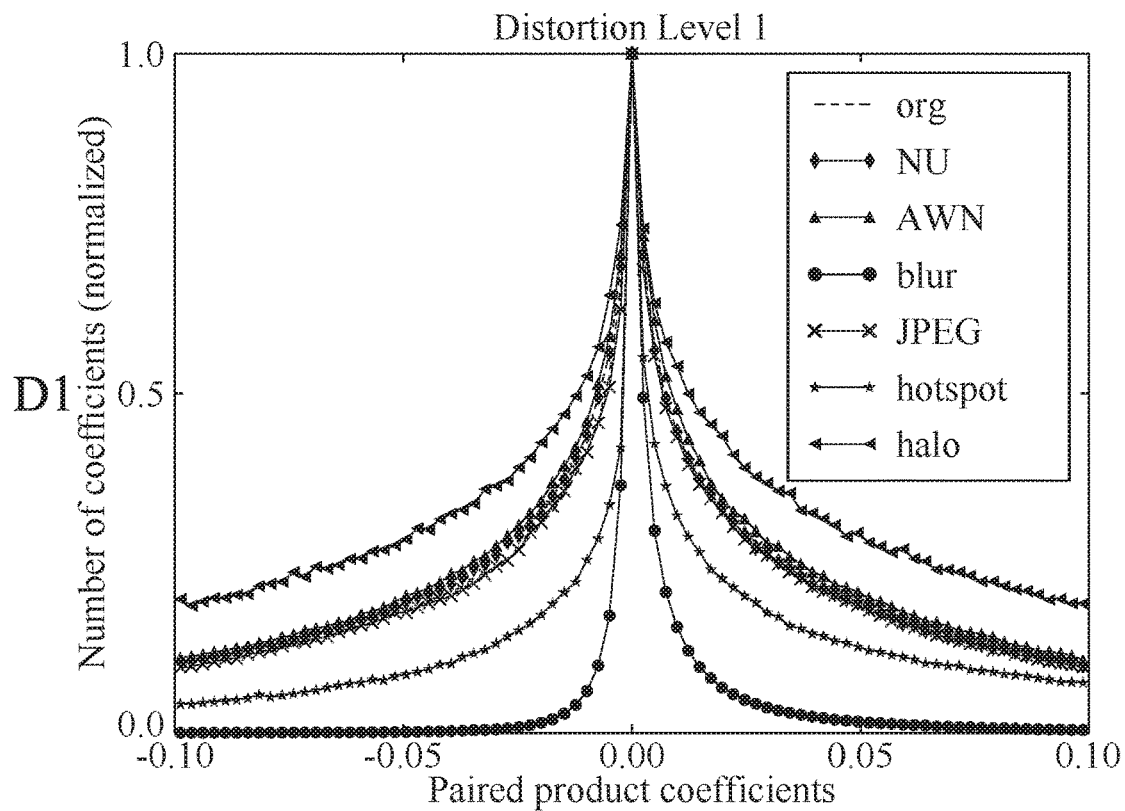
Figure 6K:
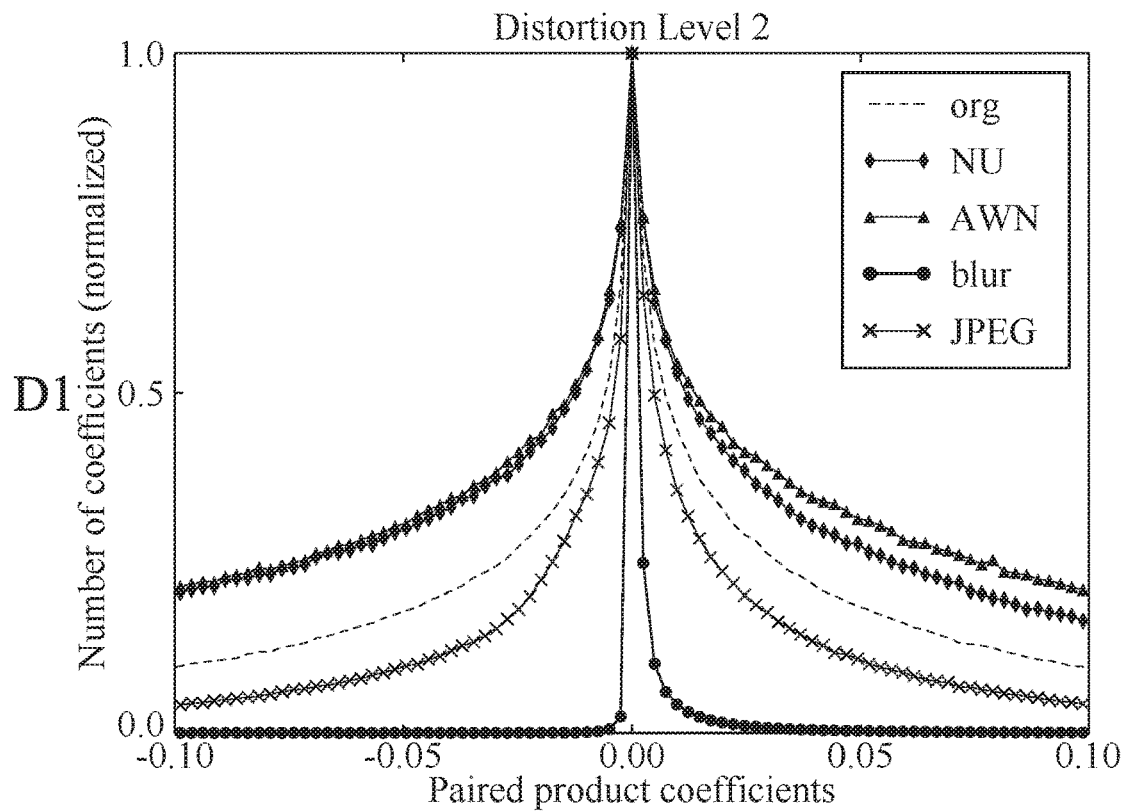
Figure 6L:
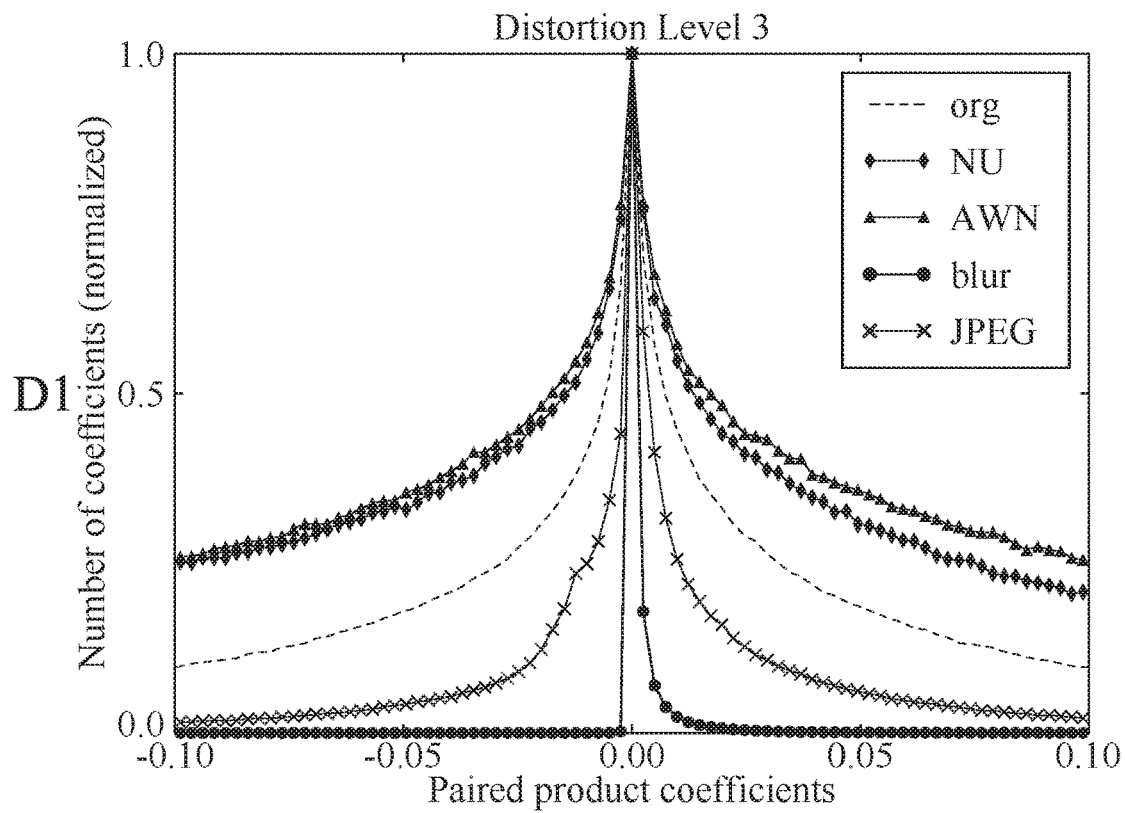
Figure 6M:
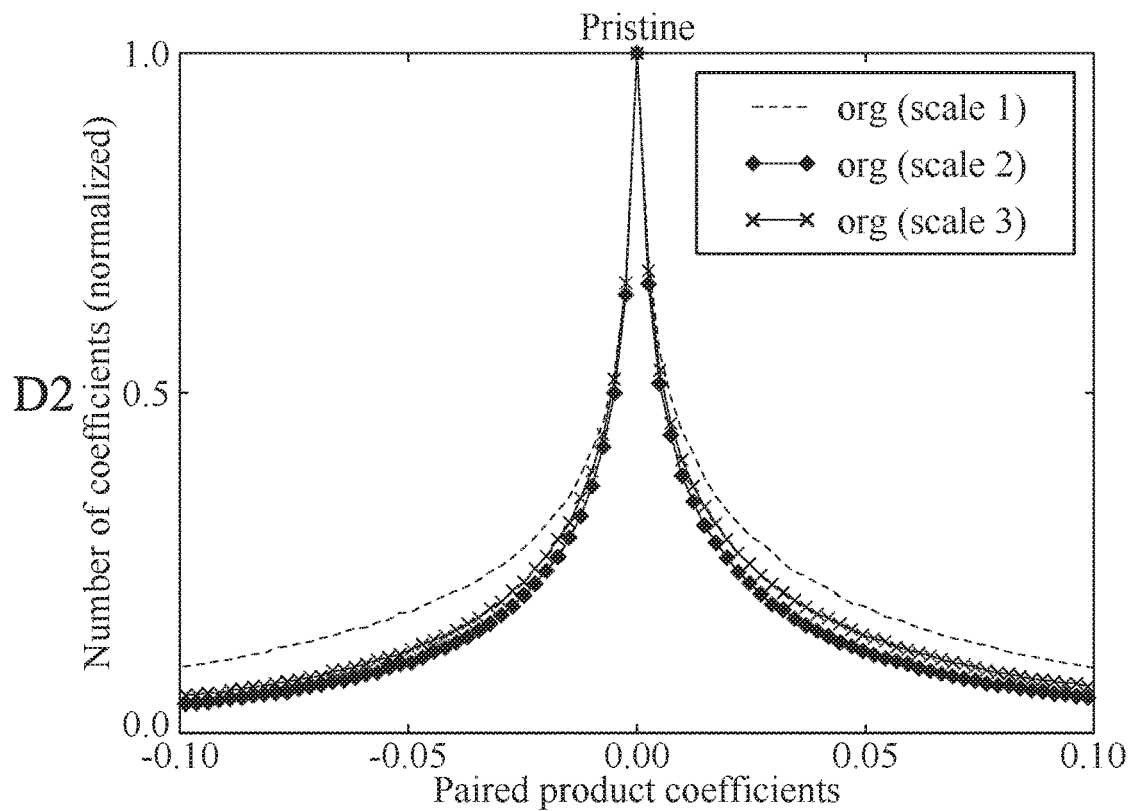
Figure 6N:
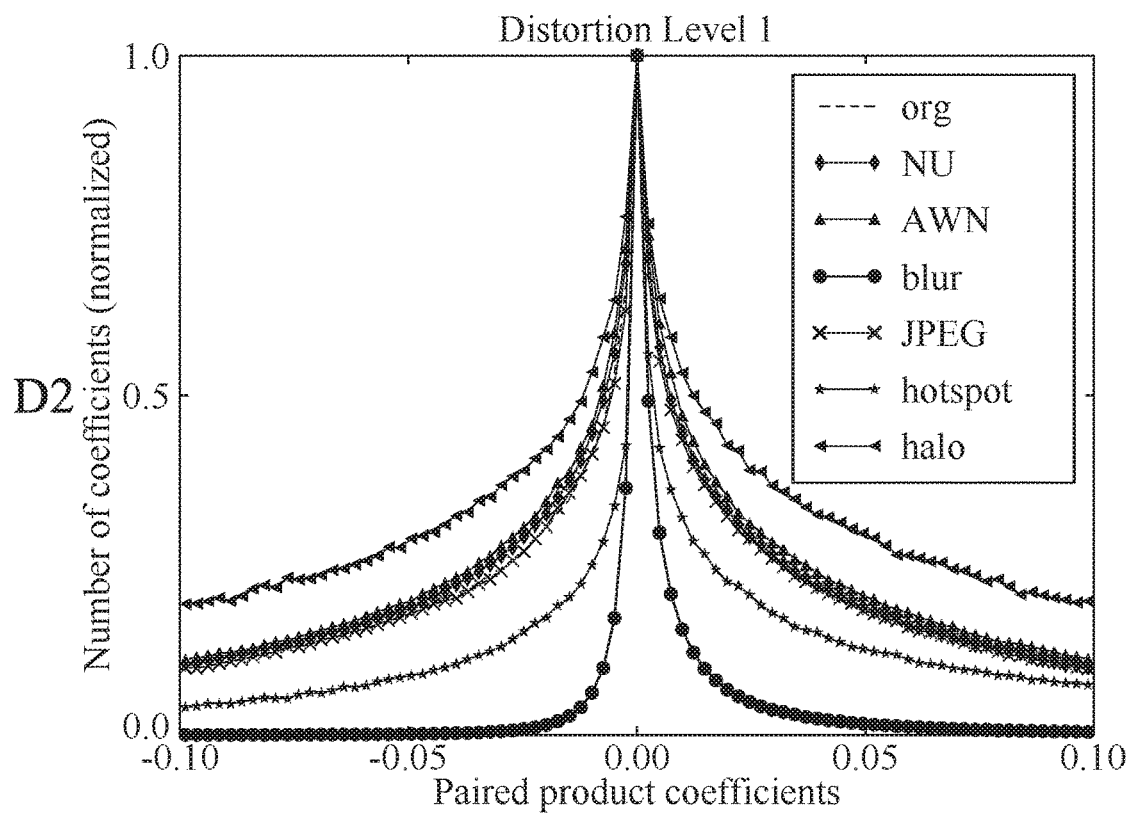
Figure 6O:
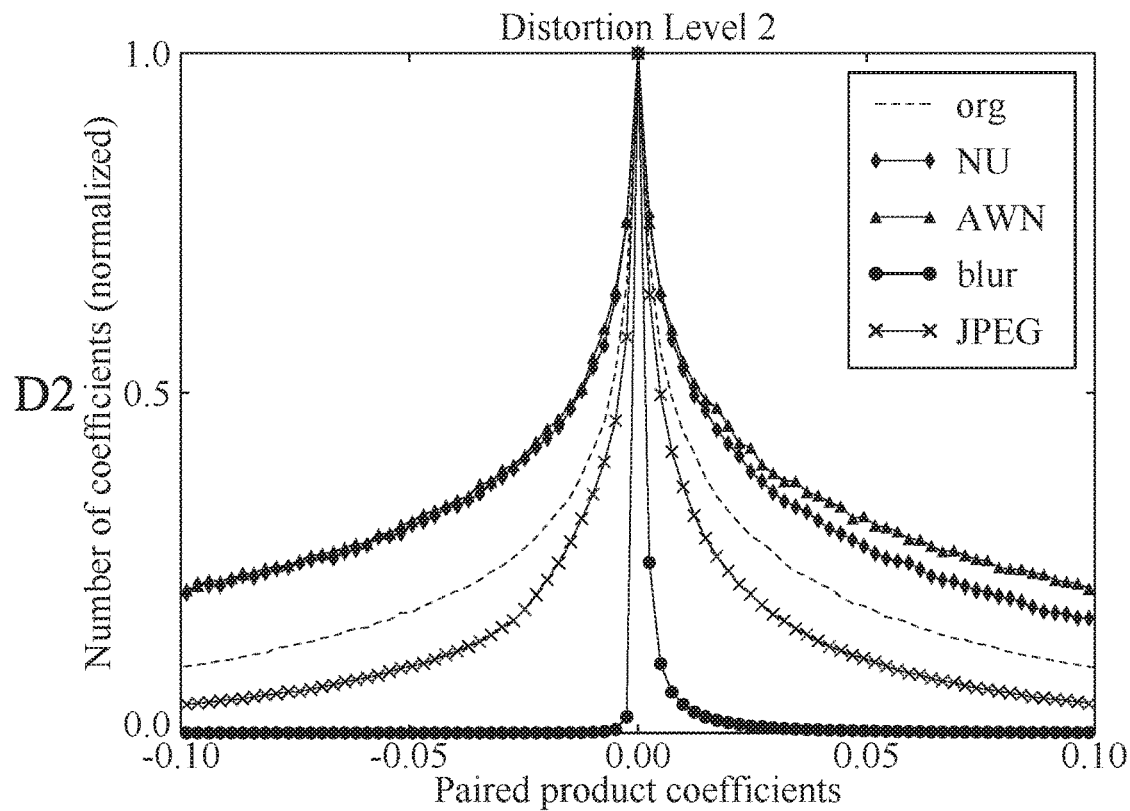
Figure 6P:
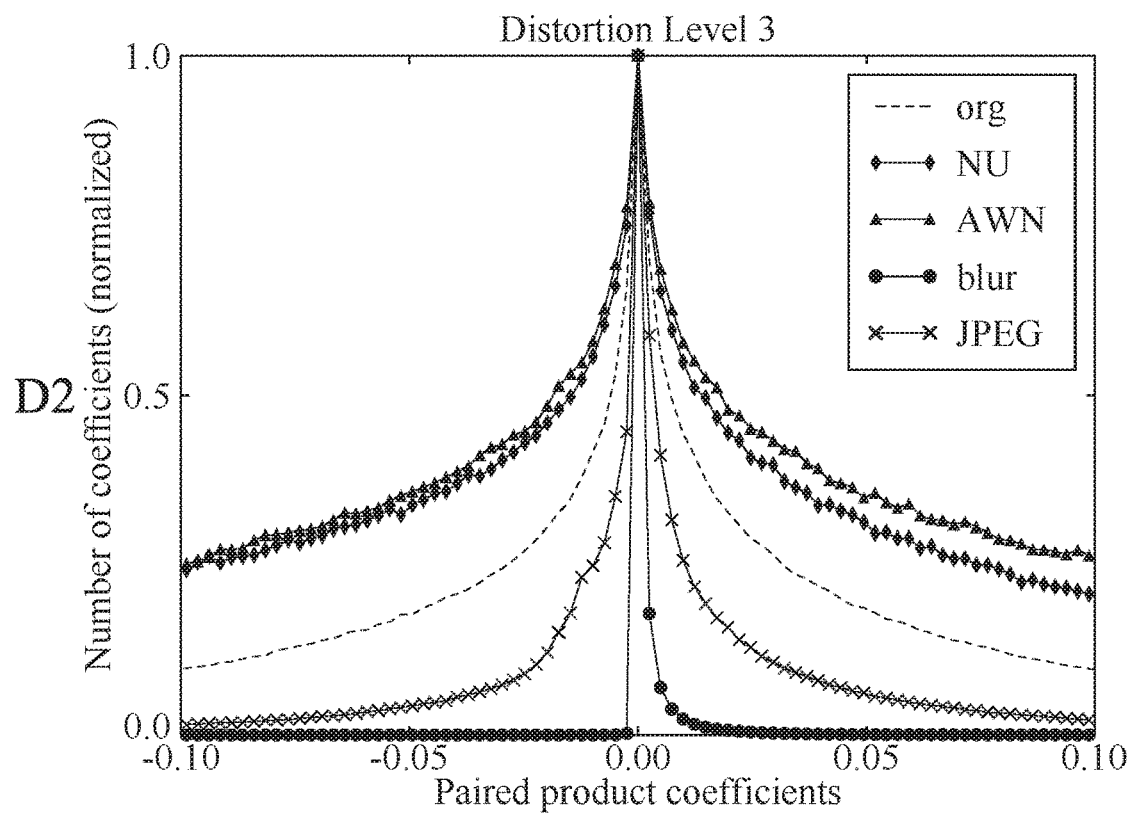

The center patches of images from the NIST and MORRIS databases were used to compute the paired product histograms of both distortion-free and distorted images over multiple distortion levels as tabulated in FIGS. 6A-6P in accordance with an embodiment of the present invention.

In an interesting extension of BRISQUE called the Derivative Statistics-based QUality Evaluator (DESIQUE) model, the MSCN histograms are supplemented by seven log-derivative distributions that are computed by differencing the logarithms of the intensities of neighboring pixel values. The following function is defined $$J(i,j) = \log(\hat{I}(i,j) + K)$$

where K is a stabilizing constant, and the log-derivative coefficients are computed as $$PD1(i,j) = J(i,j+1) - J(i,j)$$

$$PD2(i,j) = J(i+1,j) - J(i,j)$$

$$PD3(i,j) = J(i+1,j+1) - J(i,j)$$

$$PD4(i,j) = J(i+1,j-1) - J(i,j)$$

$$PD5(i,j) = J(i-1,j) - J(i+1,j) - J(i,j-1) - J(i,j+1)$$

$$PD6(i,j) = J(i,j) + J(i+1,j+1) - J(i,j+1) - J(i+1,j)$$

$$PD7(i,j) = J(i-1,j-1) + J(i+1,j+1) - J(i-1,j+1) - J(i+1,j-1)$$

Figure 7A:
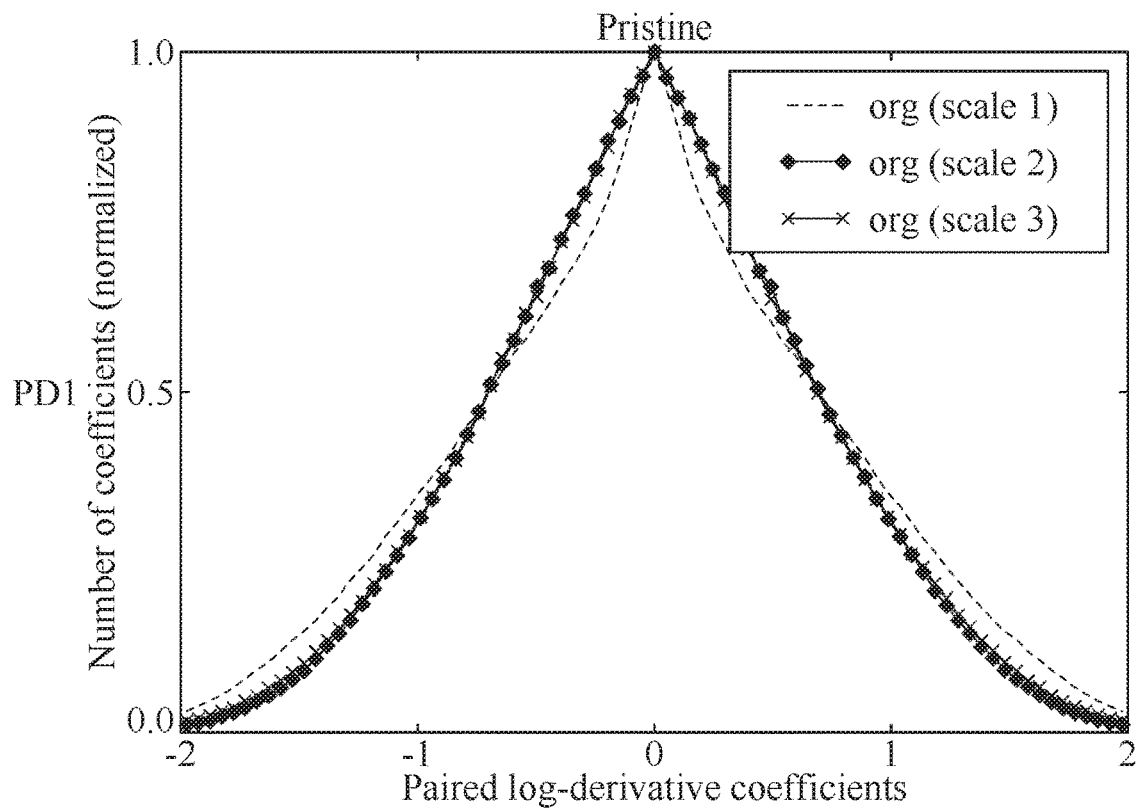
FIGS. 7A-7AB illustrate the log-derivative distributions of both pristine and distorted images over multiple distortion levels in accordance with an embodiment of the present invention.
Figure 7B:
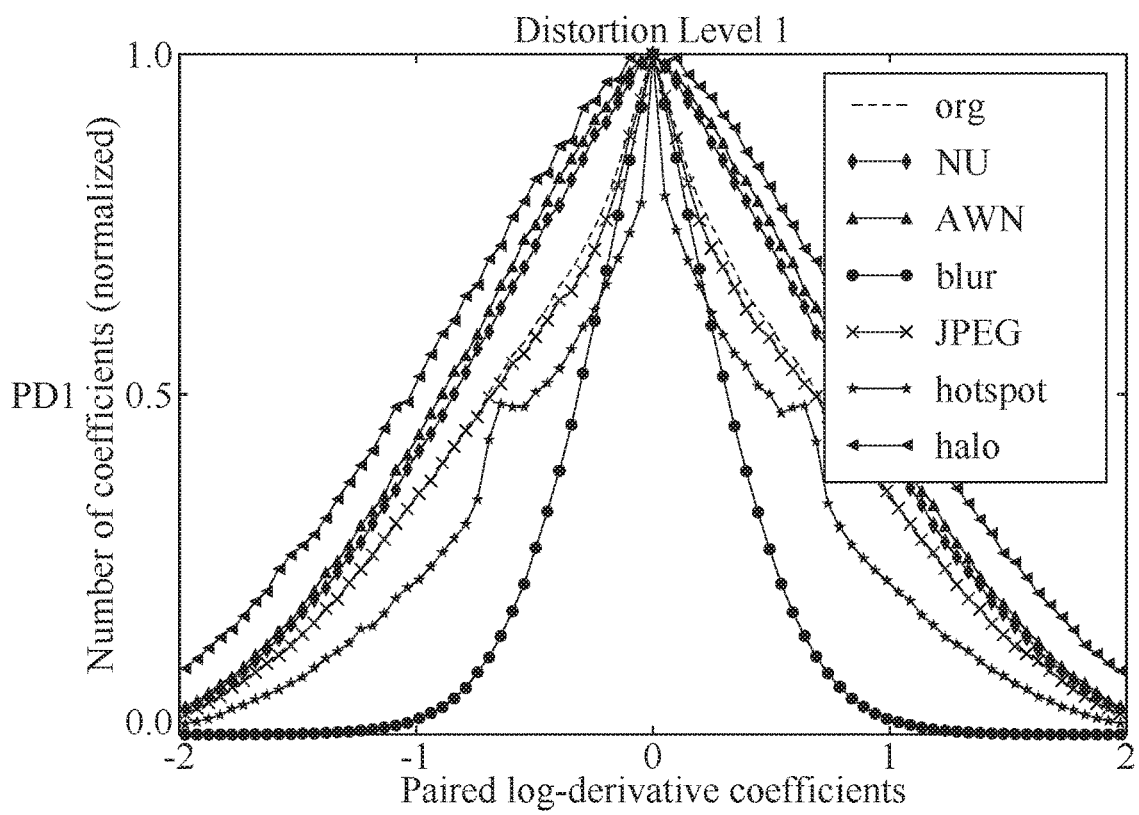
Figure 7C:
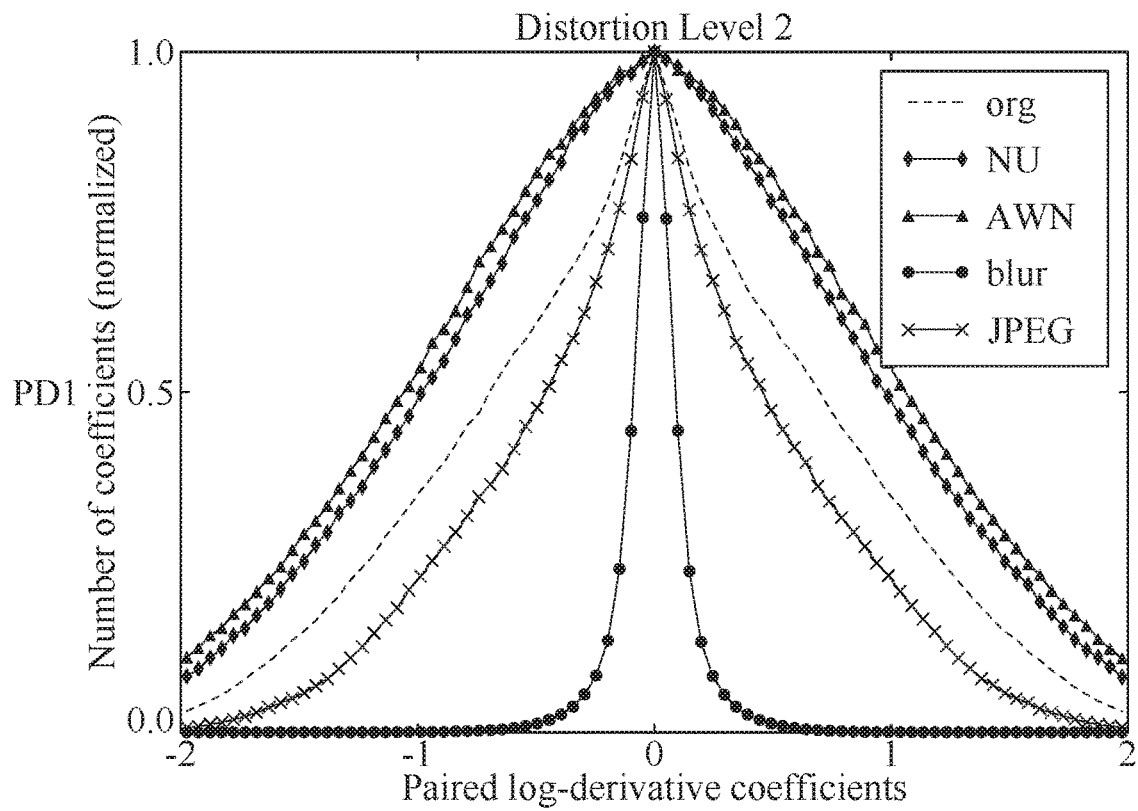
Figure 7D:
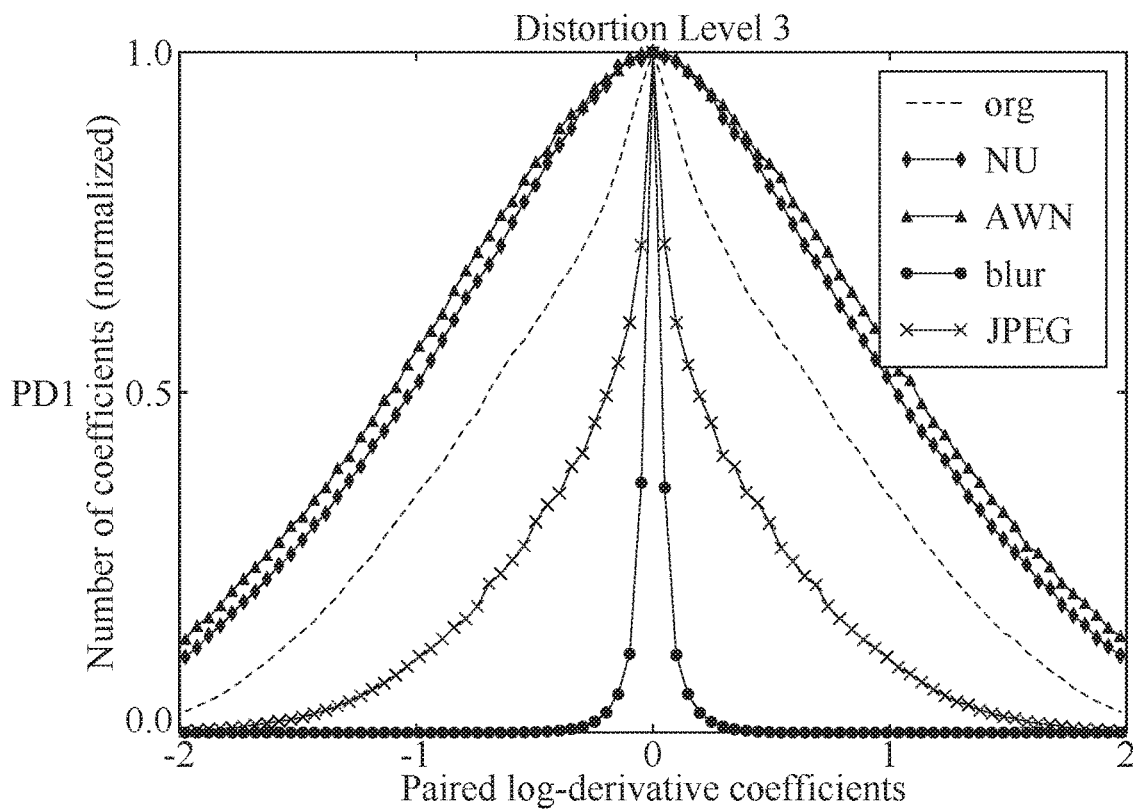
Figure 7E:
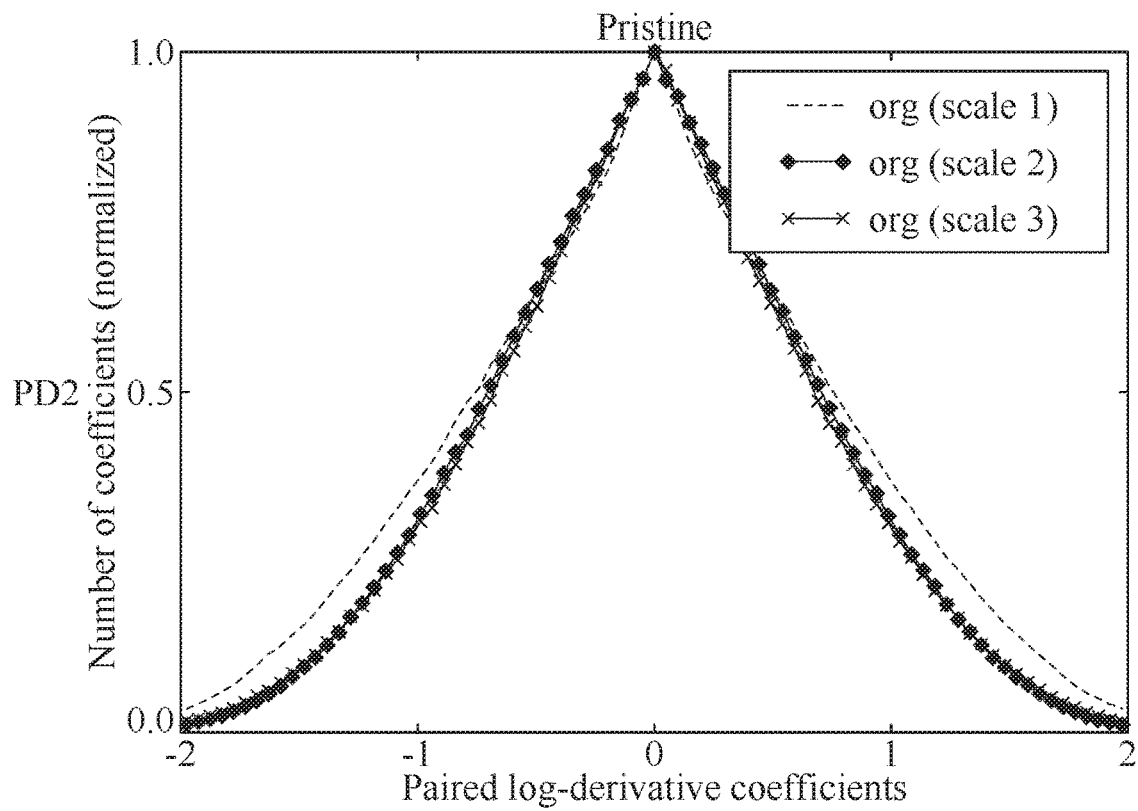
Figure 7F:
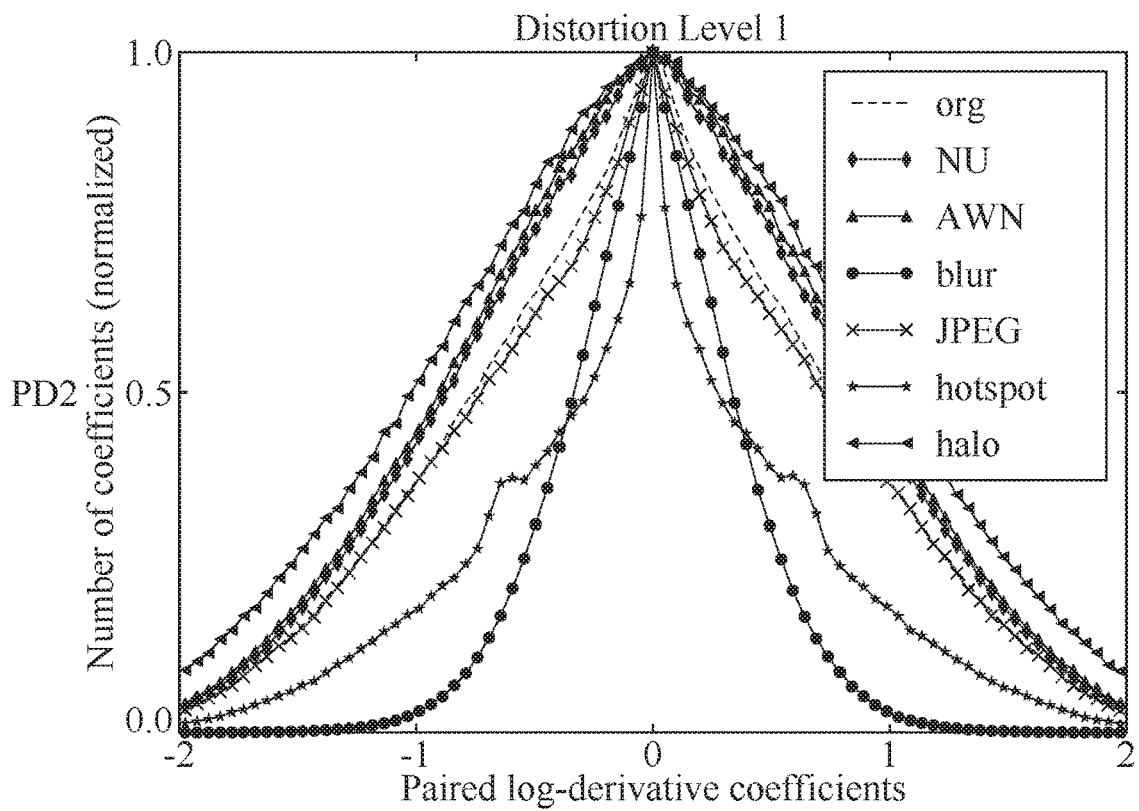
Figure 7G:
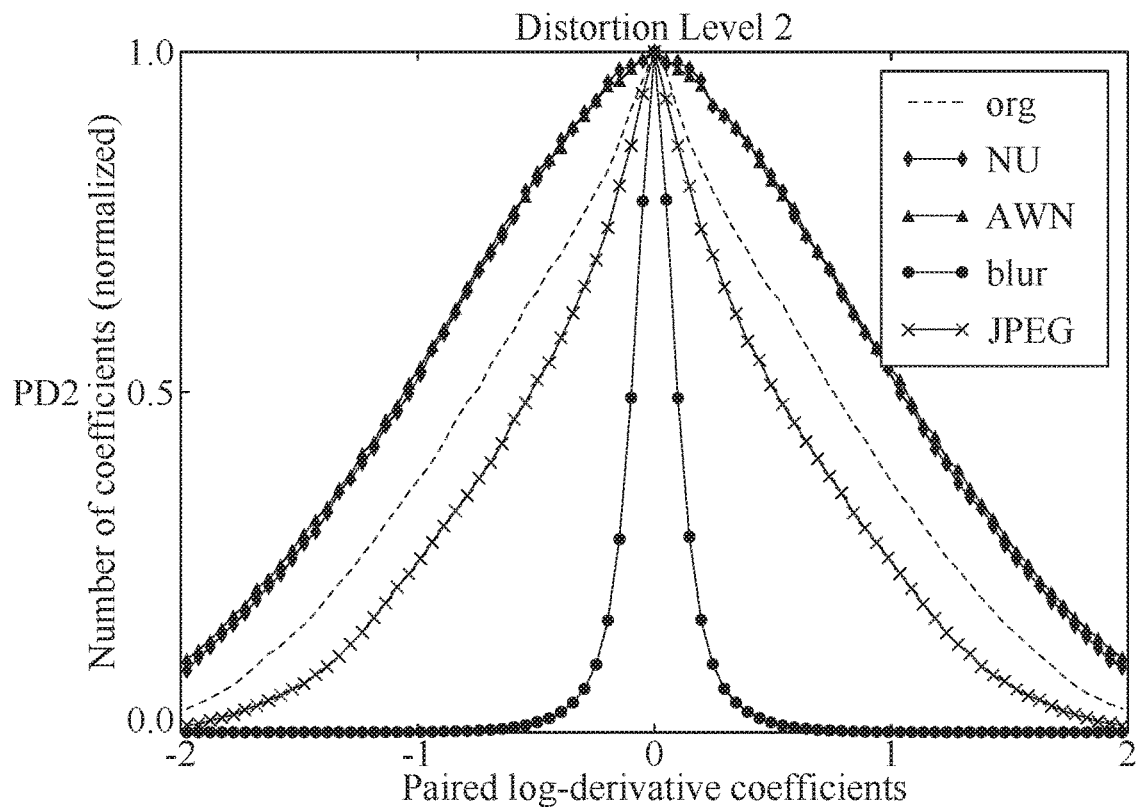
Figure 7H:
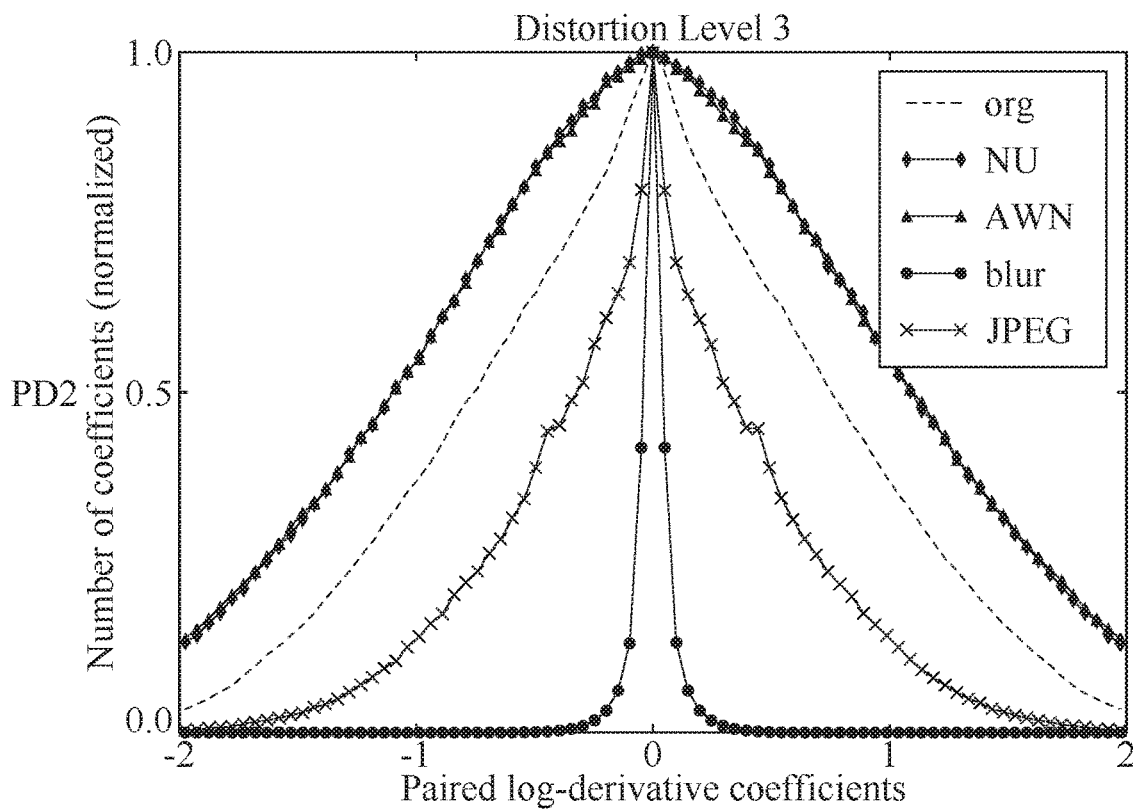
Figure 7I:
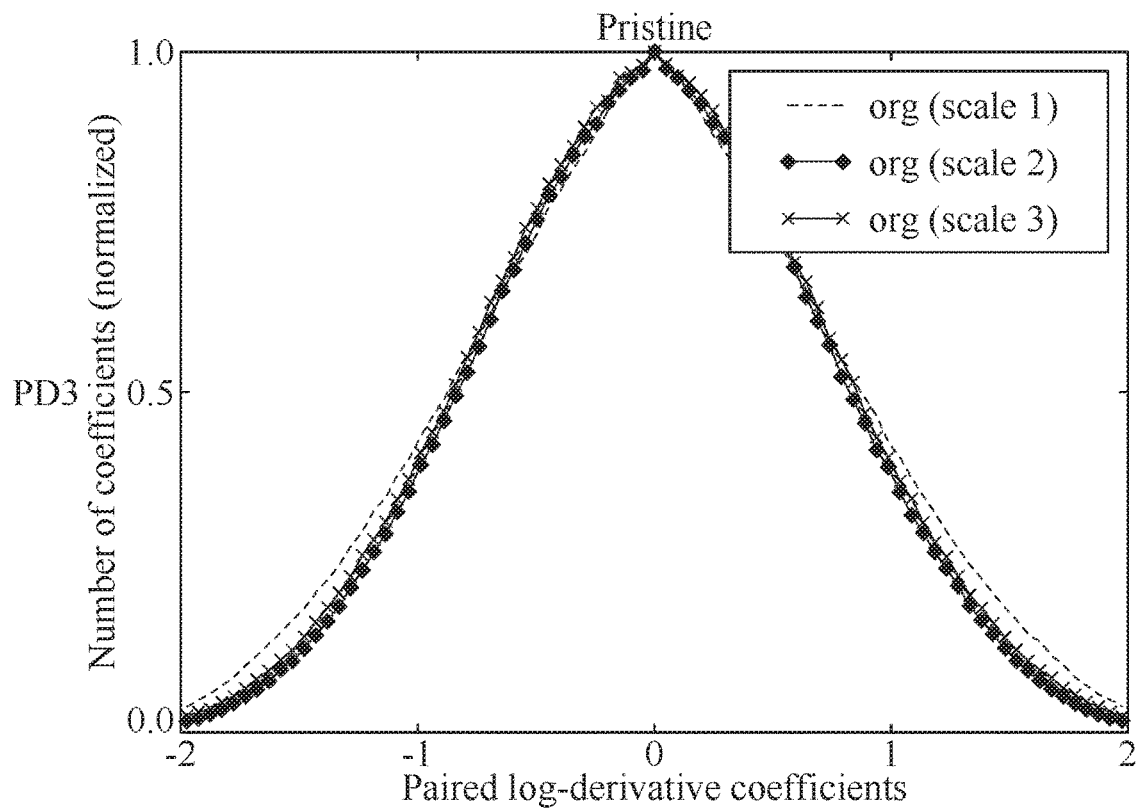
Figure 7J:
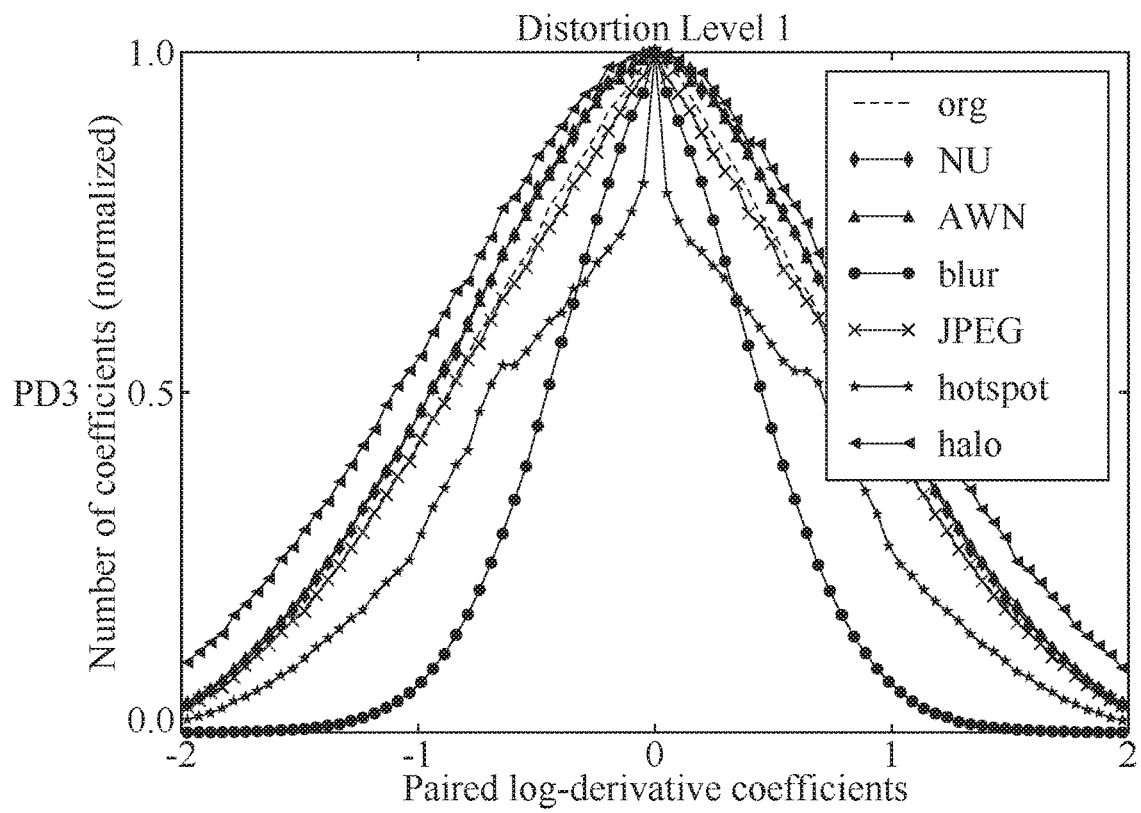
Figure 7K:
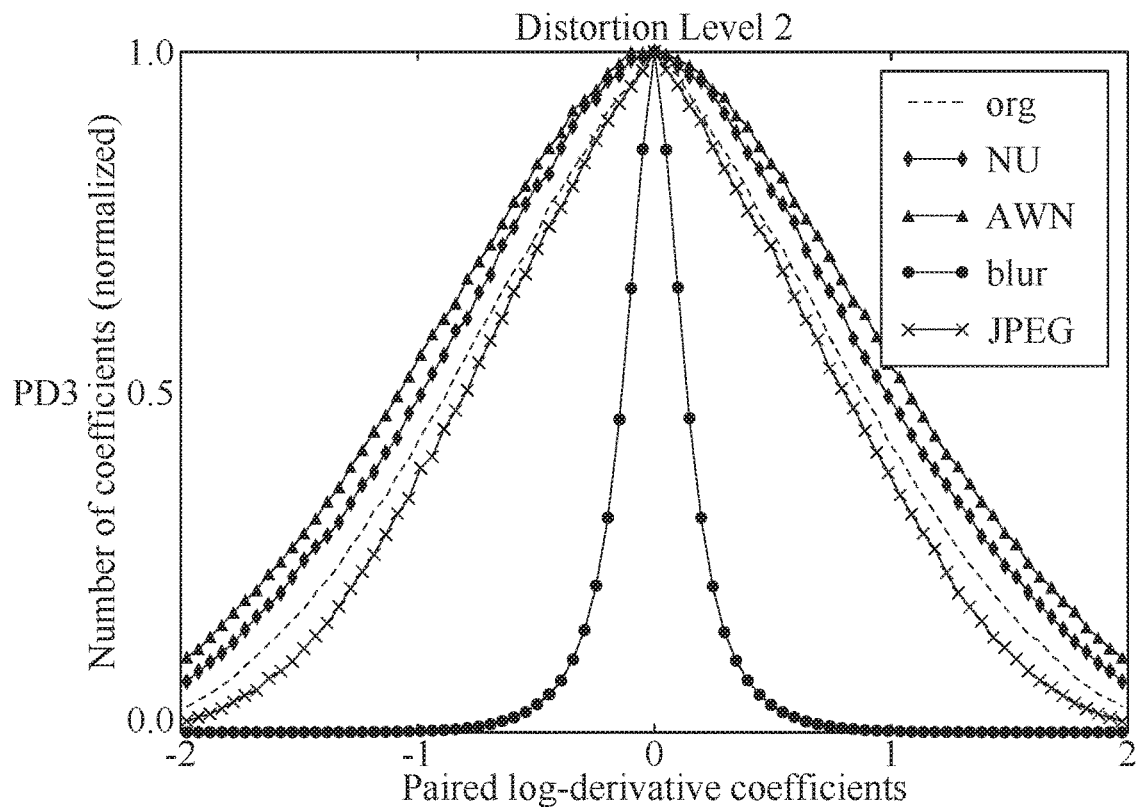
Figure 7L:
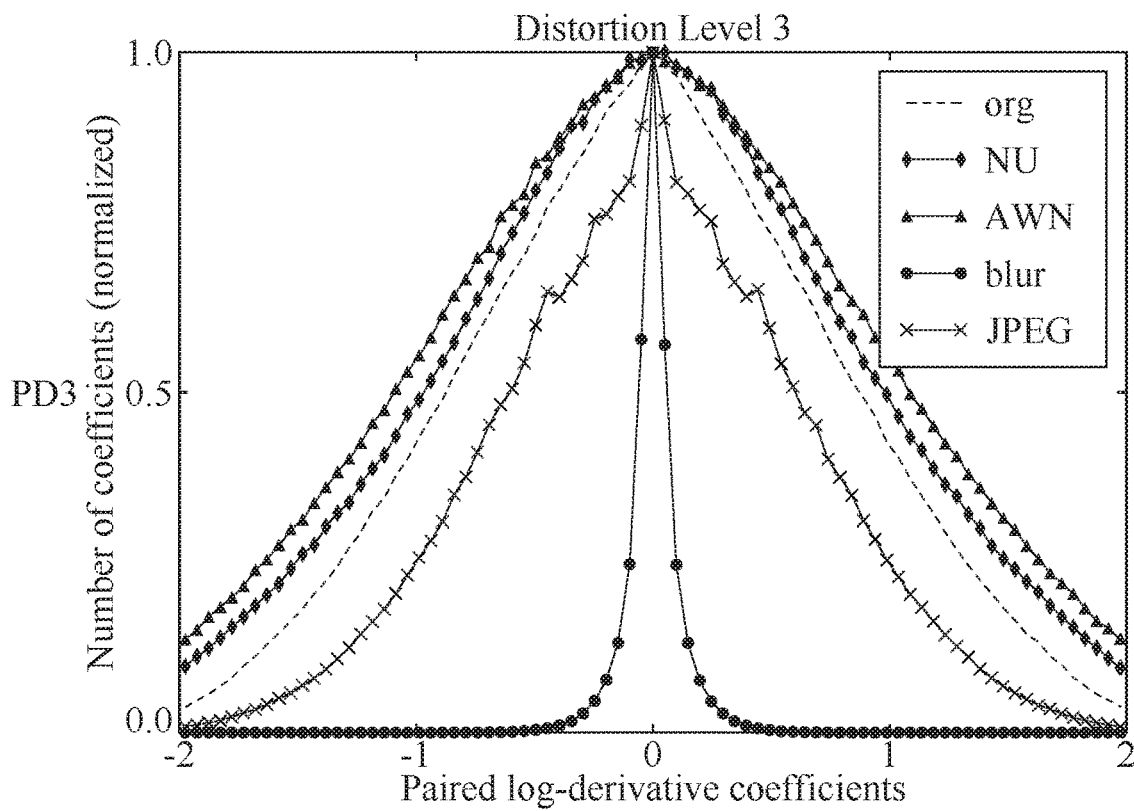
Figure 7M:
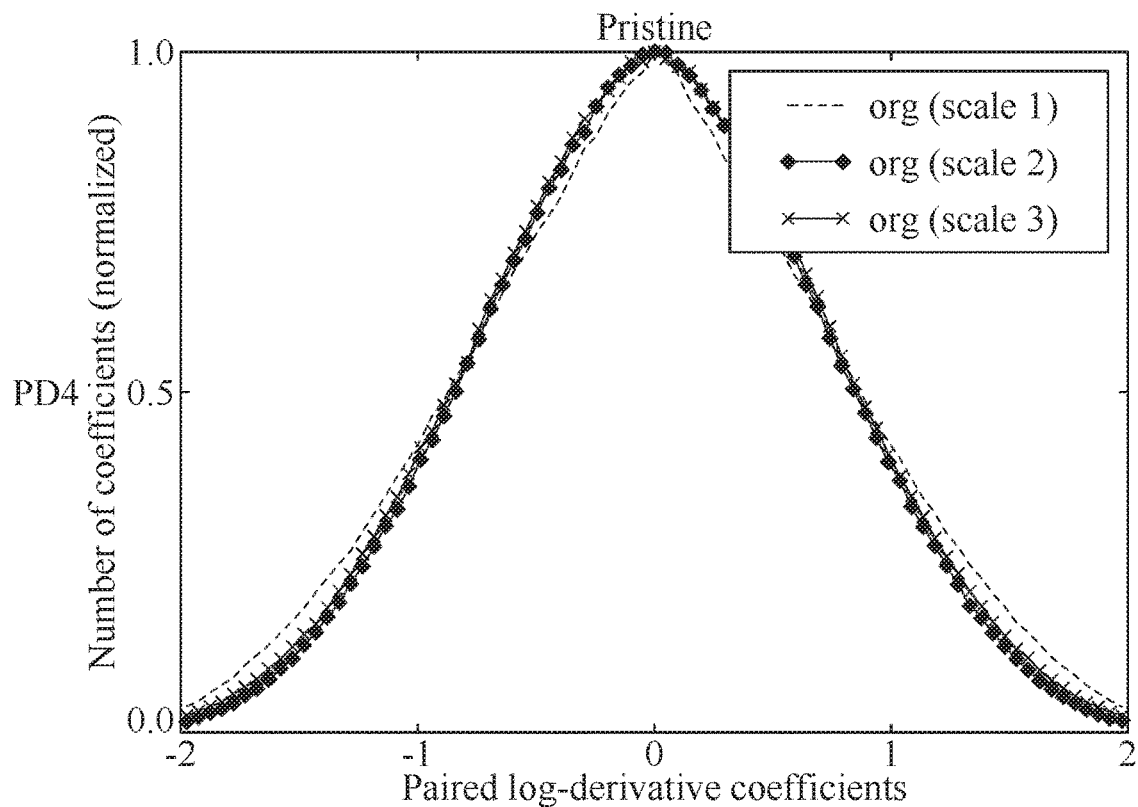
Figure 7N:
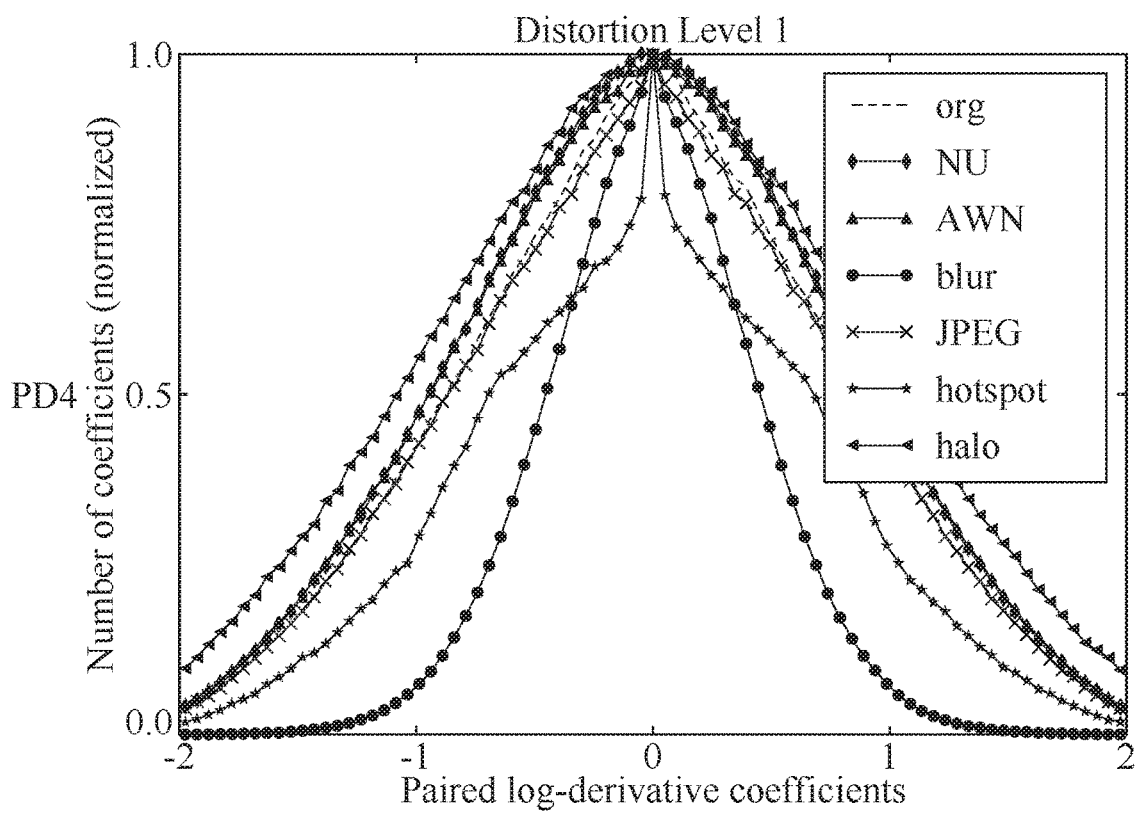
Figure 7O:
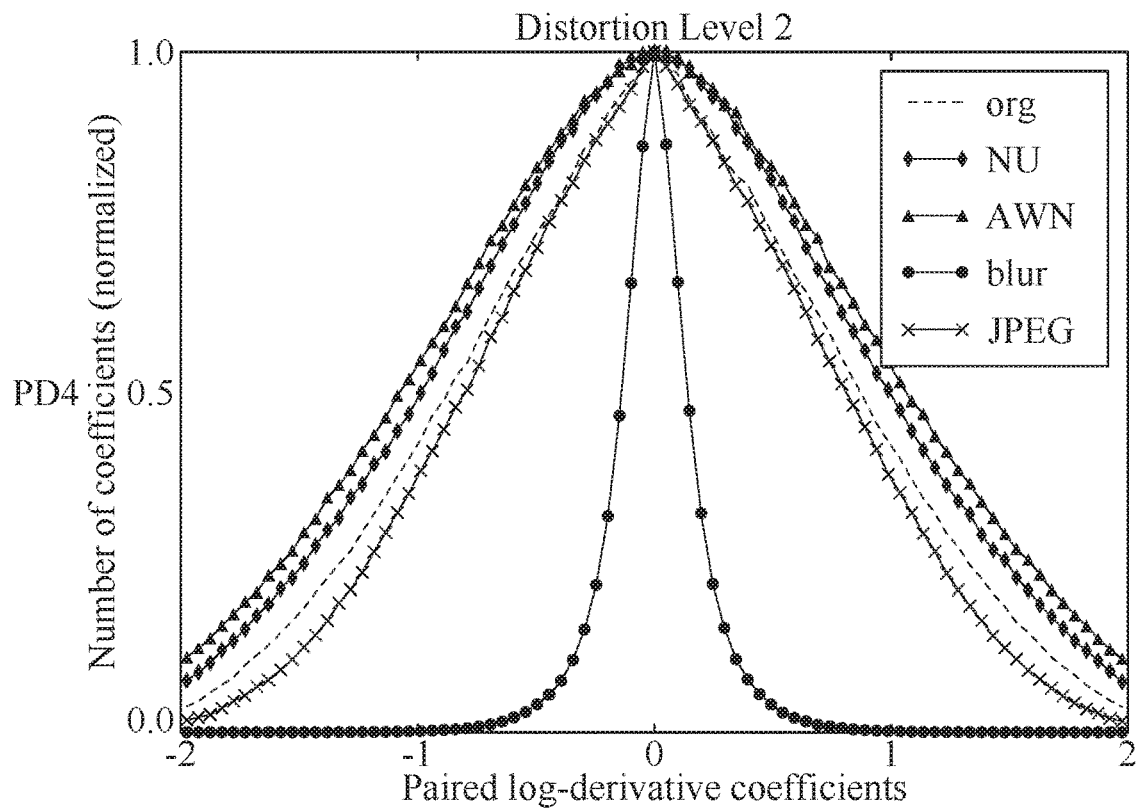
Figure 7P:
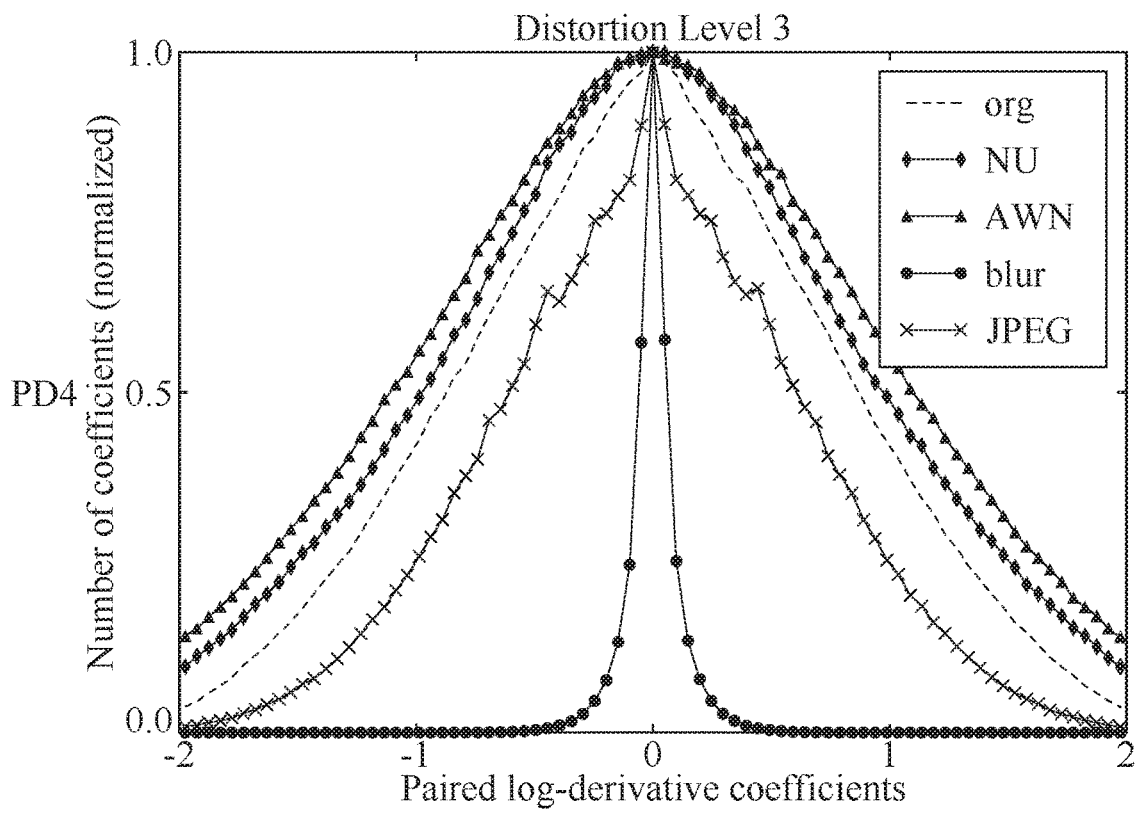
Figure 7Q:
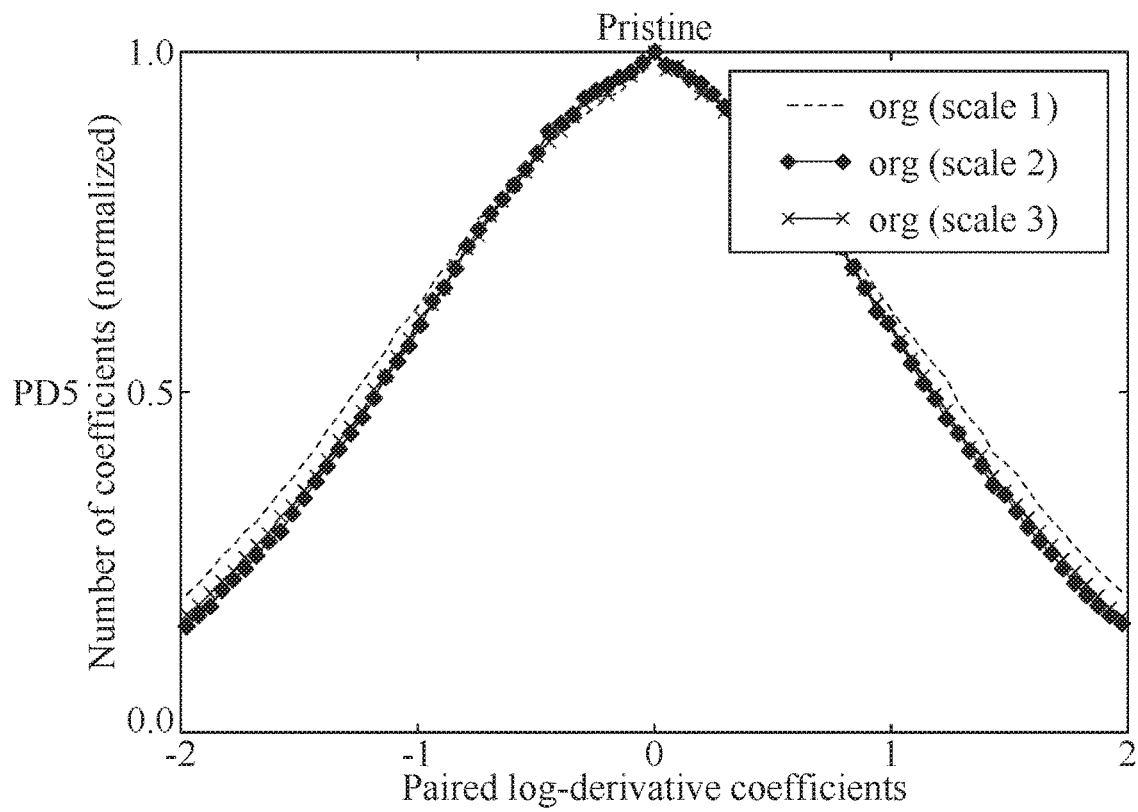
Figure 7R:
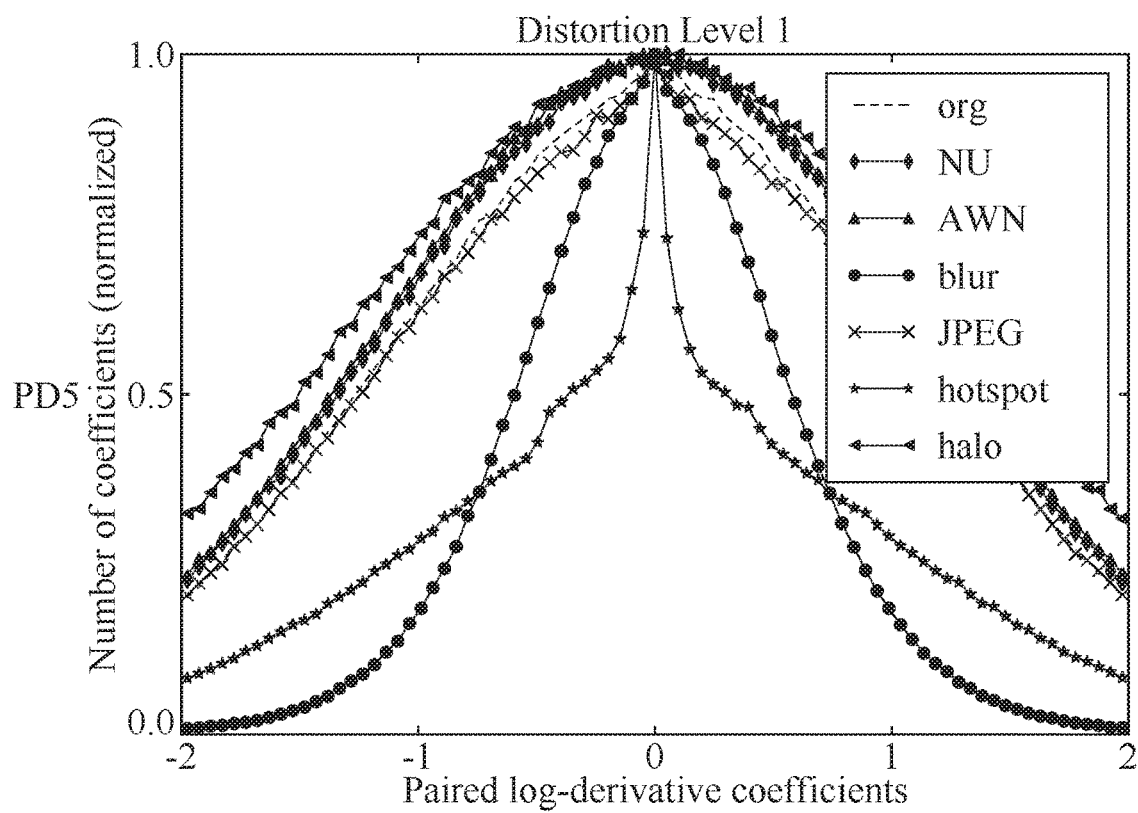
Figure 7S:
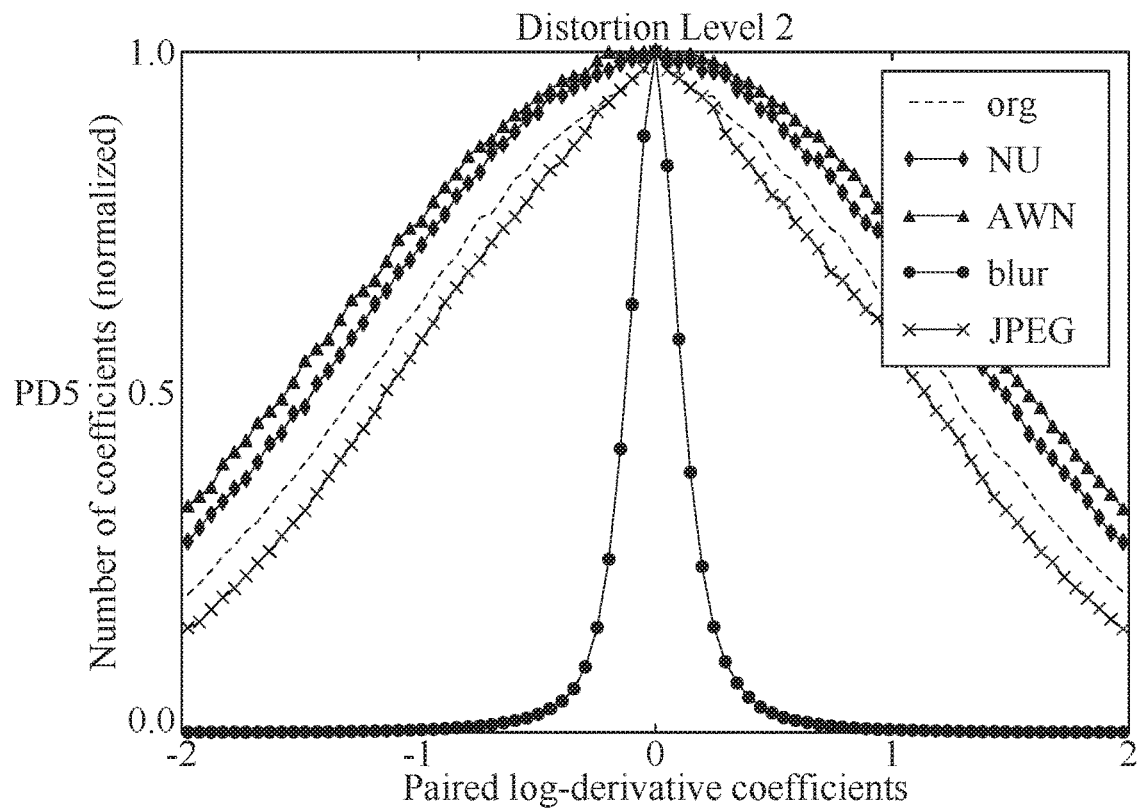
Figure 7T:
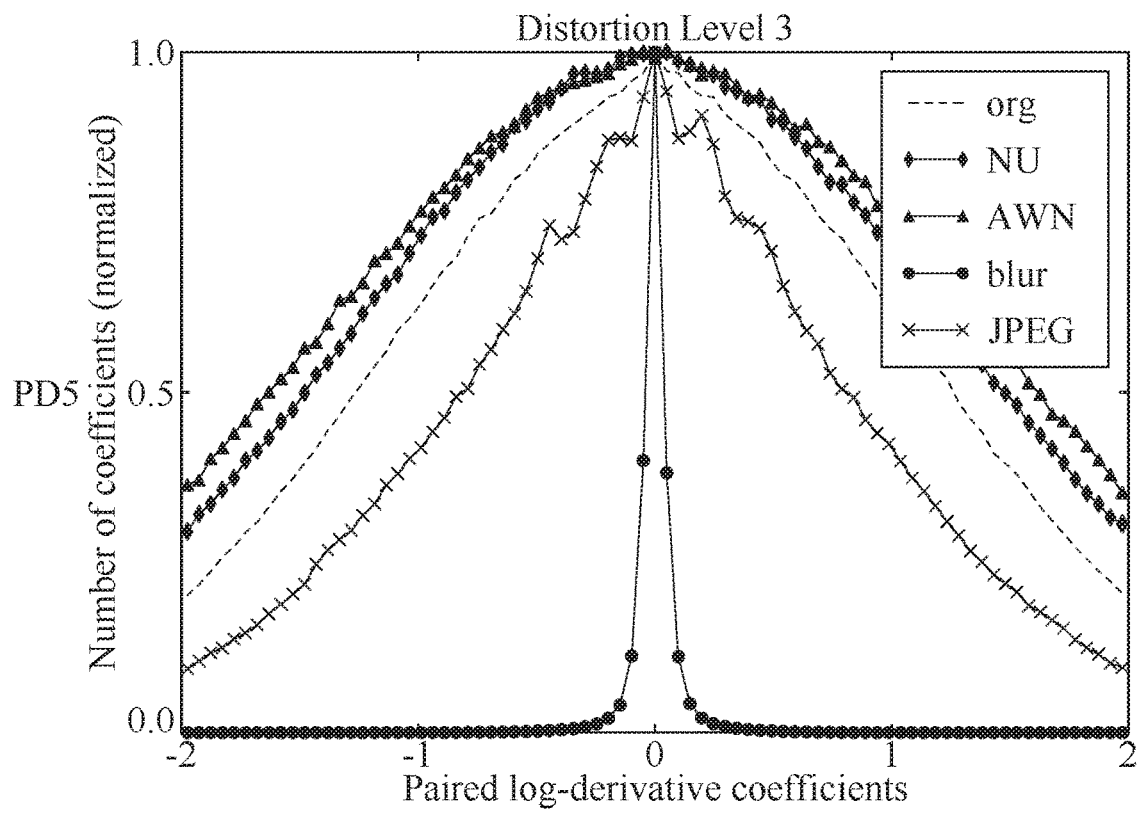
Figure 7U:
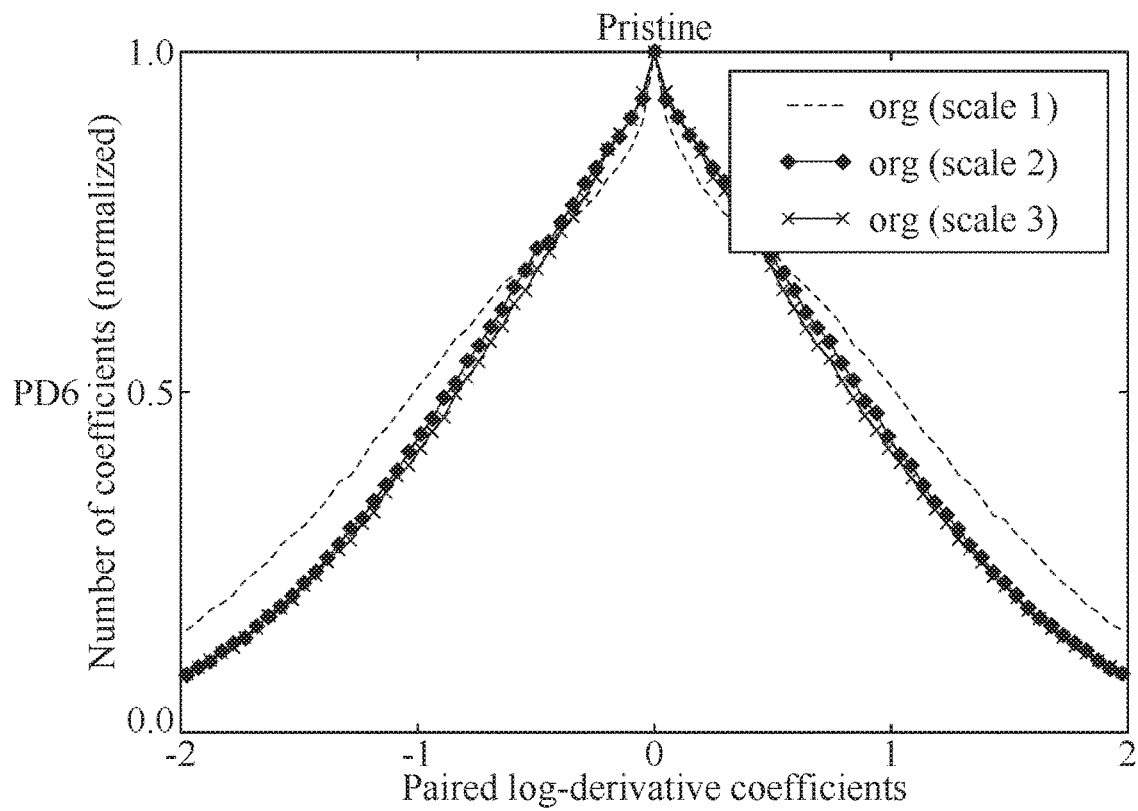
Figure 7V:
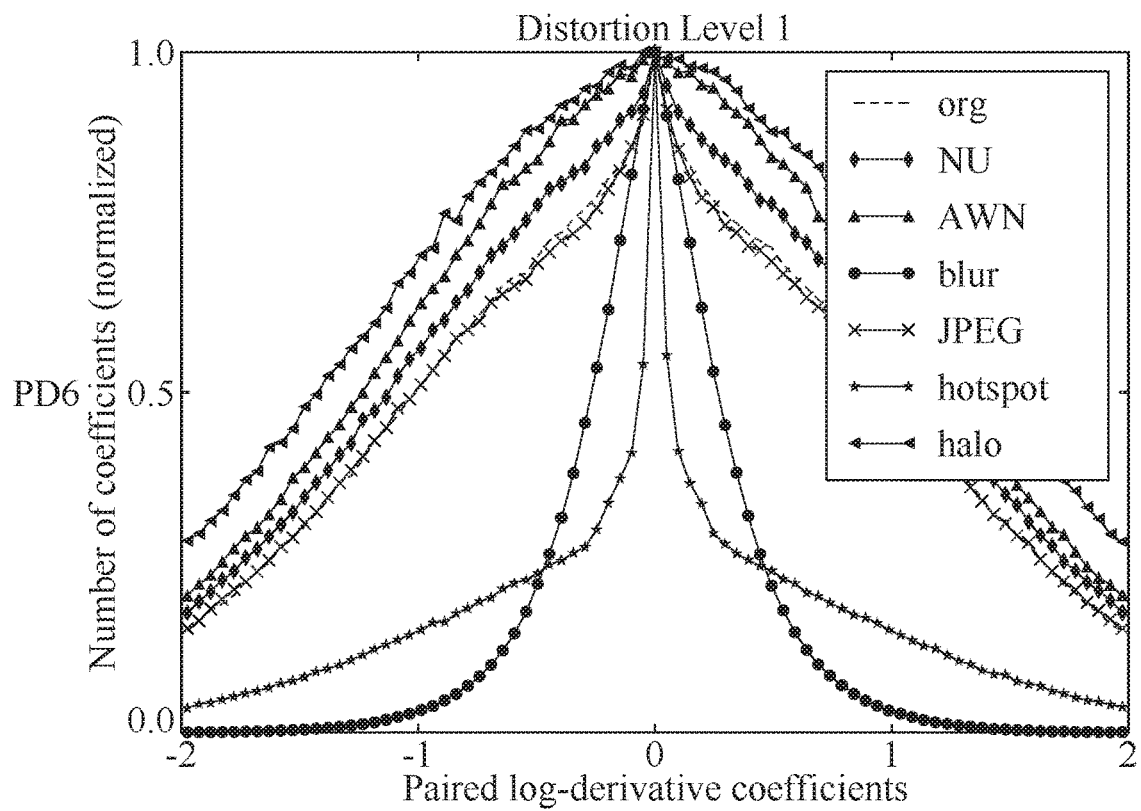
Figure 7W:
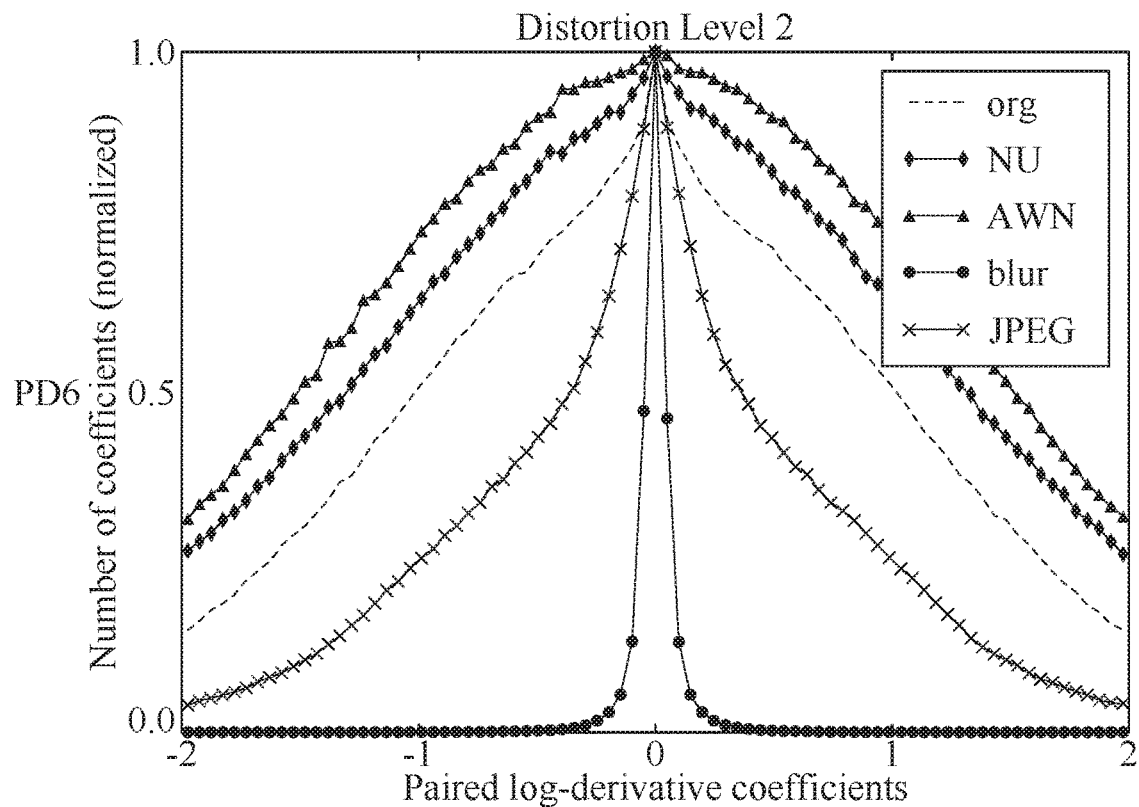
Figure 7X:
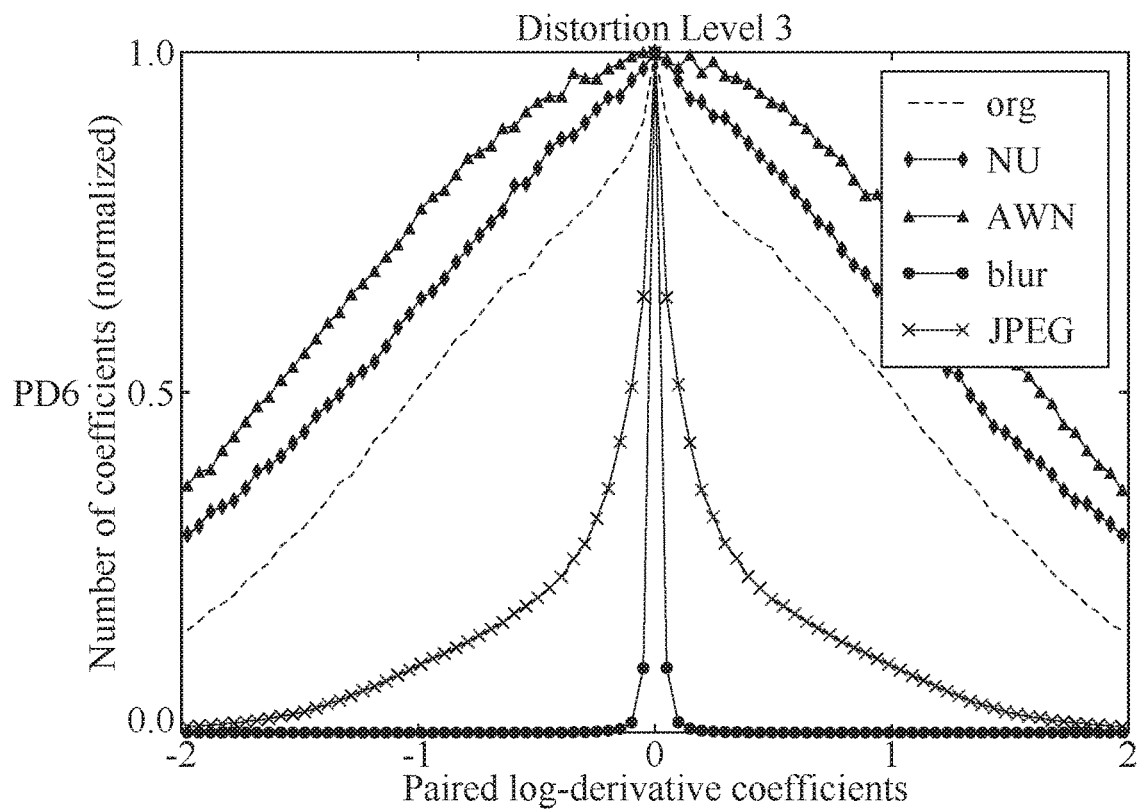
Figure 7Y:
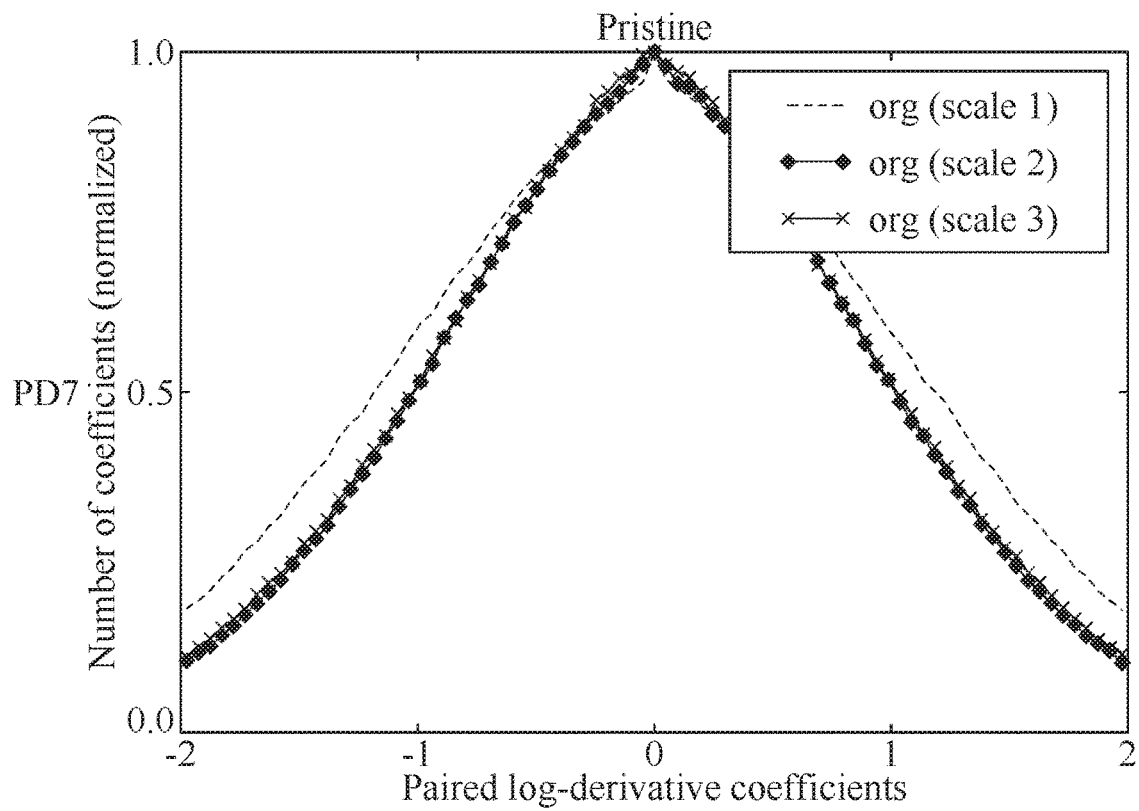
Figure 7Z:
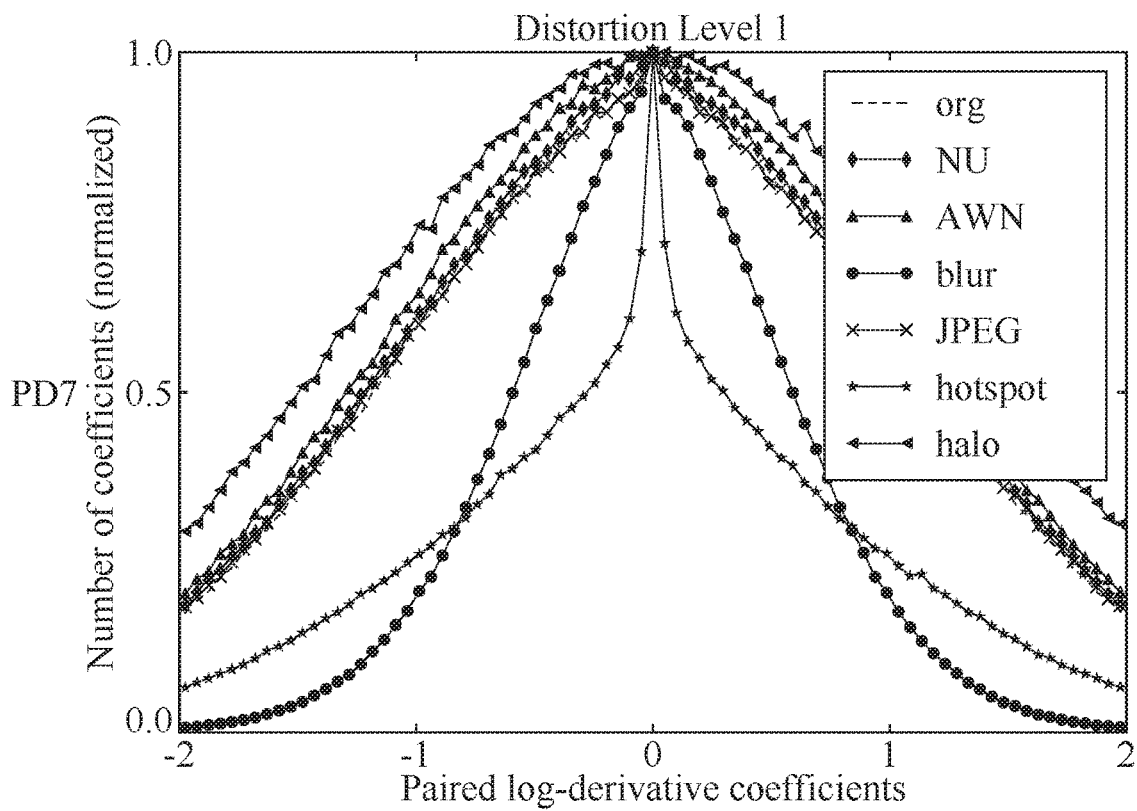
Figure 7A:
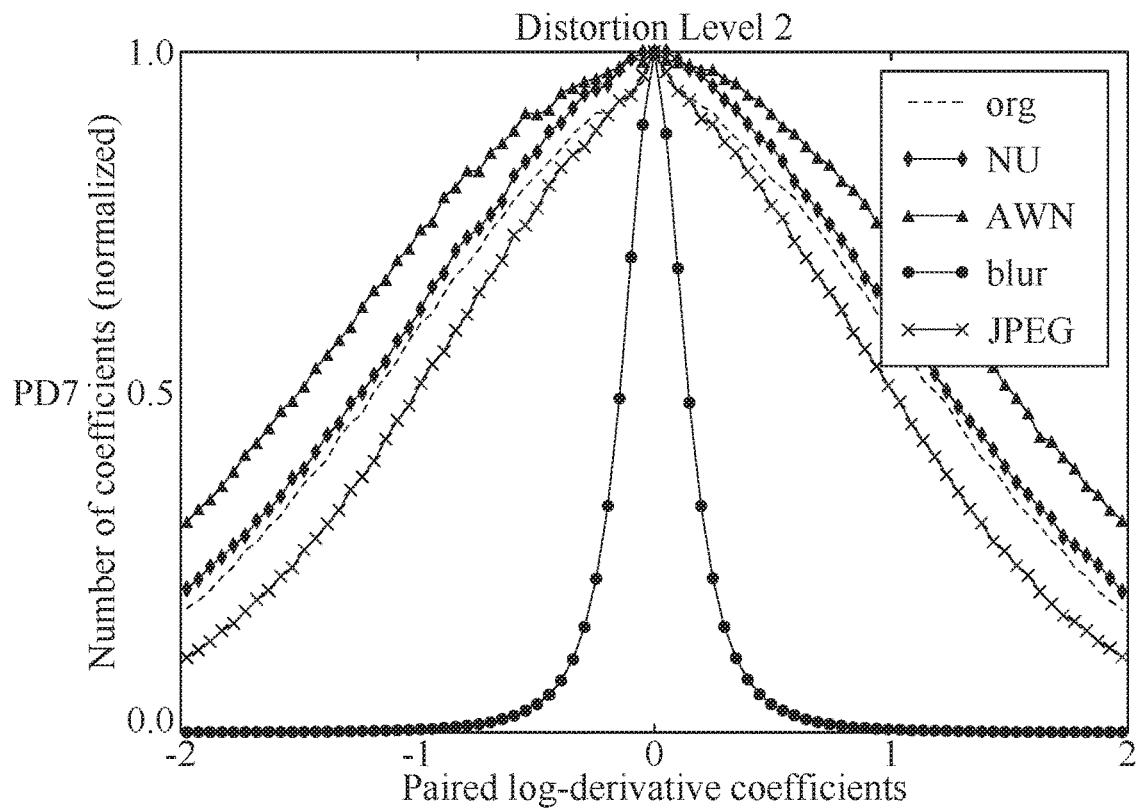
Figure 7A:
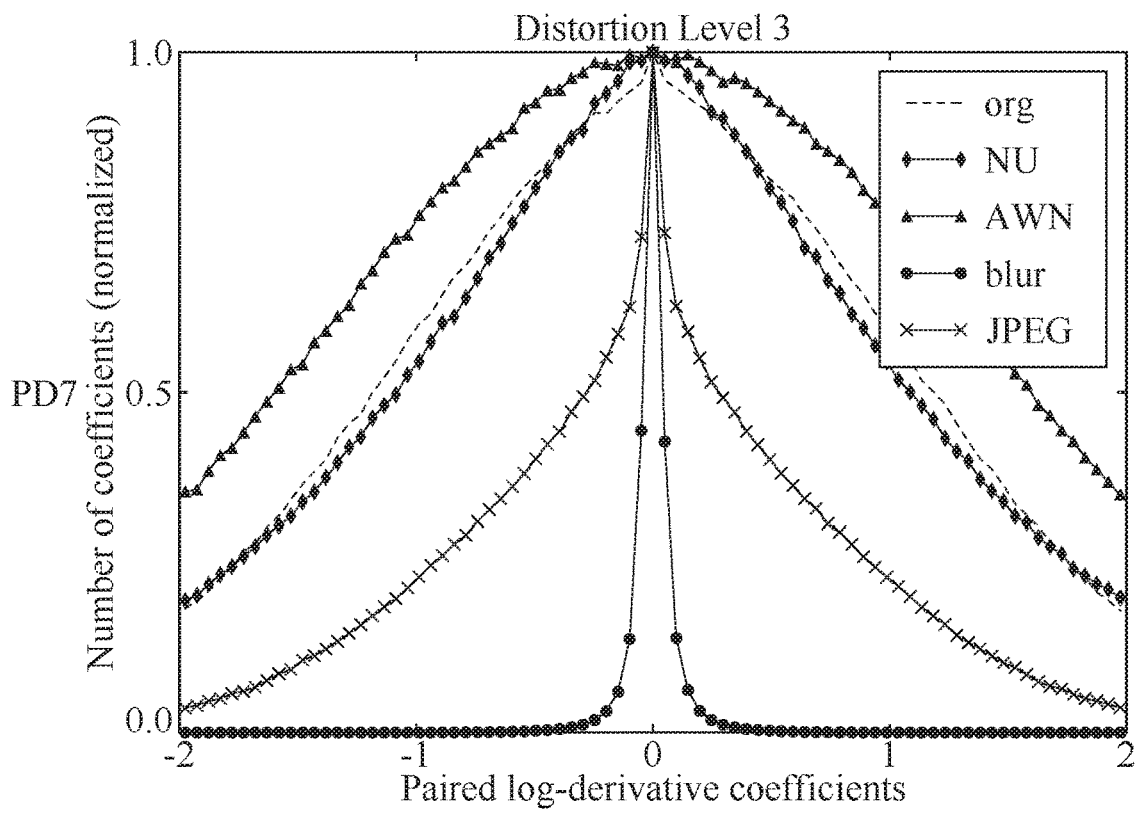

The log-derivative distributions of both pristine and distorted images over multiple distortion levels are plotted in FIGS. 7A-7AB in accordance with an embodiment of the present invention.

Perceptual neurons in the early stages of the human visual system form responses that capture information over multiple orientations and scales. These responses have been successfully approximated by steerable filters, with the steerable pyramid decomposition being most popular.

The Distortion Identification-based Image Verity and Integrity Evaluation (DIIVINE) index predicts image quality using coefficients generated from the steerable pyramid overcomplete wavelet decomposition. Oriented image subbands are divisively normalized by dividing the local contrast estimated from neighboring subbands and scales.

Figure 8A:
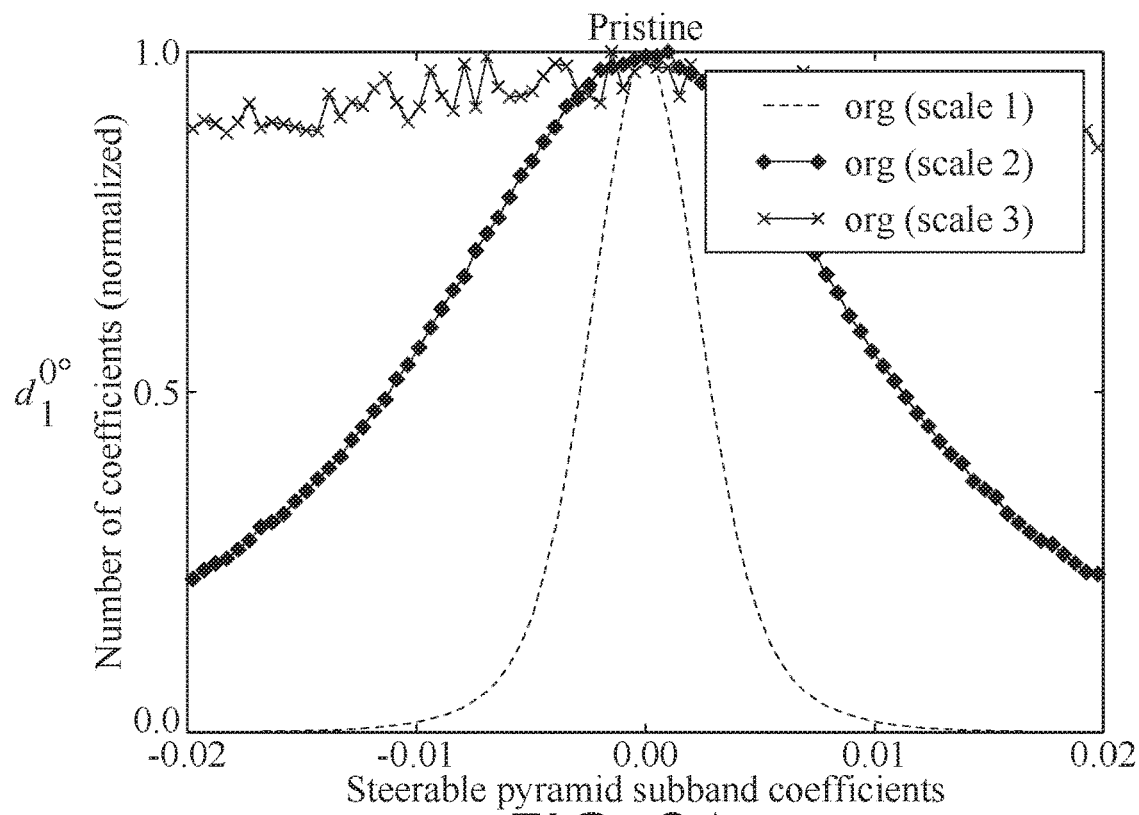
FIGS. 8A-8X illustrate the divisively normalized steerable pyramid orientation subbands for center patches extracted from one scale and six orientations for both distortion-free and distorted images in accordance with an embodiment of the present invention.
Figure 8B:
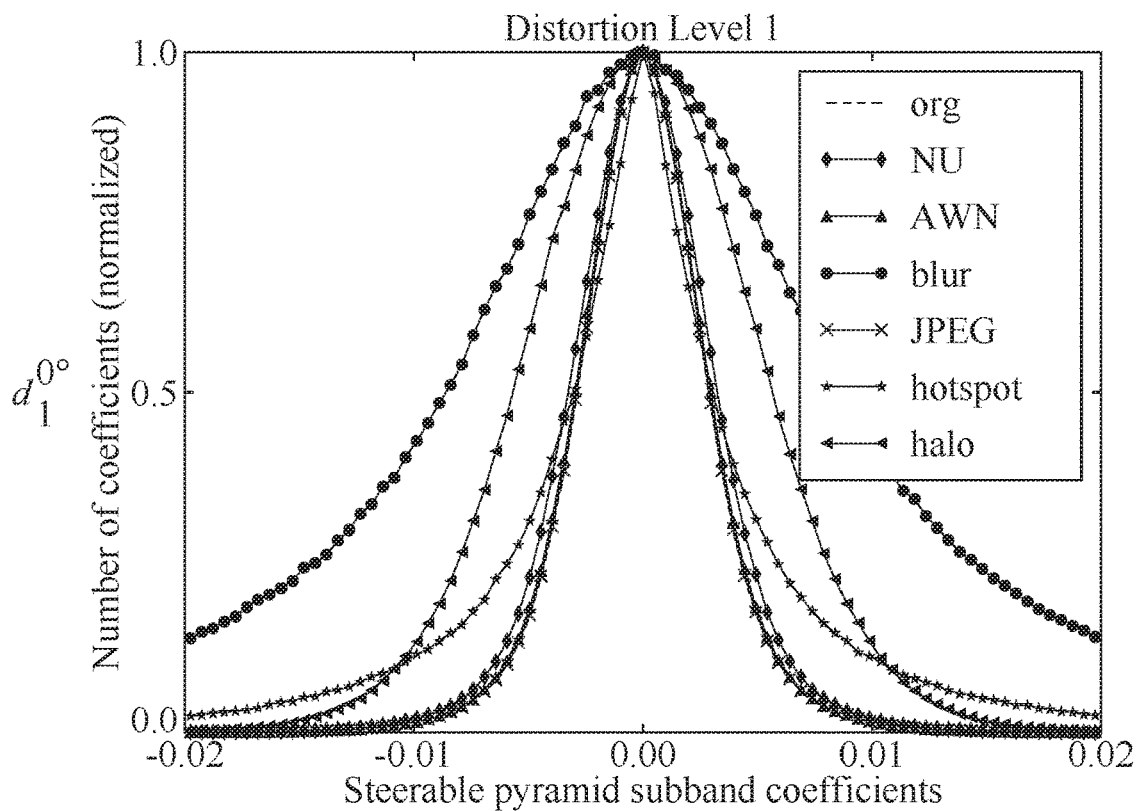
Figure 8C:
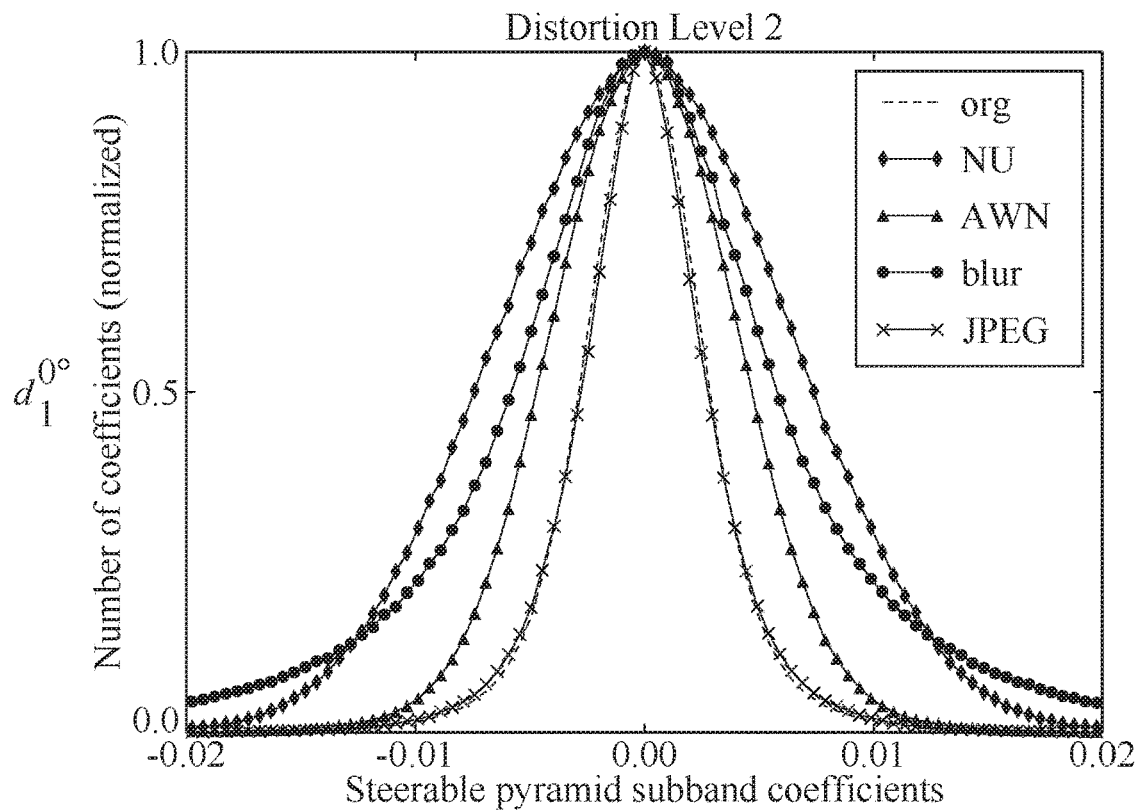
Figure 8D:
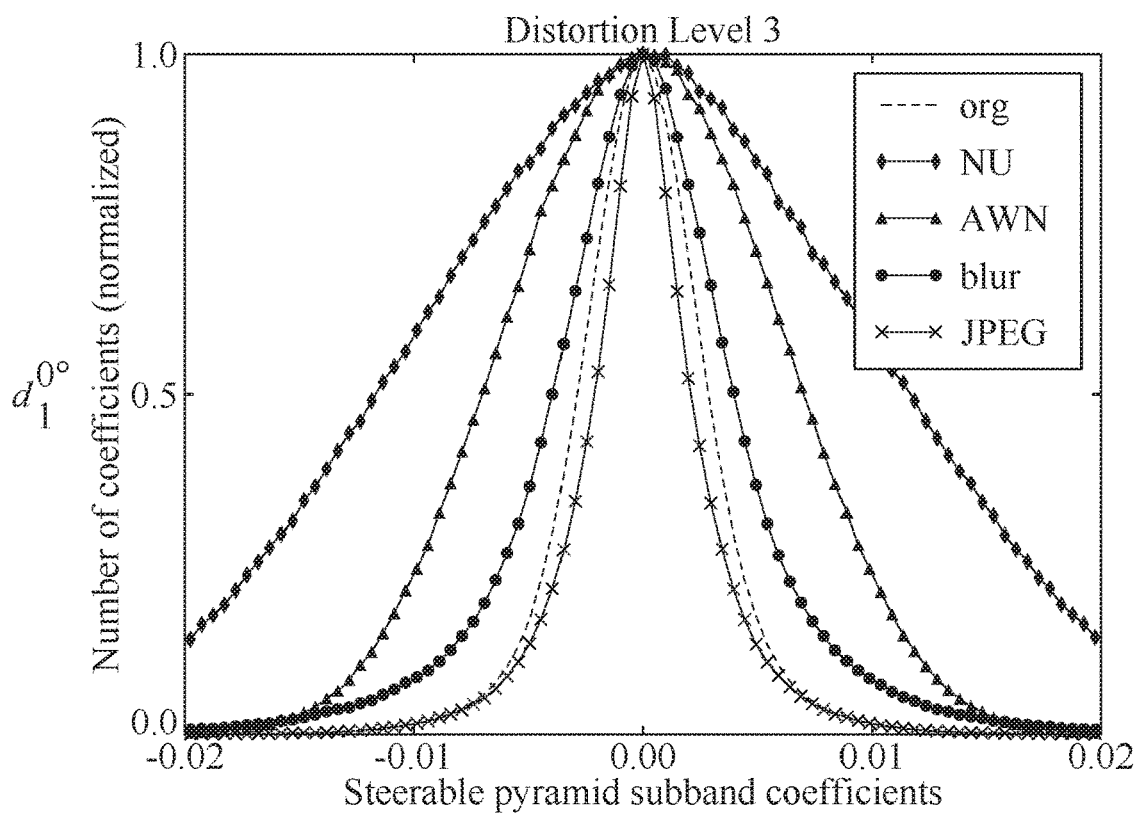
Figure 8E:
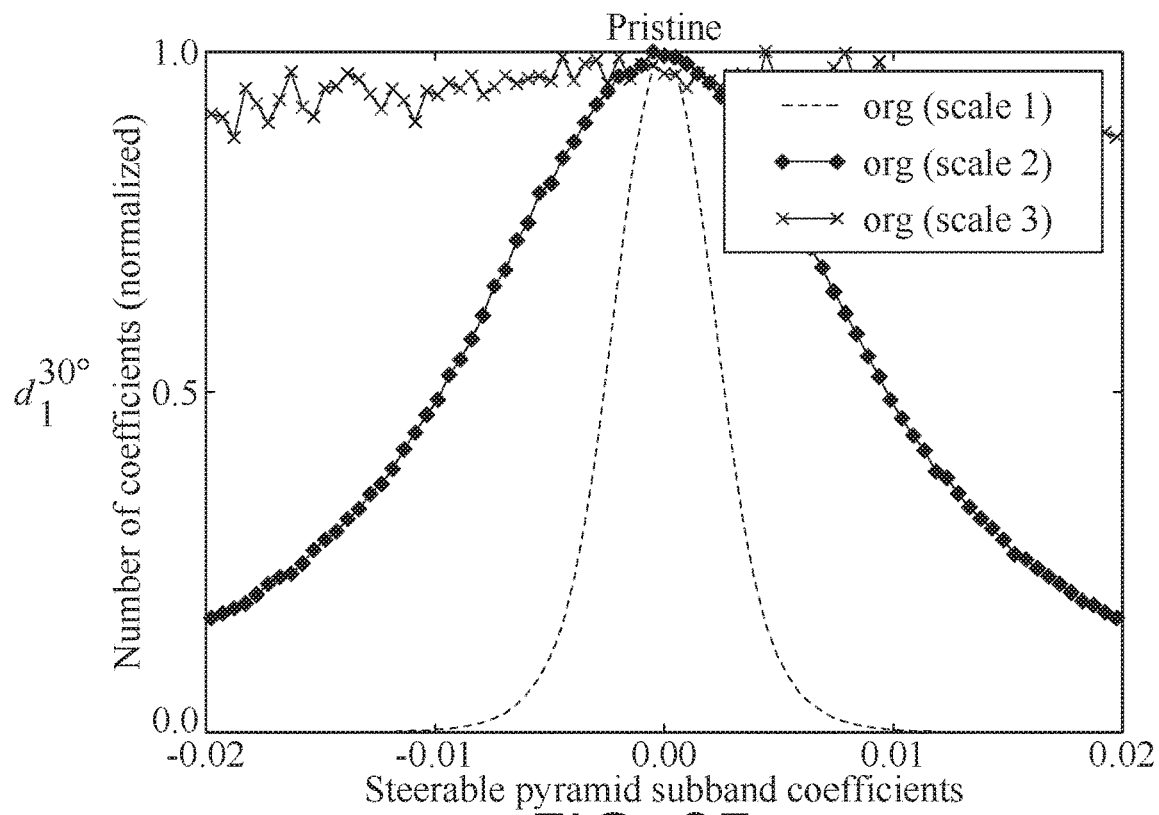
Figure 8F:
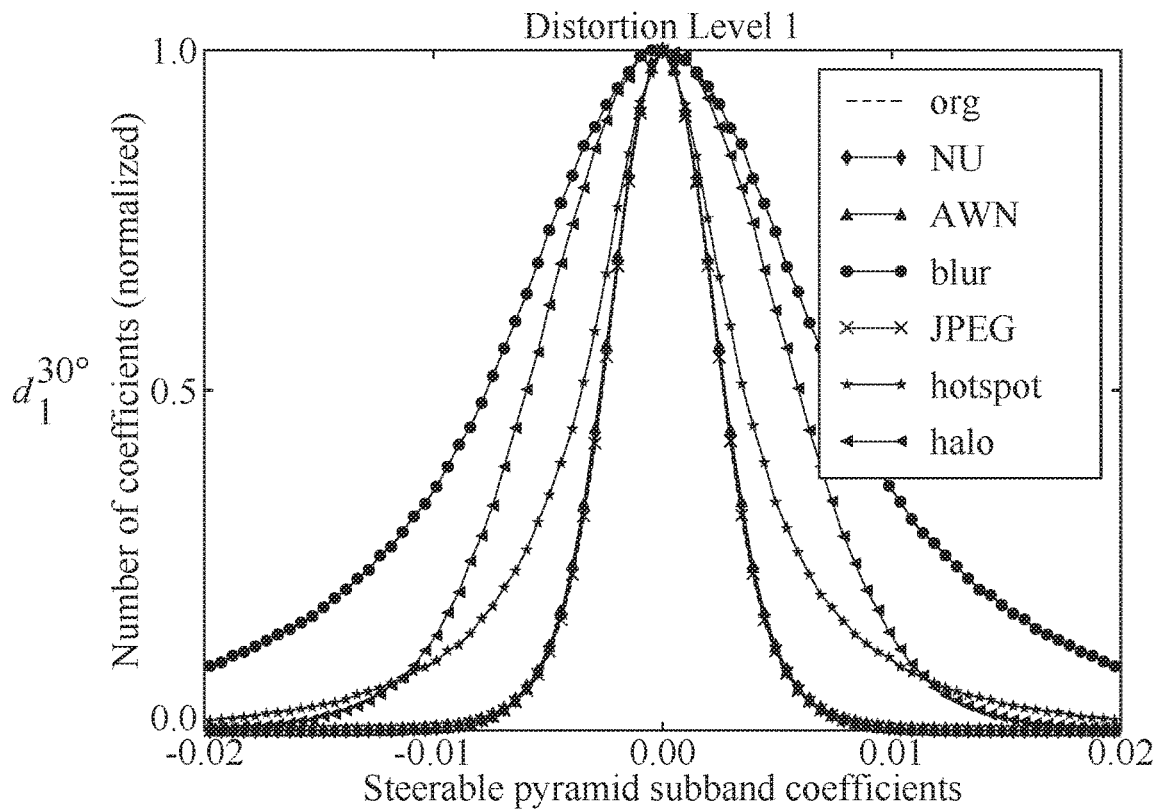
Figure 8G:
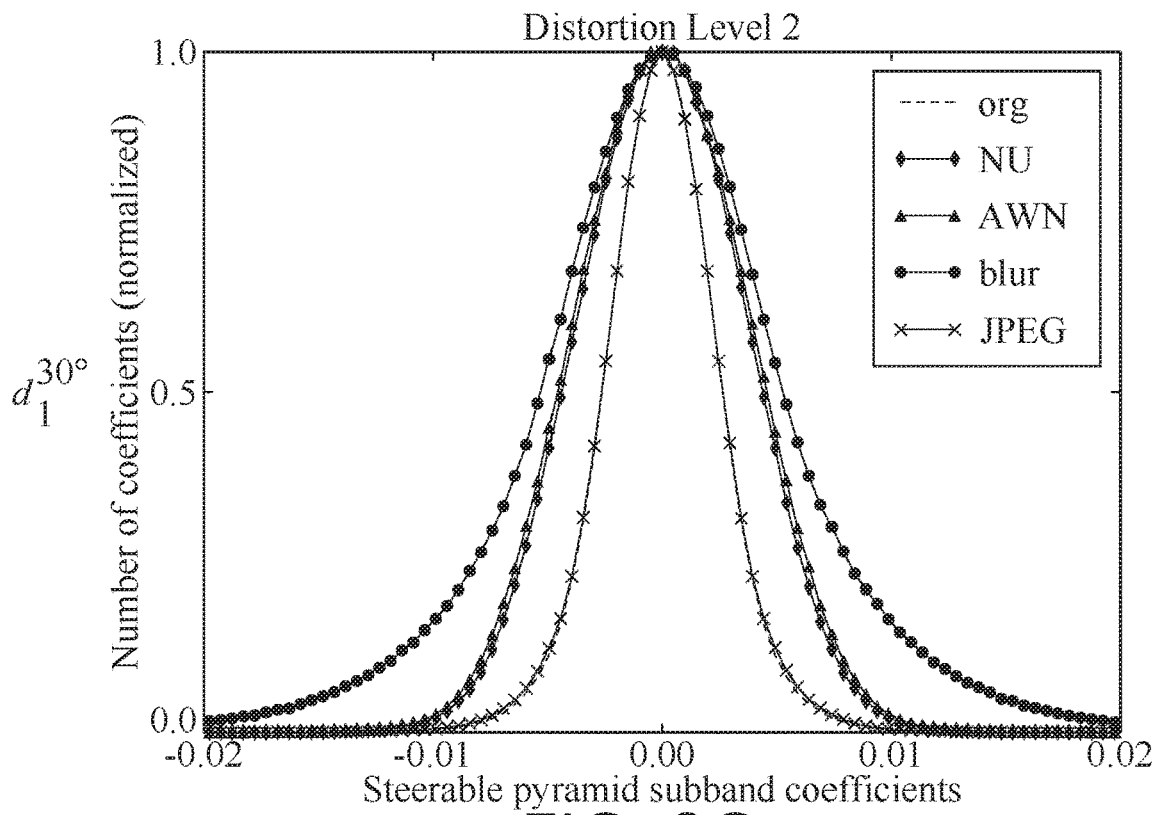
Figure 8H:
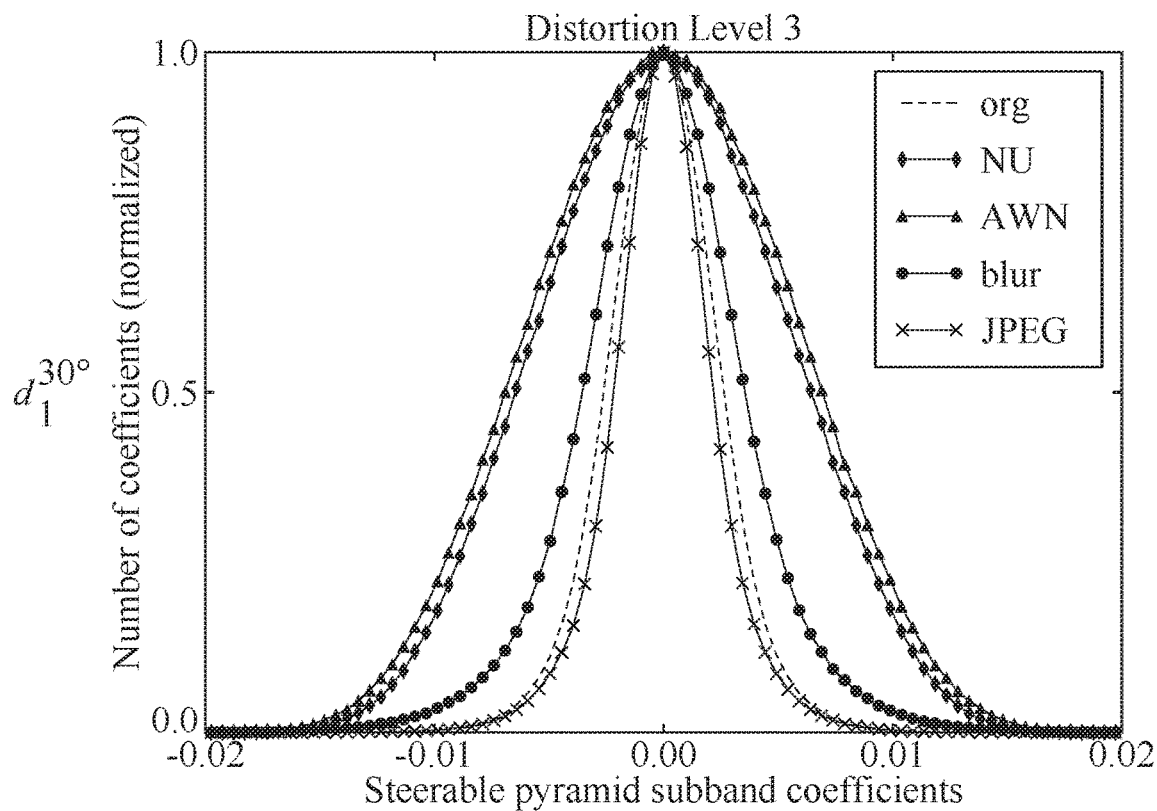
Figure 8I:
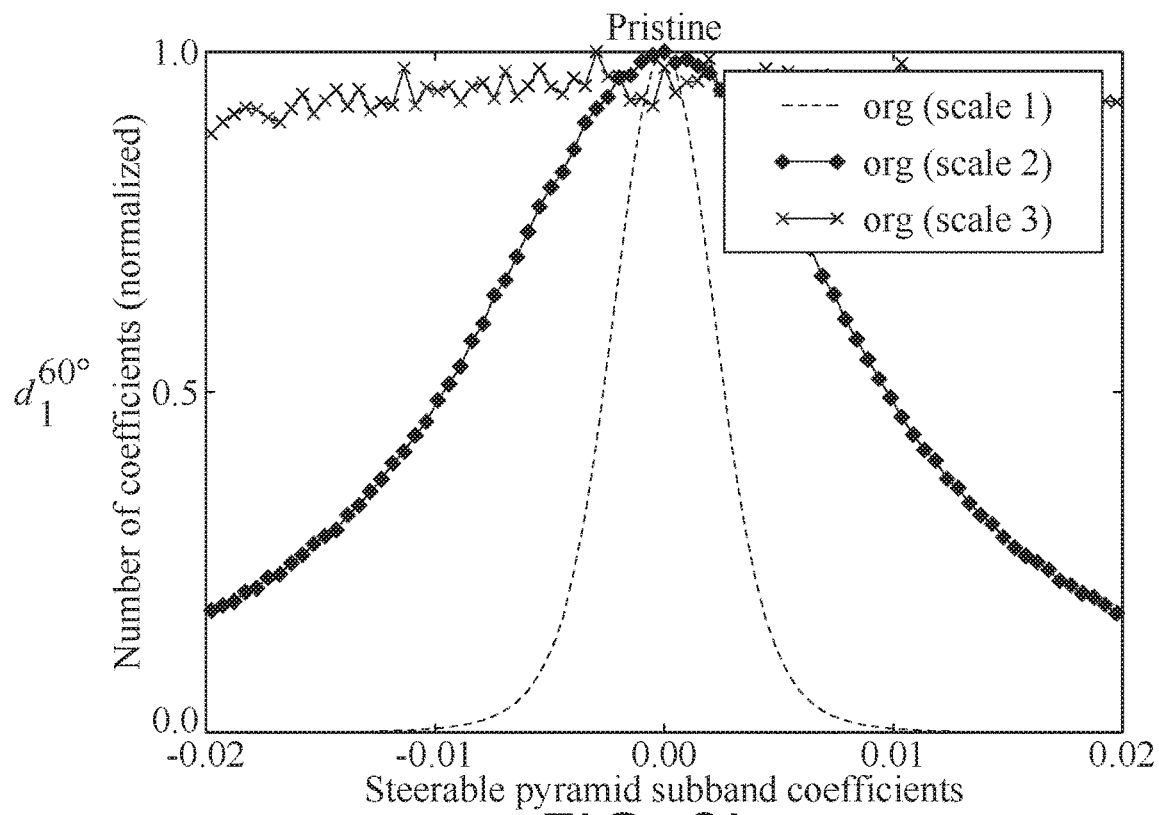
Figure 8J:
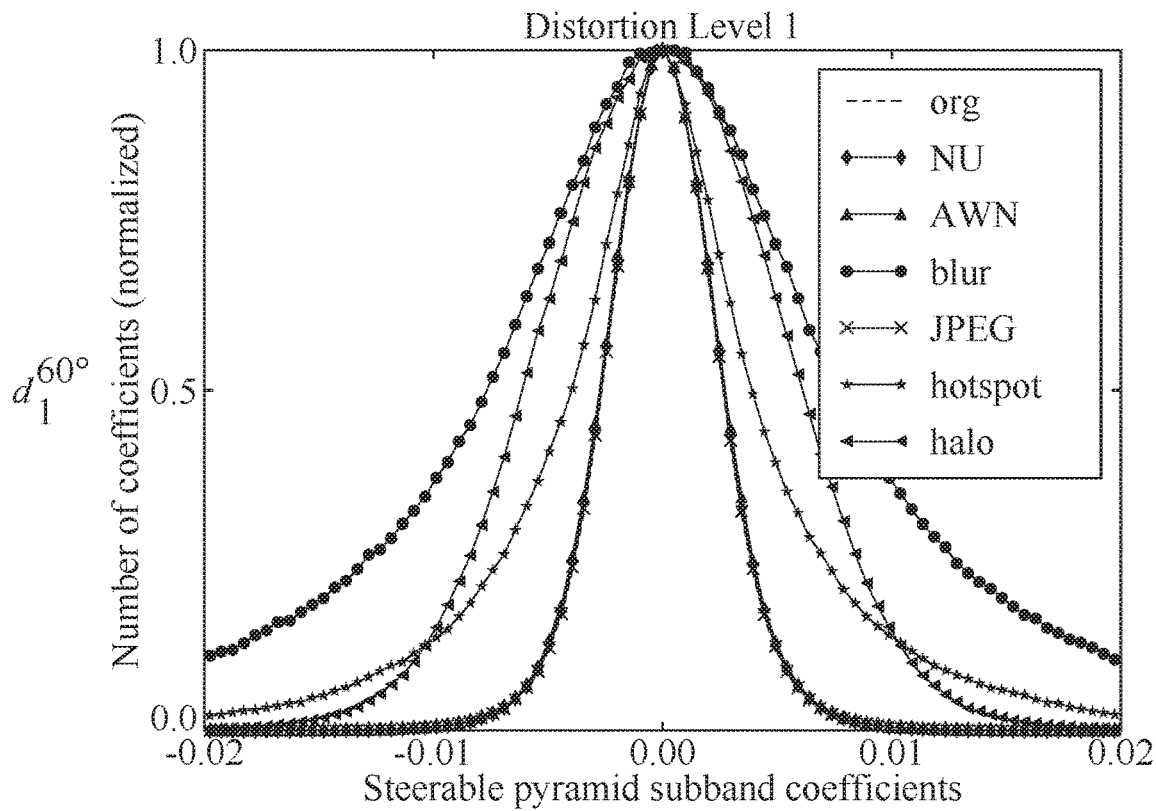
Figure 8K:
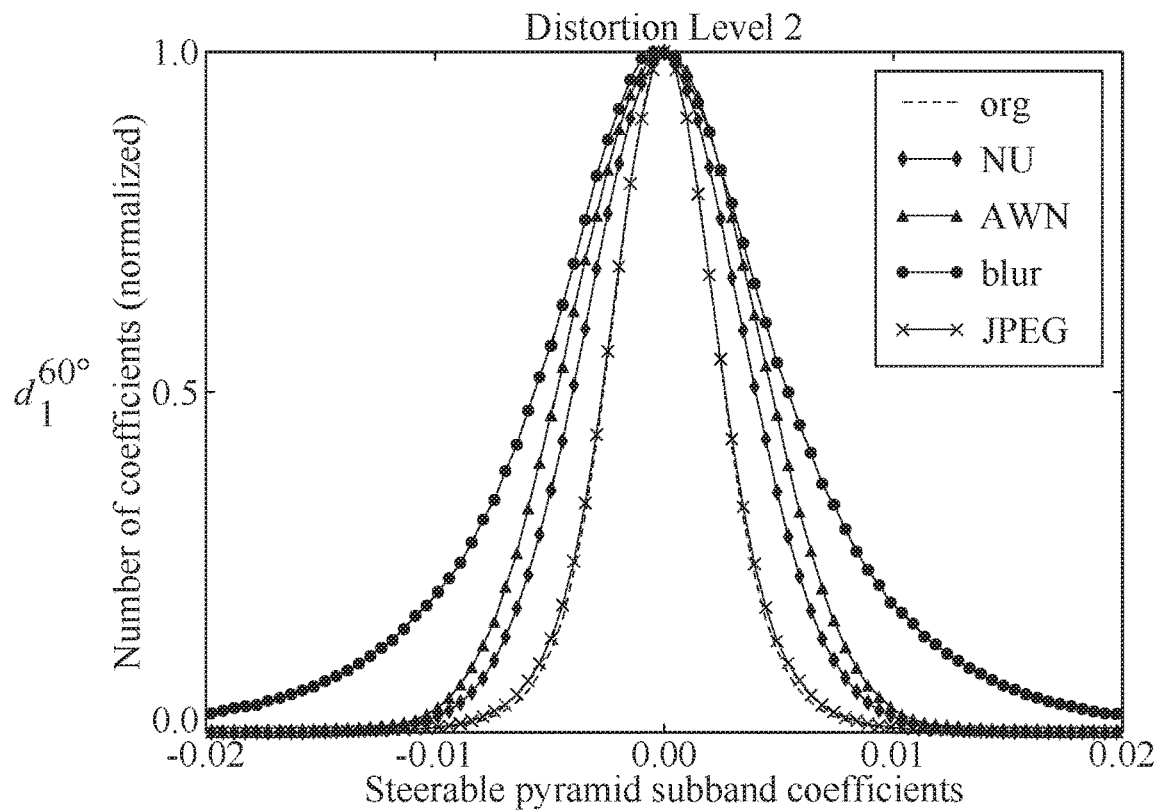
Figure 8L:
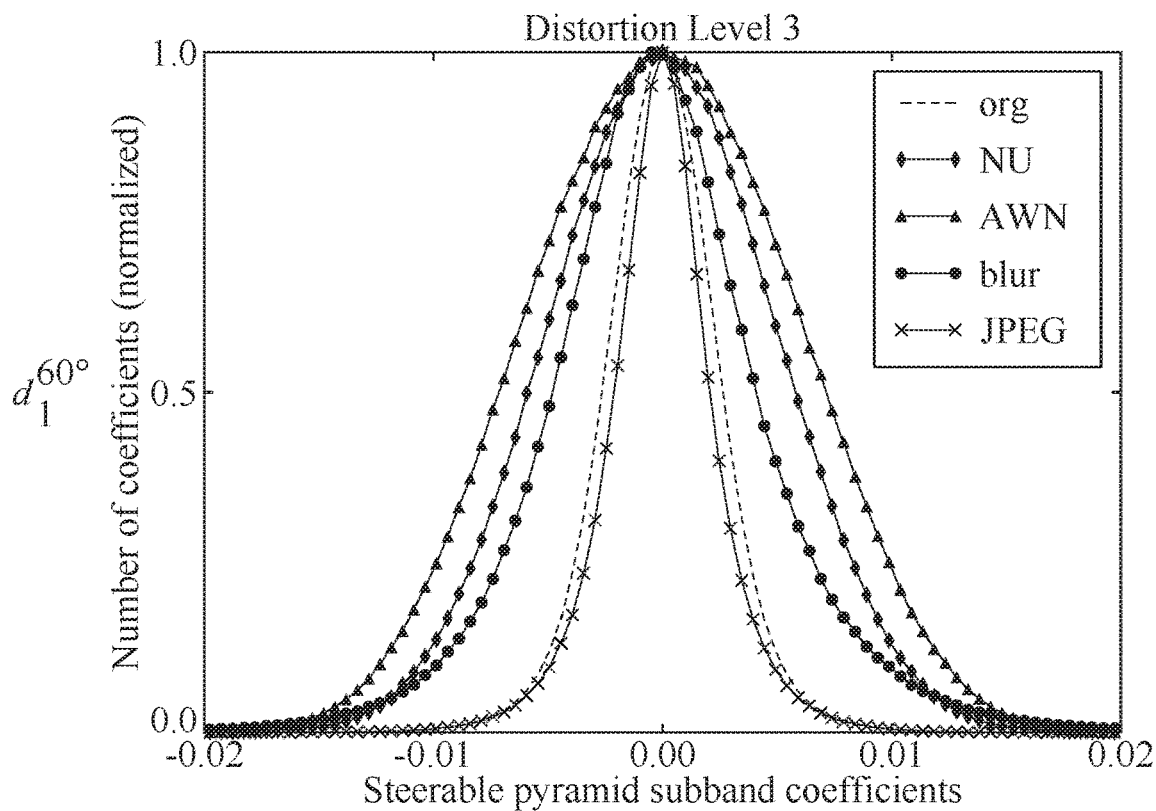
Figure 8M:
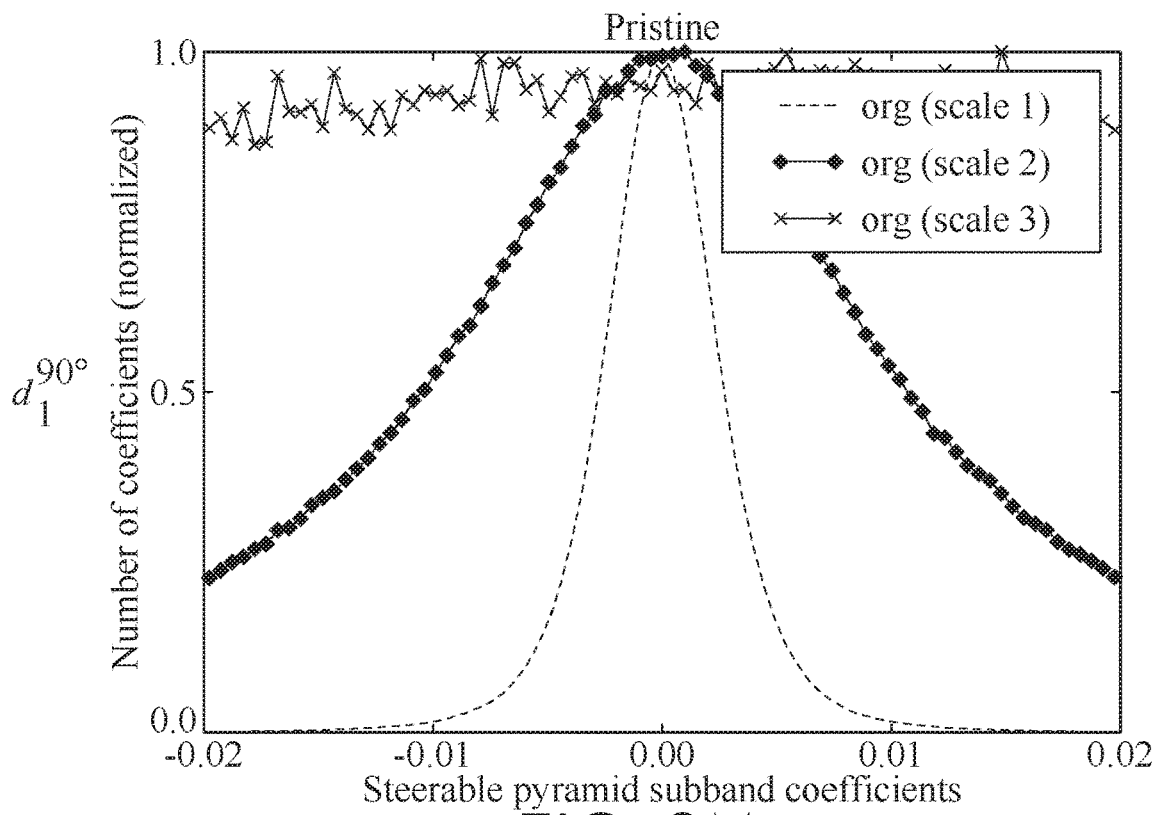
Figure 8N:
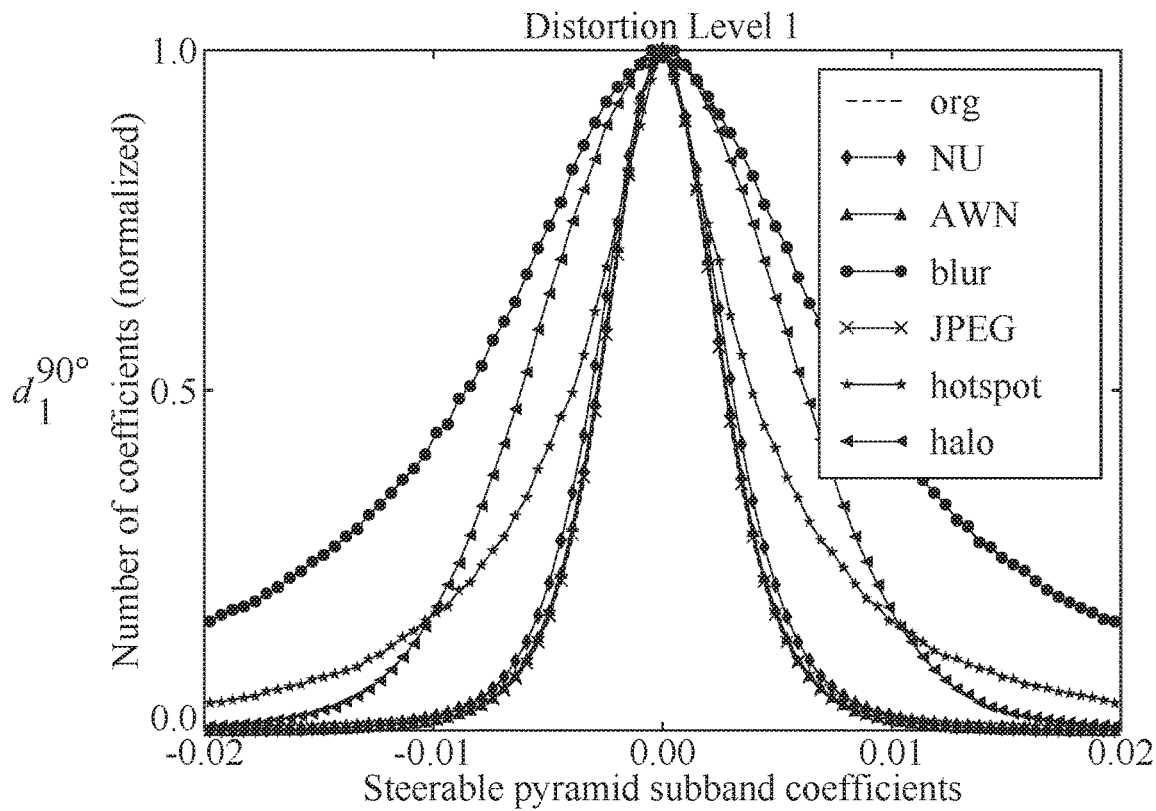
Figure 8O:
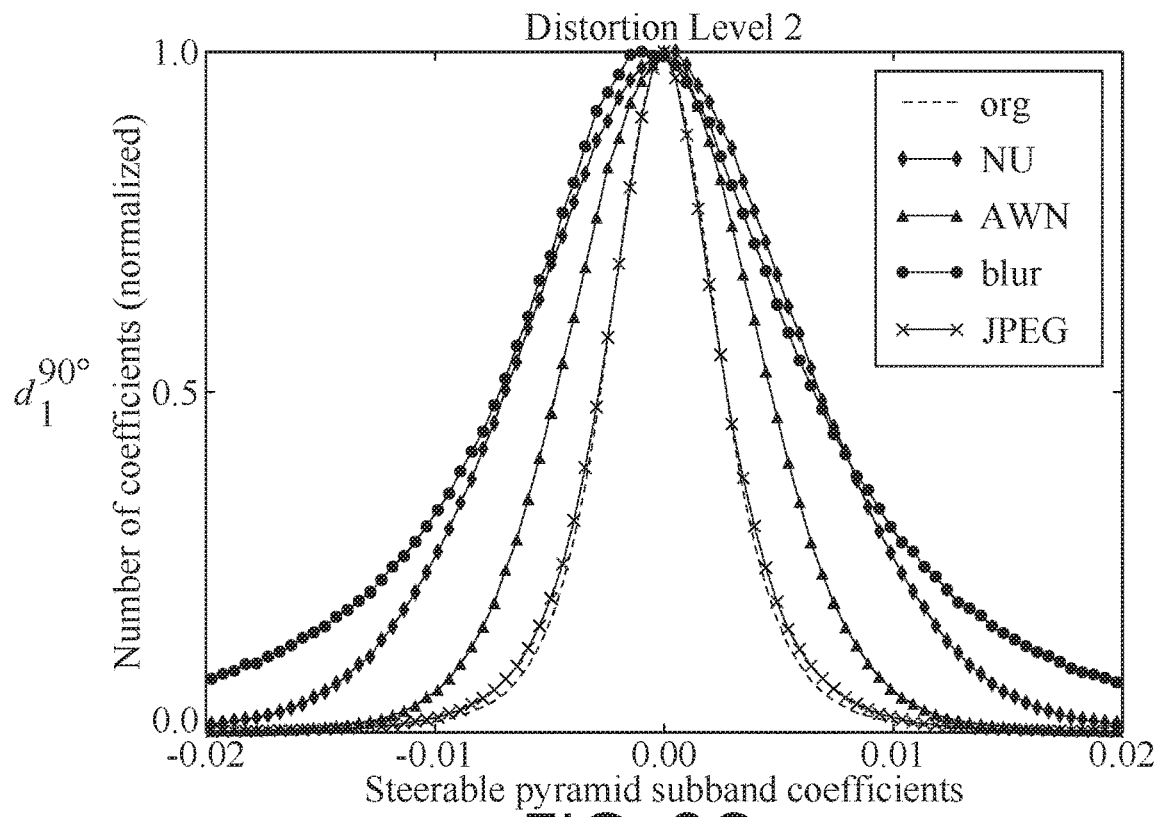
Figure 8P:
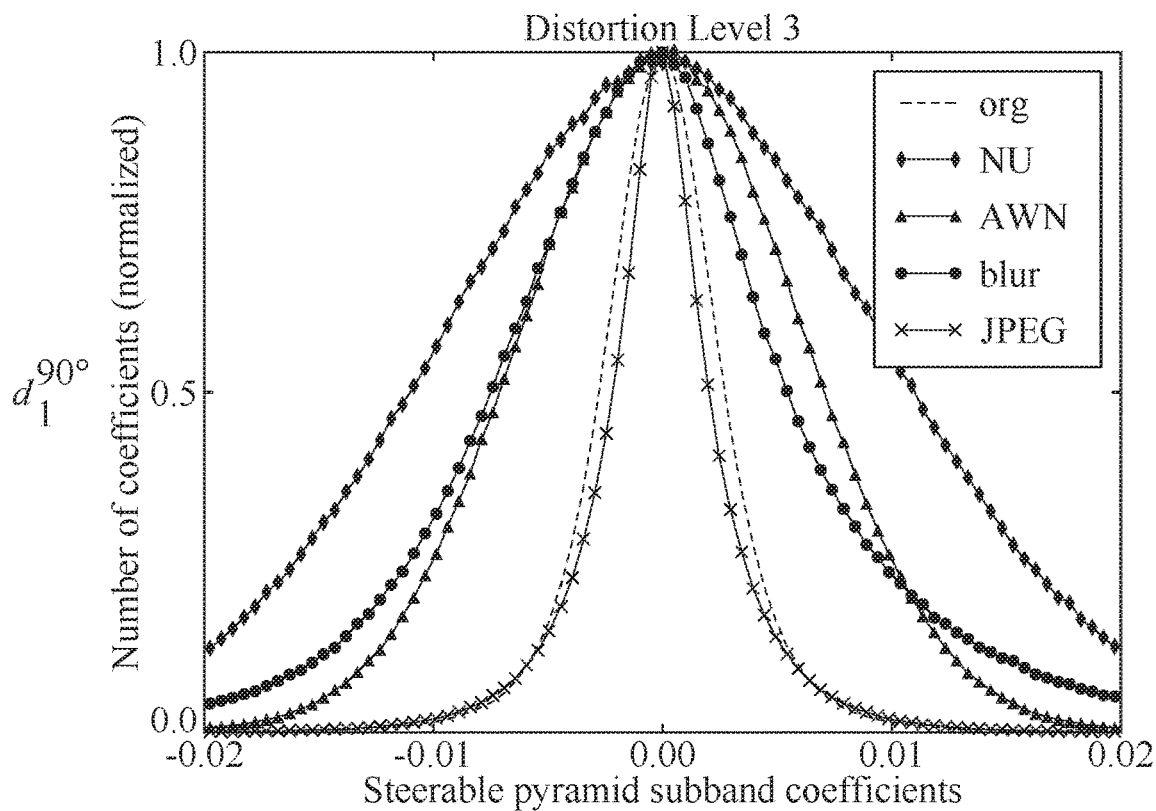
Figure 8Q:
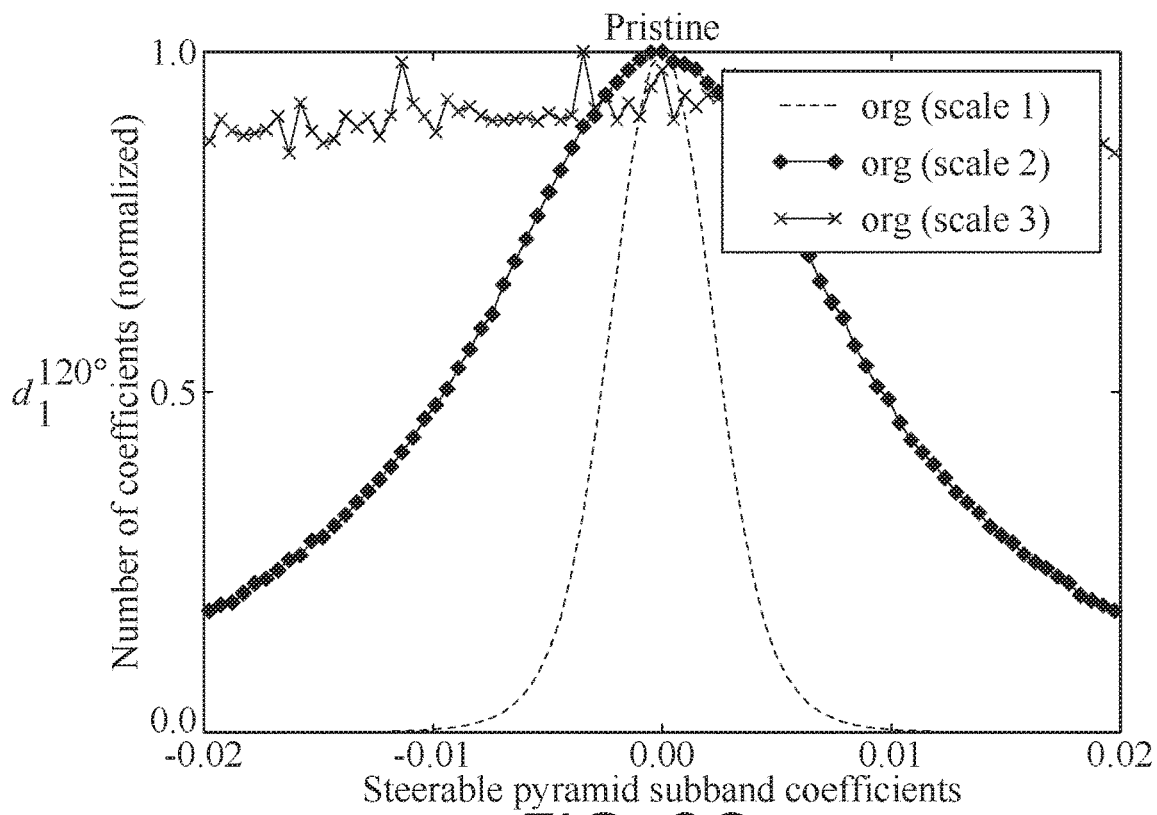
Figure 8R:
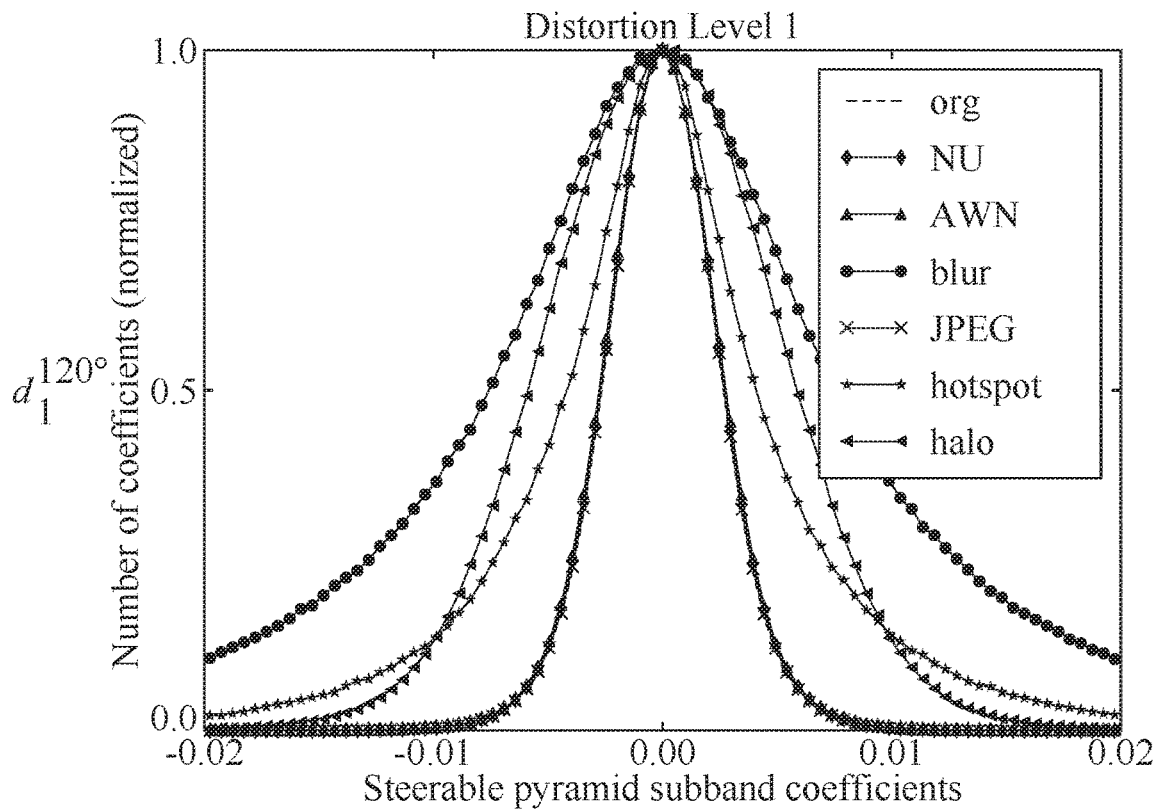
Figure 8S:
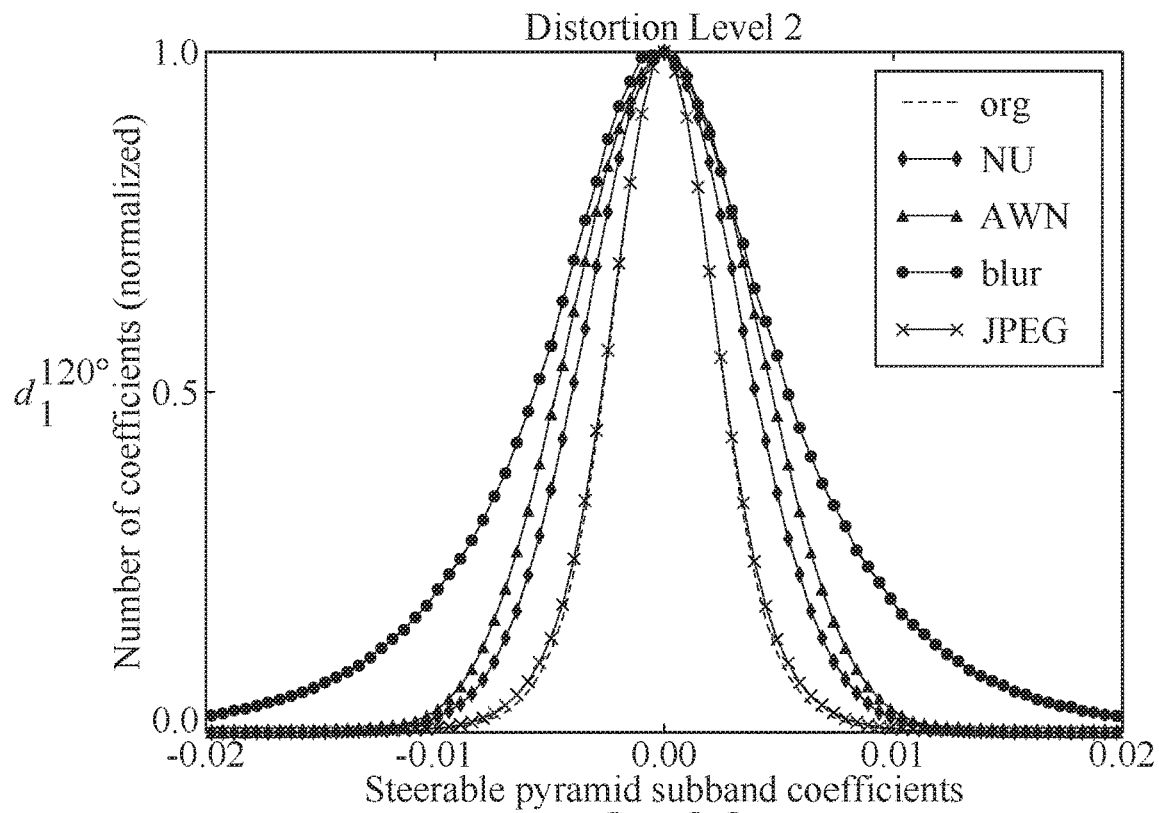
Figure 8T:
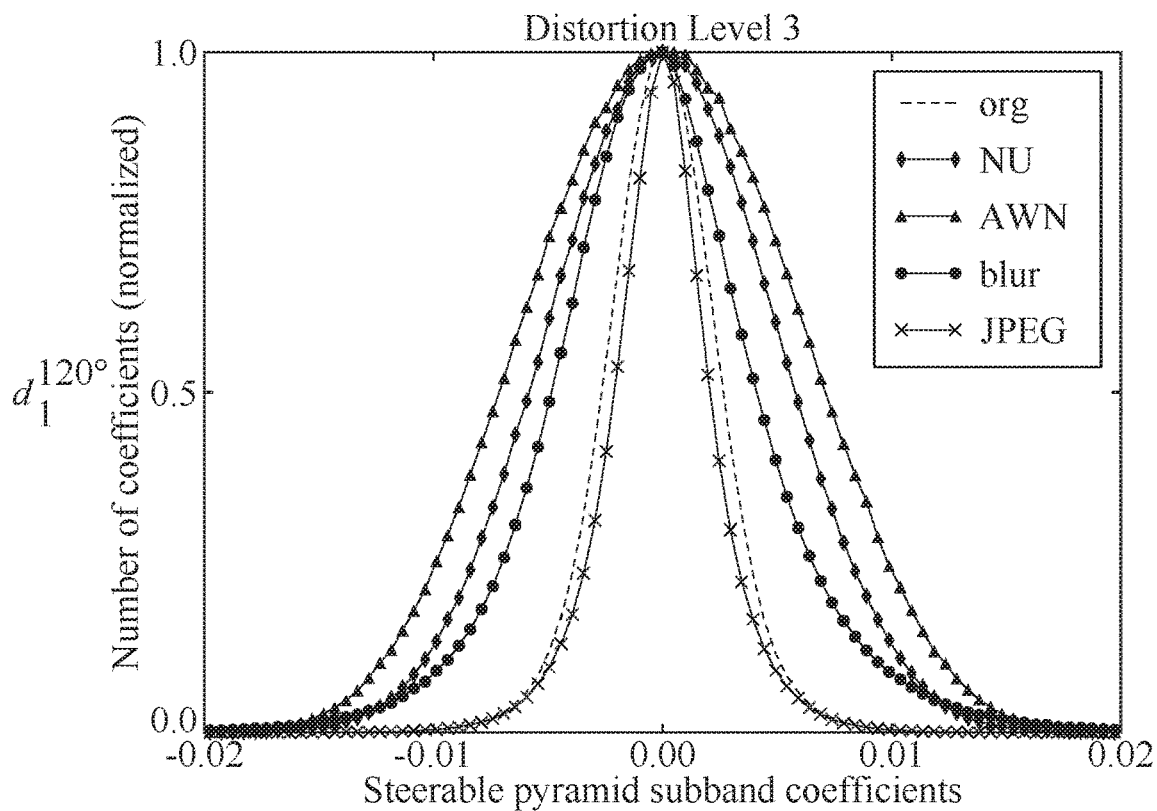
Figure 8U:
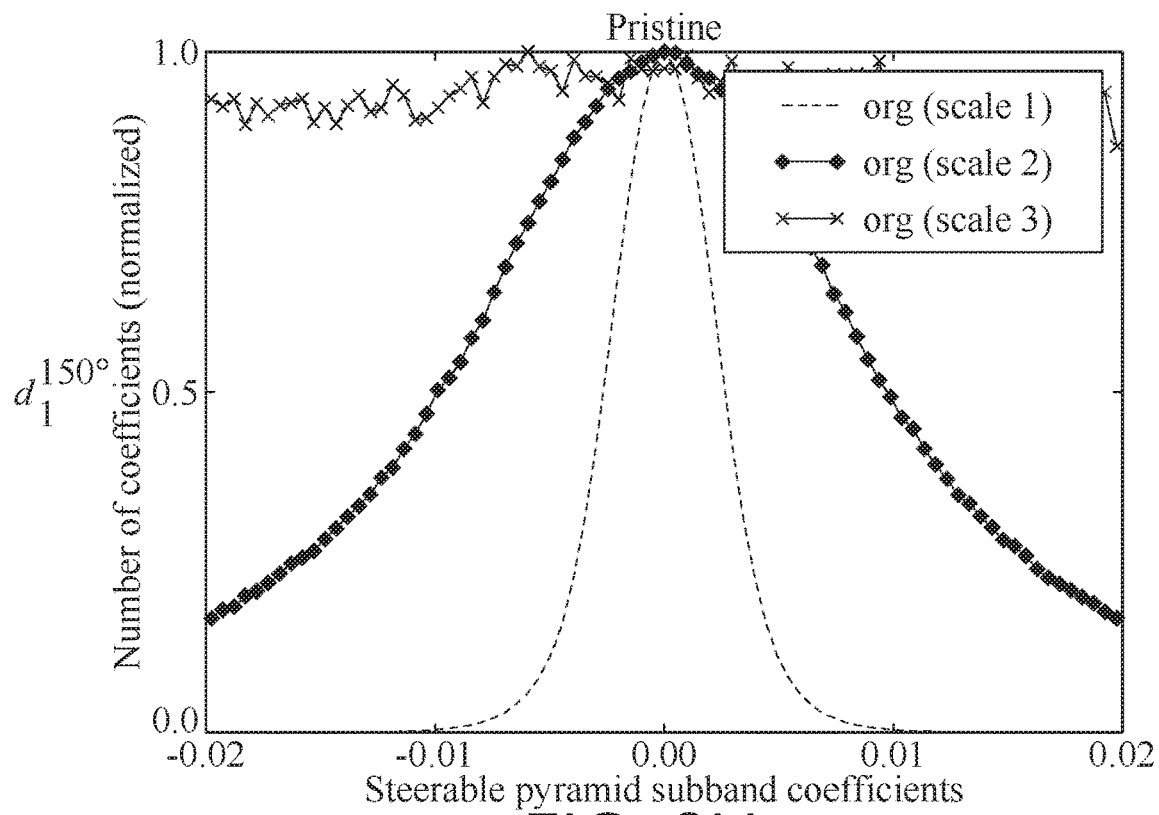
Figure 8V:
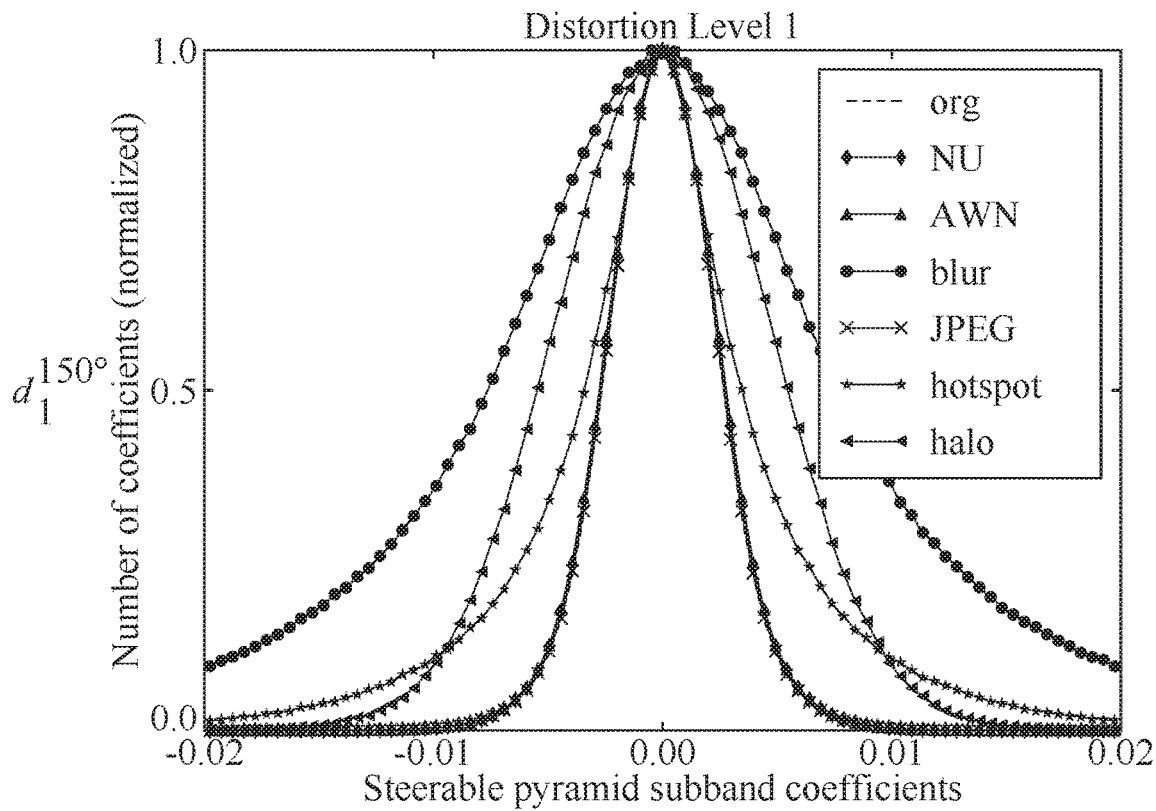
Figure 8W:
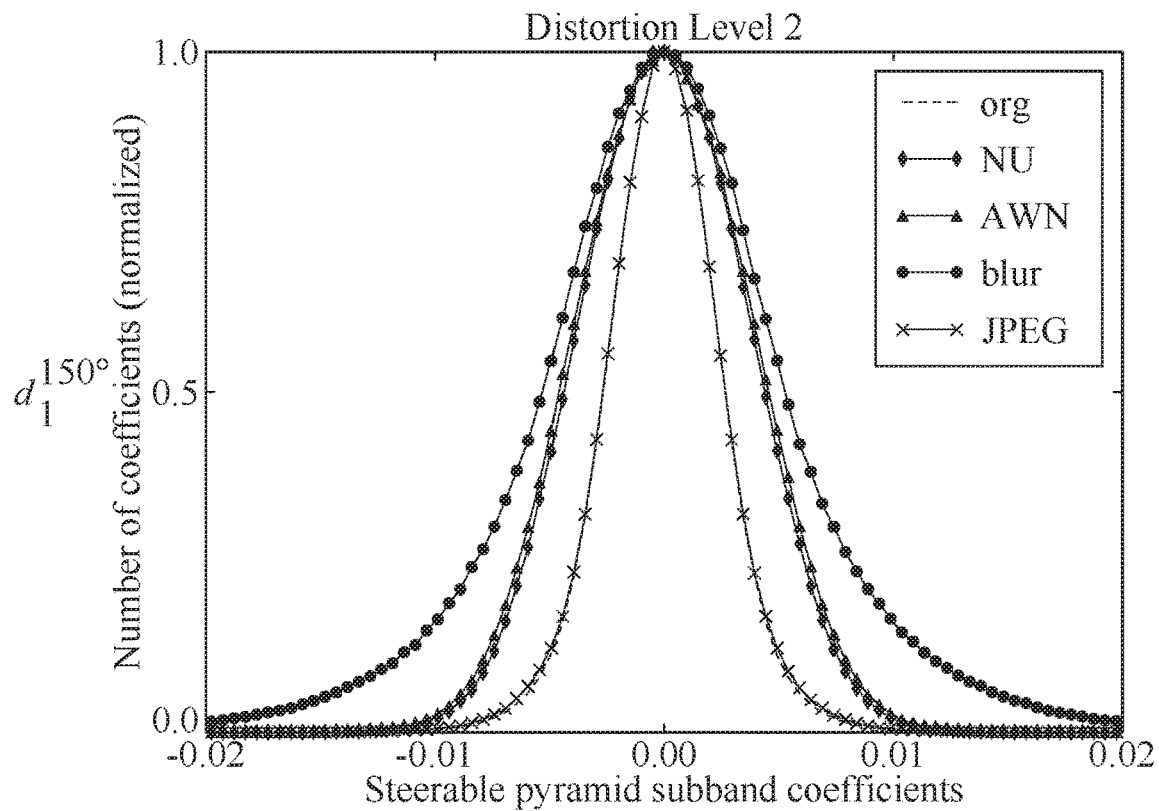
Figure 8X:
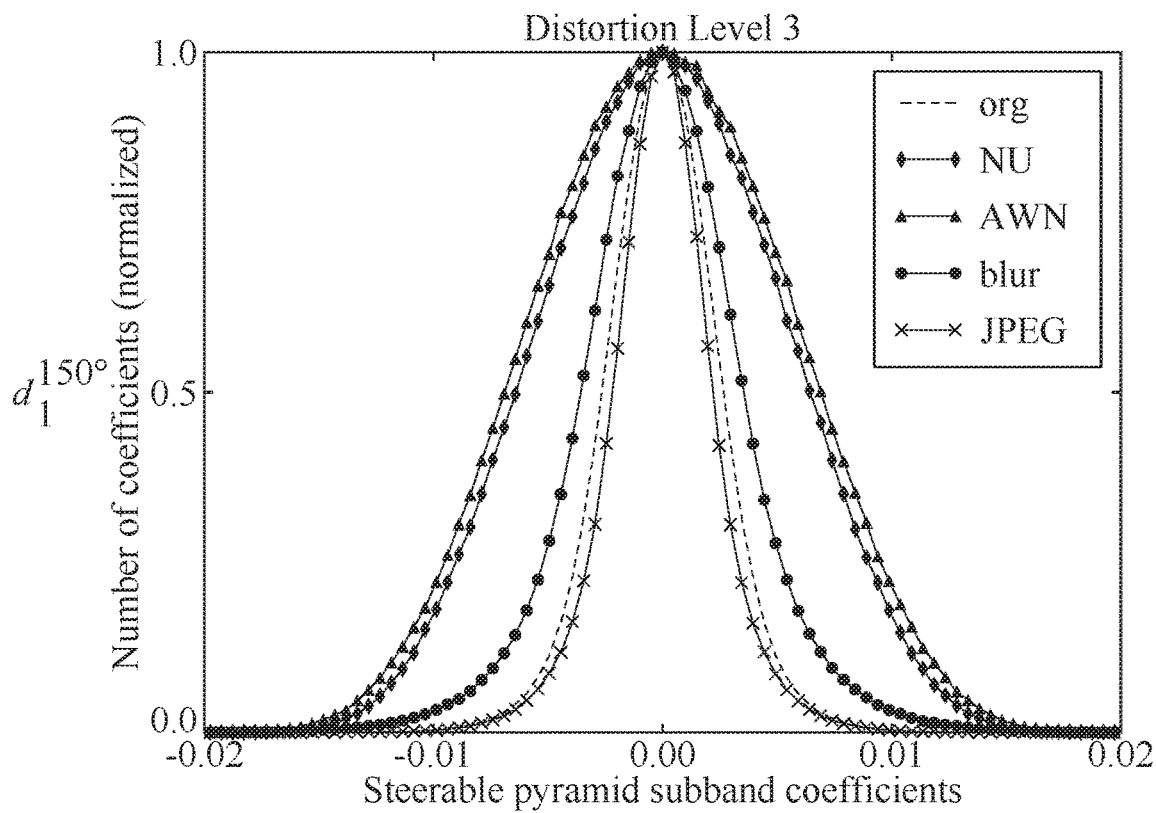

The divisively normalized steerable pyramid orientation subbands for center patches extracted from one scale and six orientations for both distortion-free and distorted images are plotted in FIGS. 8A-8X in accordance with an embodiment of the present invention. Each band is denoted $d_\alpha^\theta$ where $\alpha$ denotes the level and $\theta \in \{0°, 30°, 60°, 90°, 120°, 150°\}$.

Next is described the generative noise models used to create distorted LWIR images. A model of Non-Uniformity (NU) has been developed to artificially distort pristine images. Based on a spectral analysis of NU, the following model has been proposed:

$$|\tilde{I}(u,v)| = B_u \exp\left(\frac{-(u-u_0)^2}{2\sigma_u^2}\right) + B_v \exp\left(\frac{-(v-v_0)^2}{2\sigma_v^2}\right)$$

$$\angle \tilde{I}(u,v) \sim U[-\pi, \pi]$$

where $i$ is the Fourier Transform representation of the noise image, $B_u = B_v = 5.2$, $\sigma_u = \sigma_v = 2.5$, and where $U[a, b]$ denotes the uniform distribution on $[a, b]$. The severity of NU can be controlled by scaling the dynamic range using a standard deviation parameter $\sigma_{NU}$. Levels 1-3 of distortion were generated by setting $\sigma_{NU} = \{0.0025, 0.01375, 0.025\}$.

The marginal histograms of images distorted by NU postprocessed by MSCN, paired products, paired log-derivatives, and steerable pyramid subbands are depicted in FIGS. 5A-5D, 6A-6P, 7A-7AB and 8A-8X. These histograms match AWN behavior in MSCN histograms, appear to differ with respect to AWN asymmetrically in paired product histograms, appear distinctive in the log-derivative histograms, and have a distinctively large standard deviation in the horizontal and vertical subbands, $d_1^0$ and $d_1^{90}$, of the steerable pyramid.

The "Halo Effect" occurs naturally in the images in the OSU database. Moving objects (often people) were isolated in the images. Since not all objects extracted using this method exhibited the "Halo Effect," patches with a clear visible "Halo Effect" were isolated by hand. A total of 188 example patches were thus selected from the OSU database for use here. The marginal histograms computed from MSCN coefficients exhibit a slight skew in FIGS. 5A-5D, the paired product and paired log-derivative coefficients exhibit heavier tails in FIGS. 6A-6P and 7A-7AB, and the steerable pyramid coefficients exhibit fatter histograms as depicted in FIGS. 8A-8X. These histogram comparisons may not only reflect the "Halo Effect" in isolation since these artifacts are combined with the non-linearity associated with Ferro-Electric sensors.

Hotspots were isolated by hand from the NIST and MORRIS databases. A total of 135 hotspot patches including people, environmental hazards, and other miscellaneous objects were extracted. When comparing to the natural LWIR image histograms, the hotspot histogram shapes computed using MSCN coefficients demonstrate an asymmetry in FIGS. 5A-5D, paired product and paired log-derivative coefficients exhibit peakiness in FIGS. 6A-6P and 7A-7AB, and steerable pyramid coefficients exhibit heavier tails in FIGS. 8A-8X.

JPEG, Additive White Noise (AWN), and blur distortions were compared using the same set of images drawn from the NIST and MORRIS databases. JPEG images were generated at the 100, 90, and 80 percent quality settings corresponding to distortion levels 1, 2, and 3 producing average respective bit rates of 3.6, 1.0, and 0.5 bpp. Distortion levels involving Gaussian white noise matched the levels of NU mentioned previously for comparability, using $\sigma_{AWN}=\{0.0025, 0.01375, 0.025\}$ (recall the gray-scale range is [0, 1]). Blur was generated with a Gaussian blur kernel with scale parameters $\sigma_b=\{1, 2, 3\}$.

JPEG distortions cause the MSCN, paired product, paired log-derivative, and steerable pyramid histograms to become narrower. These same histograms for AWN become wider. Blur distortion histograms become narrower as in JPEG, with the exception of the steerable pyramid histograms.

Concerning feature models, a parametric General Gaussian Distribution (GGD) has been used to model the MSCN, paired log-derivative, and steerable pyramid subband coefficients. The associated GGD probability density function is $$f(x; \alpha, \sigma^2) = \frac{\alpha}{2\beta\Gamma(1/\alpha)} \exp\left(-\left(\frac{|x|}{\beta}\right)^\alpha\right)$$

where $$\Gamma(x) = \int_0^\infty s^{x-1} e^{-s} ds.$$

An Asymmetric Gaussian Distribution (AGGD) has been used to effectively model to the paired product coefficients. The pdf is $$f(x; v, \sigma_l^2, \sigma_r^2) = \begin{cases} \frac{v}{(\beta_l + \beta_r)\Gamma\left(\frac{1}{v}\right)} \exp\left(-\left(\frac{-x}{\beta_l}\right)^v\right) & x < 0 \\ \frac{v}{(\beta_l + \beta_r)\Gamma\left(\frac{1}{v}\right)} \exp\left(-\left(\frac{x}{\beta_r}\right)^v\right) & x \geq 0 \end{cases}$$

where $\beta_l$ and $\beta_r$ are given by $$\beta_l = \sigma_l \sqrt{\frac{\Gamma\left(\frac{1}{v}\right)}{\Gamma\left(\frac{3}{v}\right)}}$$

and $$\beta_r = \sigma_r \sqrt{\frac{\Gamma\left(\frac{1}{v}\right)}{\Gamma\left(\frac{3}{v}\right)}}$$

respectively.

The parameters ($\alpha$, $\sigma^2$) of the GGD model fit can be estimated. The parameters ($v$, $\sigma_l^2$, $\sigma_r^2$) of the AGGD model fits can be estimated using the moment matching technique. Another parameter, given by $$\eta = (\beta_r - \beta_l) \frac{\Gamma\left(\frac{2}{v}\right)}{\Gamma\left(\frac{1}{v}\right)}$$

is also computed for each product image using the estimates of the other parameters. Therefore, the best-fit model of each set of paired product coefficients yields four (4) features ($\eta$, $v$, $\sigma_l^2$, $\sigma_r^2$).

While the foregoing discusses using a Gaussian distribution, other probability distributions may be utilized by the present invention, including, but not limited to, mixture model, Laplacian distribution, Student's t-distribution, and log-normal distribution. The principles of the present invention are not to be limited in scope to the use of any particular probability distributions.

Since the hotspot images exhibit asymmetric histograms, negative and positive MSCN coefficients were measured separately. Negative and positive coefficients correspond to the left and right halves of the histograms. Therefore, four parameters ($\alpha_l$, $\sigma_l^2$, $\alpha_r$, and $\sigma_r^2$) were extracted from the MSCN coefficients. The differences in value between the left and right halves, $\alpha_r - \alpha_l$, and $\sigma_r - \sigma_l$, are used to capture the asymmetry. An overview of the MSCN (f), paired product (pp), paired log-derivative (pd), and steerable pyramid subband (sp) features is provided in Table II of FIG. 9 in accordance with an embodiment of the present invention.

Figure 10:
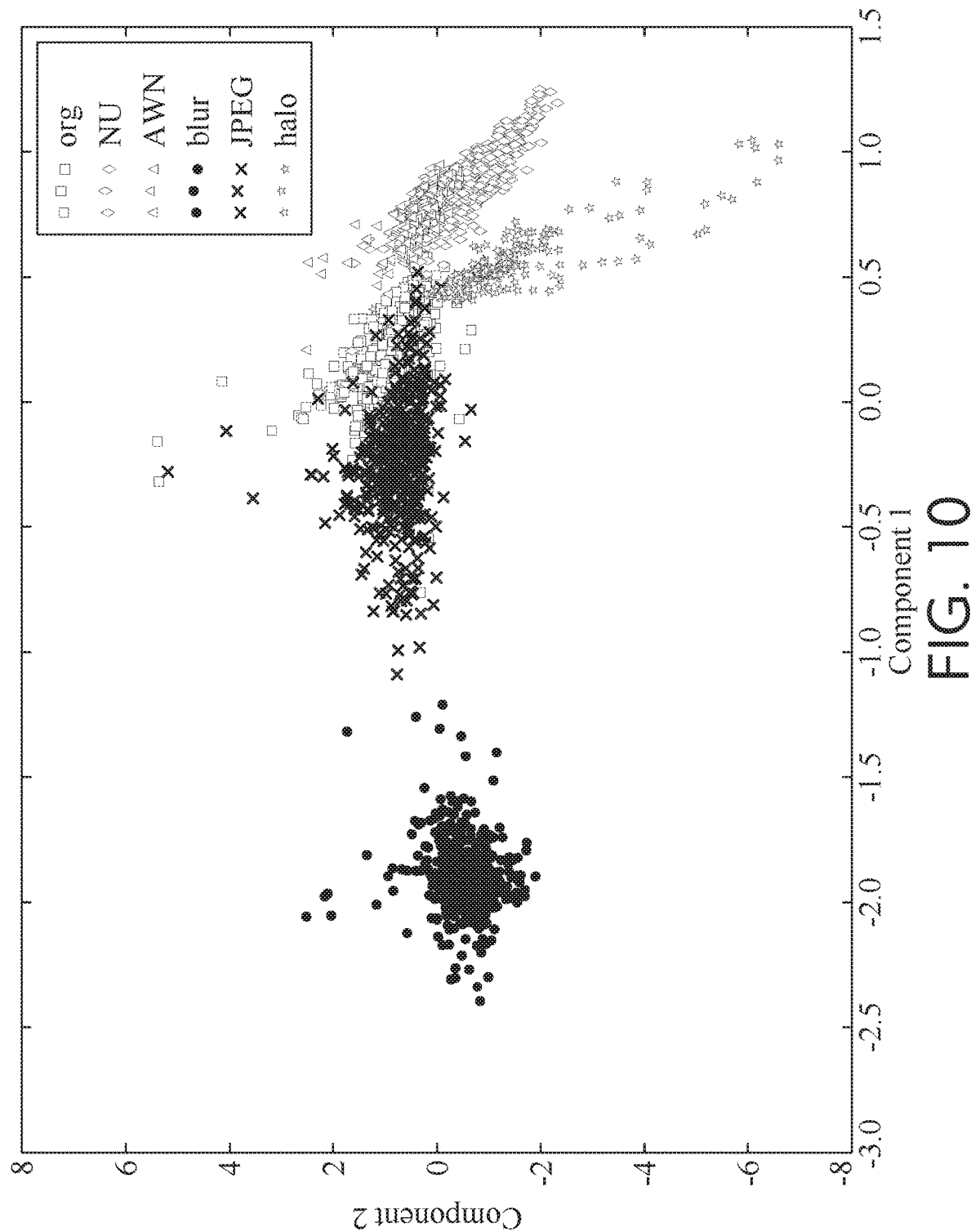
FIG. 10 illustrates the projection of the features for each distortion class into a two-dimensional space using Principle Component Analysis (PCA) in accordance with an embodiment of the present invention.
Figure 11A:
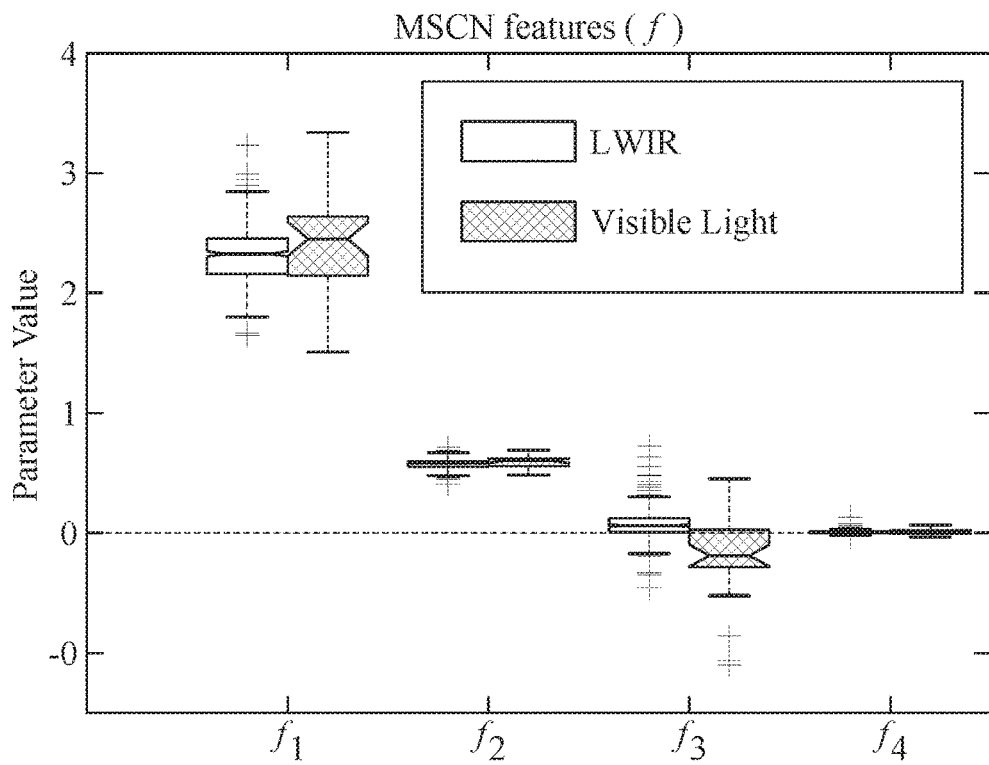
FIGS. 11A-11D are a boxplot comparing the features in Table II between pristine LWIR images and pristine visible light images in accordance with an embodiment of the present invention.
Figure 11B:
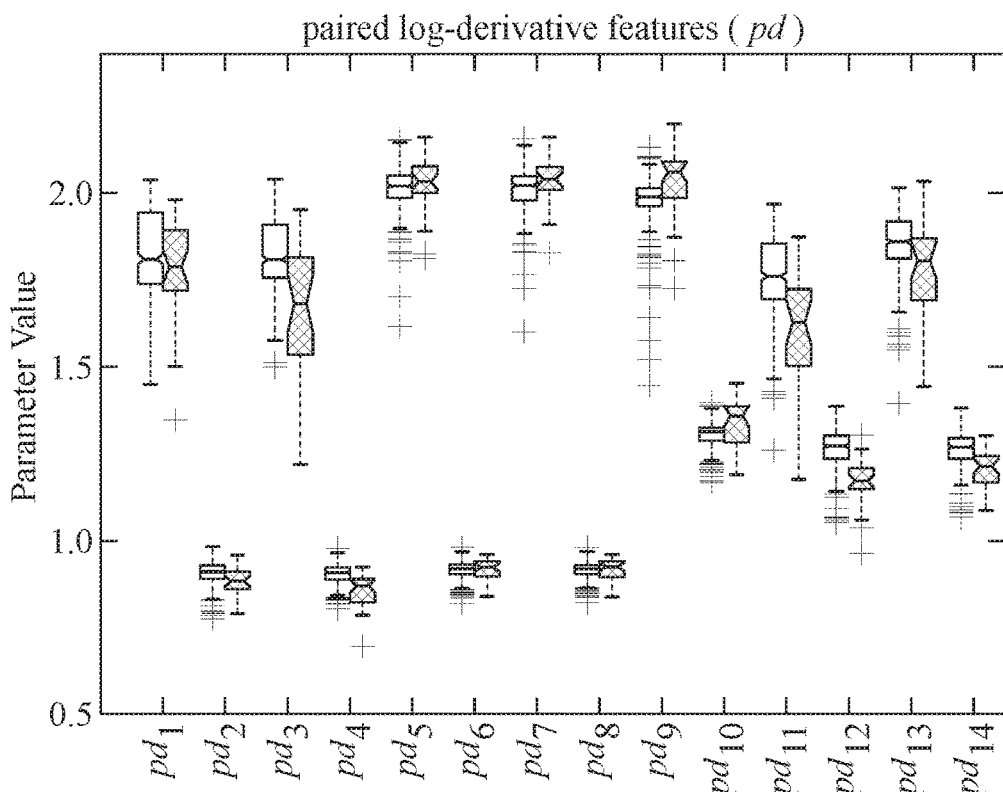
Figure 11C:
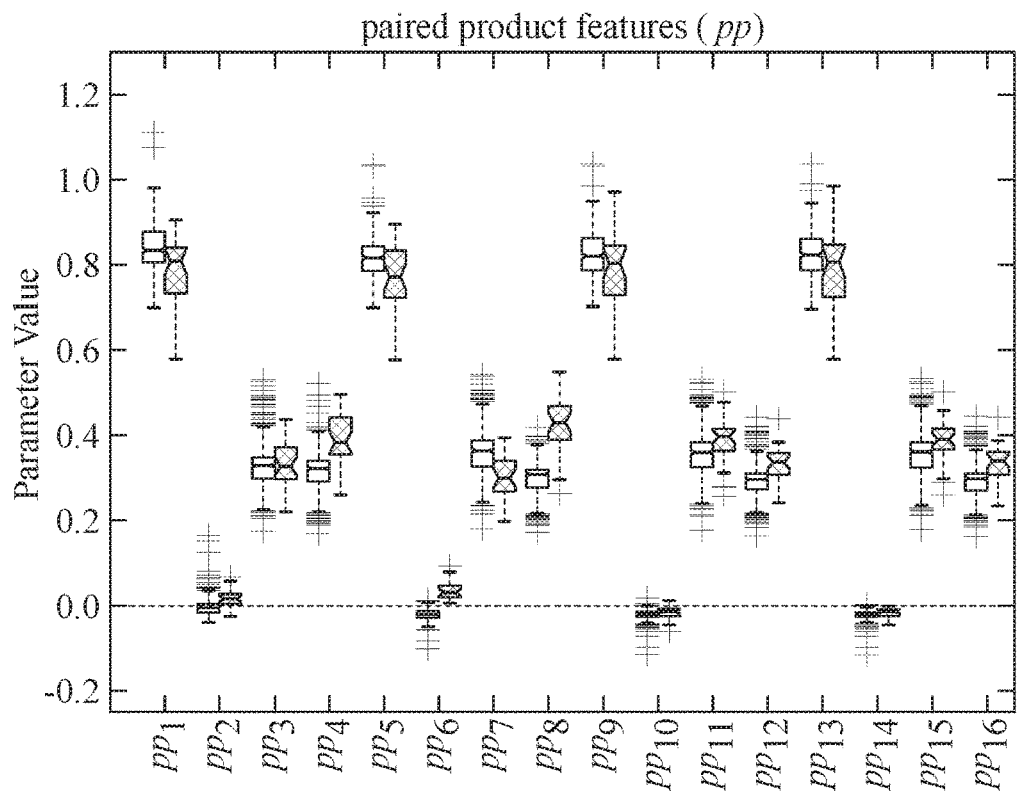
Figure 11D:
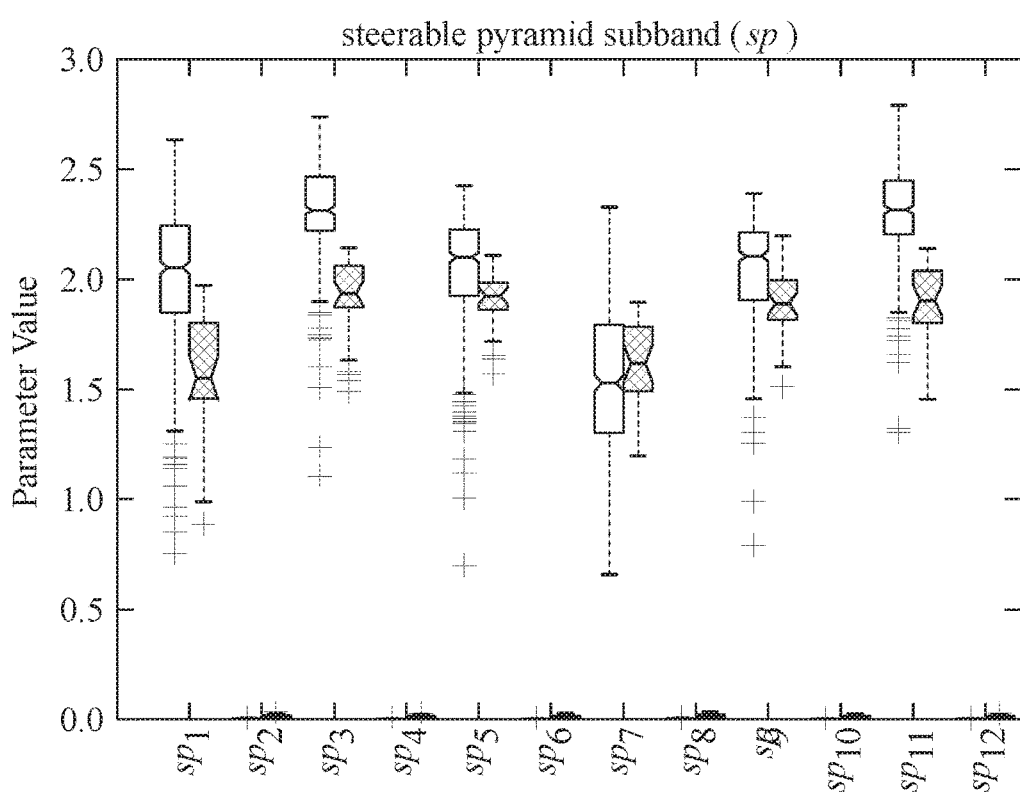

To visualize the clustering of the features over three scales, the features for each distortion class were projected into a two-dimensional space using Principle Component Analysis (PCA) as depicted in FIG. 10 in accordance with an embodiment of the present invention. The distorted images appear to cluster in this projection which reasonably preserves their class groupings.

A boxplot comparing the features in Table II of FIG. 9 between pristine LWIR images and pristine visible light images is provided in FIGS. 11A-11D in accordance with an embodiment of the present invention. A total of 29 pristine visible light images were obtained from the LIVE Image Quality Assessment Database. The MSCN shape parameter, $f_1$, is not significantly different between visible and LWIR images when using 95 percent confidence intervals. Comparing $f_3$, one can infer that LWIR images provide more symmetrically shaped MSCN histograms with 95 percent confidence.

The mean parameter η, for each of the paired product features differs between LWIR and visible light images. Additionally most of the standard deviation parameters, $σ_l$ and $σ_r$, differ between the modalities. Most shape parameters for paired products do not appear to differ between LWIR and visible light images. By contrast, most of the shapes and standard deviation parameters for pd and sp are significantly different from visible light images. Note that individual parameter differences are bound to exist by chance with a low number of pristine images, but there does seem to be a difference between the two groups overall.

A discussion regarding NIST descriptors is now deemed appropriate.

Previous work by NIST has produced four Image Quality Indicators (IQIs) which are described as Brightness (B), Contrast (C), Spatial Resolution (SR), and Non-Uniformity (($\widehat{NU}$)) defined as B is the average of the luminosity intensities:

$$B = \frac{1}{MN} \sum_{i \in N} \sum_{j \in M} I(i, j)$$

C is defined as RMS contrast $$C = \sqrt{\frac{1}{MN} \sum_{i \in N} \sum_{j \in M} (I(i, j) - B)^2}$$

SR (cycles/pixel) is computed by $$SR = \int_0^{f_c} (MTF_{curve}(u) - NEM) du$$

where $MTF_{curve}(u)$ is the modulation transfer function defined by the Butterworth filter $$\tilde{H}(u) = 1 \bigg/ \left(1 + \left(\frac{u}{W_n}\right)^4\right)$$

of order 2. The cutoff frequency is $$f_c = W_n[(1-NEM)/NEM]^{0.25}$$

where NEM=0.02861 is the Noise Equivalent Modulation. $\widehat{NU}$ is given by $\widehat{NU} = μ/σ = B/C$, the SNR of the image.

As currently defined, the SR statistic, which depends directly on the parameter $W_n$, is not implementable. This dependency on $W_n$ assumes that any loss of spatial resolution can be modeled based on the response of a Butterworth filter. The log of the radial spectral power of LWIR images can be well described as following a GGD probability law. Unfortunately, this fit does not generalize when distortions are present in an image, thus a 10th order polynomial approximation was used to yield a much better fit. Overall, the IQIs provide a total of 13 features that are extracted from each image. Unlike the other features, the IQI features are not model based, but rather are sample statistics.

The practical usefulness of the LWIR NSS and IQI features for solving five different visual LWIR tasks are studied. First, the features to develop a measure of NU on LWIR images are used. Second, a method to determine presence of the "Halo Effect" is devised. The third task is automated prediction of the ability of human experts to detect targets of interest on LWIR images. Fourth, a human study is described to obtain subjective quality scores on LWIR images, and show that the NSS features are highly predictive of subjective image quality. Lastly, it will be shown how the LWIR NSS can be used to create localized distortion maps which can aid the identification of local distortions, such as hotspots and occurrences of the "Halo Effect."

With respect to measuring NU, in NUC algorithms, producing a no-reference estimate of the NU in an image is essential. State-of-the-art methods for estimating the magnitude of NU include the Roughness index, Effective Roughness Index, and SNR. LWIR images commonly contain both fixed pattern noise and additive white noise, and the level of both types of noise should be estimated.

The most common method for estimating NU is the spatial SNR of the image defined as $μ/σ$ where $σ$ and $μ$ are the standard deviation and mean pixel intensities, respectively, within a user-defined area. Another common and popular method is the Roughness index:

$$Ro(I) = \frac{\|h_1 * I\|_1 + \|h_2 * I\|_1}{\|I\|_1}$$

where $h_1$ is the 1=D differencing filter with impulse response [1, -1], $h_2 = h_1^T$, and $\|\bullet\|$ is the $L_1$ norm. The Effective Roughness index:

$$ERo(I) = Ro(g*I)$$

where g is a high-pass filter, with the additional modification that the $L_2$ norm is used in place of the $L_1$ norm.

Two weaknesses of current NU estimation approaches are their inability to capture spatial structure and assumption of grid-like patterns of FPN, which, in reality, can often be striping. Additionally, these approaches generally assume that NU is the only distortion within the image. Often, other noise is present that can seriously hinder effectiveness in estimating NU.

A new approach that has been devised herein to measure the performance of a NUC algorithm that utilizes the proposed NSS features listed in Table II of FIG. 9 is discussed below in connection with FIG. 12. It has been found that these features are capable of capturing the type of NU, the magnitude of that NU, and the amount of Gaussian white noise that is present.

Figure 12:
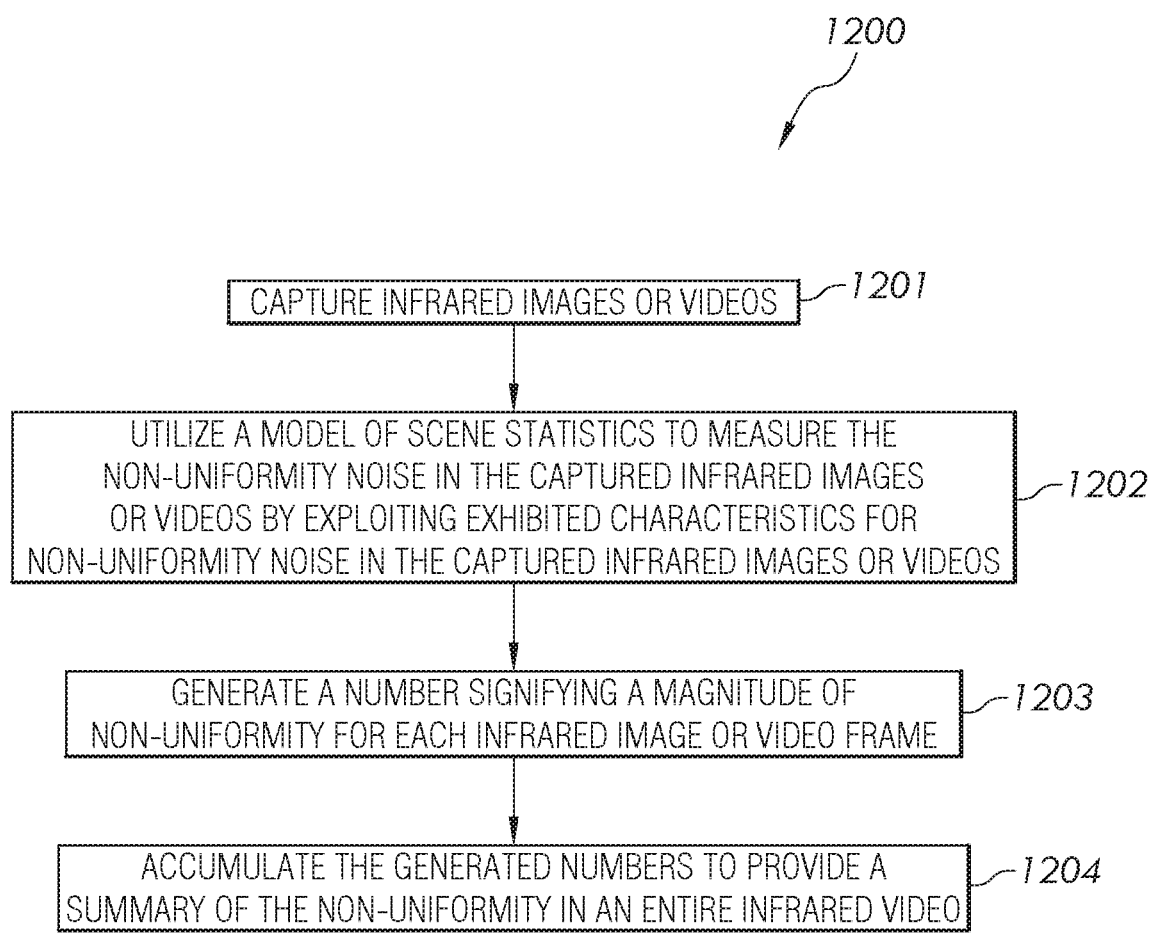
FIG. 12 is a flowchart of a method for measuring non-uniformity noise produced in infrared images or videos in accordance with an embodiment of the present invention.

FIG. 12 is a flowchart of a method 1200 for measuring non-uniformity noise produced in infrared images or videos in accordance with an embodiment of the present invention.

Referring to FIG. 12, in conjunction with FIGS. 1-4, 5A-5D, 6A-6P, 7A-7AB, 8A-8X, 9-10 and 11A-11D, in step 1201, computing device 100 captures the infrared images or videos.

In step 1202, computing device 100 utilizes a model of a scene statistics (e.g., natural scene statistics) to measure the non-uniformity noise in the captured infrared images or videos by exploiting exhibited characteristics (e.g., shape, variance) for non-uniformity noise in the captured infrared images or videos. "Scene statistics," as used herein, refer to a statistical model of pictures, images or videos representative of pictures, images or videos, respectively, that are captured of the physical world. A "model," as used herein, refers to a statistical model that describes a set of probability distributions.

In step 1203, computing device 100 generates a number signifying a magnitude of non-uniformity for each infrared image or video frame.

In step 1204, computing device 100 accumulates the generated numbers to provide a summary of the non-uniformity in an entire infrared video.

While the foregoing discusses the present invention in connection with measuring non-uniformity noise produced in infrared images or videos, the principles of the present invention may measure non-uniformity noise produced in other types of images or videos, such as but not limited to, X-ray images or videos, magnetic resonance imaging images or videos, millimeter wave images or videos and visible light images or videos.

A detailed discussion regarding method 1200 is provided below.

To compare existing NU estimation techniques, the images in the MORRIS and NIST databases were degraded by taking two samples $\sigma_{NU}, \sigma_{AWN} \in U[0.025, 0.0025]$ where $\sigma_{NU}$ and $\sigma_{AWN}$ are the standard deviations of the non-uniformity and additive white noise, respectively. Three categories of degradations were produced, those with just NU distortions, those with AWN distortions, and those with combined NU and AWN distortions. The two types of noise are thus independently embedded into the signal.

Using these three sets of degraded images, the performances of the state-of-the-art NU metrics were compared. A Support Vector Regressor (SVR) was used to map the features to independently predict NU and AWN on each image. The images in each set were split into non-overlapping subsets: 80 percent for training, and 20 percent for testing. The Spearman's Rank Correlation Coefficient (SRCC) was used as a measure of non-linear monotonicity between the actual and predicted values, and (Pearson's) linear correlation coefficient (LCC) was used as a measure of linear correlation between actual and predicted values. Random 80/20 splits were produced and reported in Tables III and IV of FIGS. 13 and 14. Table III of FIG. 13 shows the correlation between the actual and predicted white noise variance in images with and without background NU distortion in accordance with an embodiment of the present invention. Table IV of FIG. 14 shows the correlation between actual and predicted NU magnitude in images with and without presence of background AWN distortion in accordance with an embodiment of the present invention.

As can be seen from Table III of FIG. 13, each of the NSS feature groups, f pp, pd, and sp, produce better predictors of AWN both with and without presence of NU as compared to Ro, ERo, and the IQIs. Combinations among these NSS feature groups do not increase predictor accuracy by much. In Table IV of FIG. 14, each NSS feature group again produces better predictors of NU both with and without presence of AWN as compared to Ro, ERo, and the IQIs. The f group which does not measure directionality performs several percentage points lower than the other groups, pp, pd, and sp, which do. Comparing each of the previous methods, Ro, ERo, and the IQIs using Table III of FIG. 13, note a large difference between conditions with and without presence of background NU distortion. Similarly, Table IV of FIG. 14 indicates that these methods have low performance when detecting the amount of NU even without background distortion. ERo using the $L_2$ norm performs better than the other previous methods, but it is still heavily influenced by the level of background noise present in the image signal. It is important to note that the IQIs have almost no correlation with the amount of NU distortion present for this test, and they were a mediocre predictor of the presence of white noise.

Figure 15:
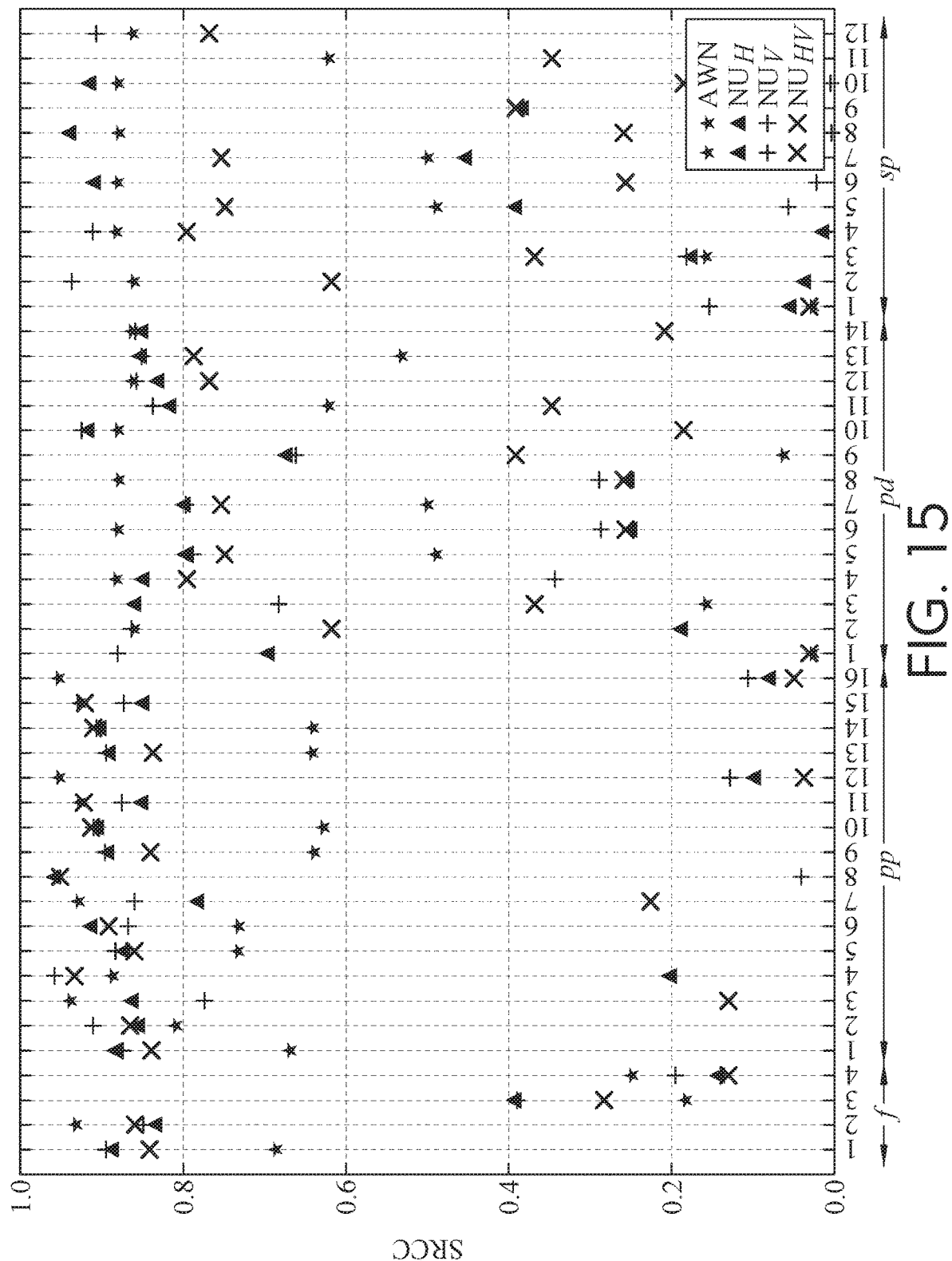
FIG. 15 illustrates the Spearman's Rank Correlation Coefficient (SRCC) of features against two isolated distortions in accordance with an embodiment of the present invention.
Figure 16:
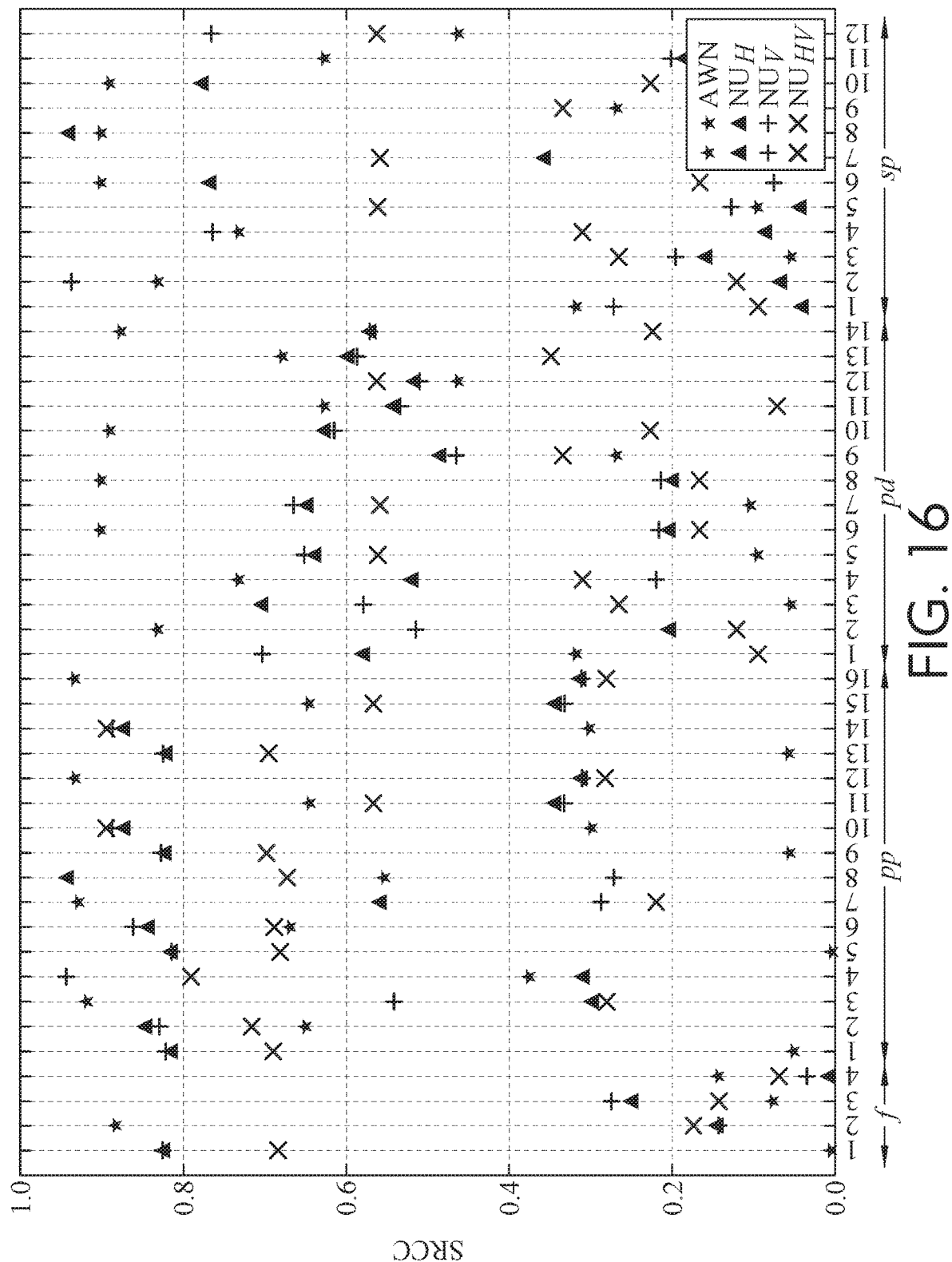
FIG. 16 depicts the SRCC of each feature with the amount of NU and AWN in images without background distortion in accordance with an embodiment of the present invention.

FIG. 15 depicts the SRCC of each feature with the amount of NU and AWN in images without background distortion in accordance with an embodiment of the present invention. FIG. 16 depicts the SRCC as in FIG. 15, but with background distortion in accordance with an embodiment of the present invention. For AWN alone, the standard deviation feature, $f_2$, produced the highest correlation, whereas, the asymmetry features, $f_3$ and $f_4$, did not correlate well with the listed distortions. With the presence of background distortion, the standard deviation, $f_2$, was again the most predictive feature. For $NU_H$ and $NU_V$ with and without background distortion, the shape parameter $f_1$ was the best predictor.

Since $NU_H$ and $NU_V$ are striping effects, they are highly oriented distortions. The sp group features show significant correlation with directionality, with vertical striping effects being highly correlated with the $d_1^0$ subband standard deviation, and horizontal striping effects being highly correlated with the $d_1^{90}$ subband standard deviation. The paired product features indicate a similar oriented correlation, the horizontal paired product $\sigma_r$, $pp_4$ correlates highly with vertical striping, and the vertical paired product $\sigma_r$, $pp_5$, correlates highly with horizontal striping. This high degree of correlation between predicted and actual degree of distortion in single features is useful.

Concerning discriminating the "Halo Effect," a person-detector has been developed which uses the statistical gradients of estimated halos to enhance the detection task. To study how well the "Halo Effect" can be discriminated using the feature models of the present invention, two sets of image patches (with and without halos) were constructed using background subtraction and manual classification to develop a supervised learner. Most of the image patches were of size 110×110. A total of 415 image patches were contained in both sets, with 227 image patches being halo-free, and 188 patches containing halos.

AWN and NU distortions were applied to each patch in both sets to reduce the dependence on the correlation between "Halo Effect" and the level of other common noise distortions. Each of these 415 image patches thus contained two artificial distortions in addition to the halo effect distortions. The distortion magnitudes $\sigma_{NU}, \sigma_{AWN} \in U$ {0.0025, 0.025} were randomly sampled and used as the variance of the white noise and non-uniformity distortions for each patch. The intervals for this uniform distribution were selected to scale the distortion from a just-noticeable to a significant difference.

Given these two distorted sets, those containing halos and those without, a binary classification task was devised. As previously discussed, the dataset was split into two non-overlapping subsets: 80 percent for training and 20 percent for testing. A Support Vector Classifier (SVC) was used to map the features between two classes. Random 80/20 splits were produced and classified with associated class probability estimates 1,000 times.

Figure 17:
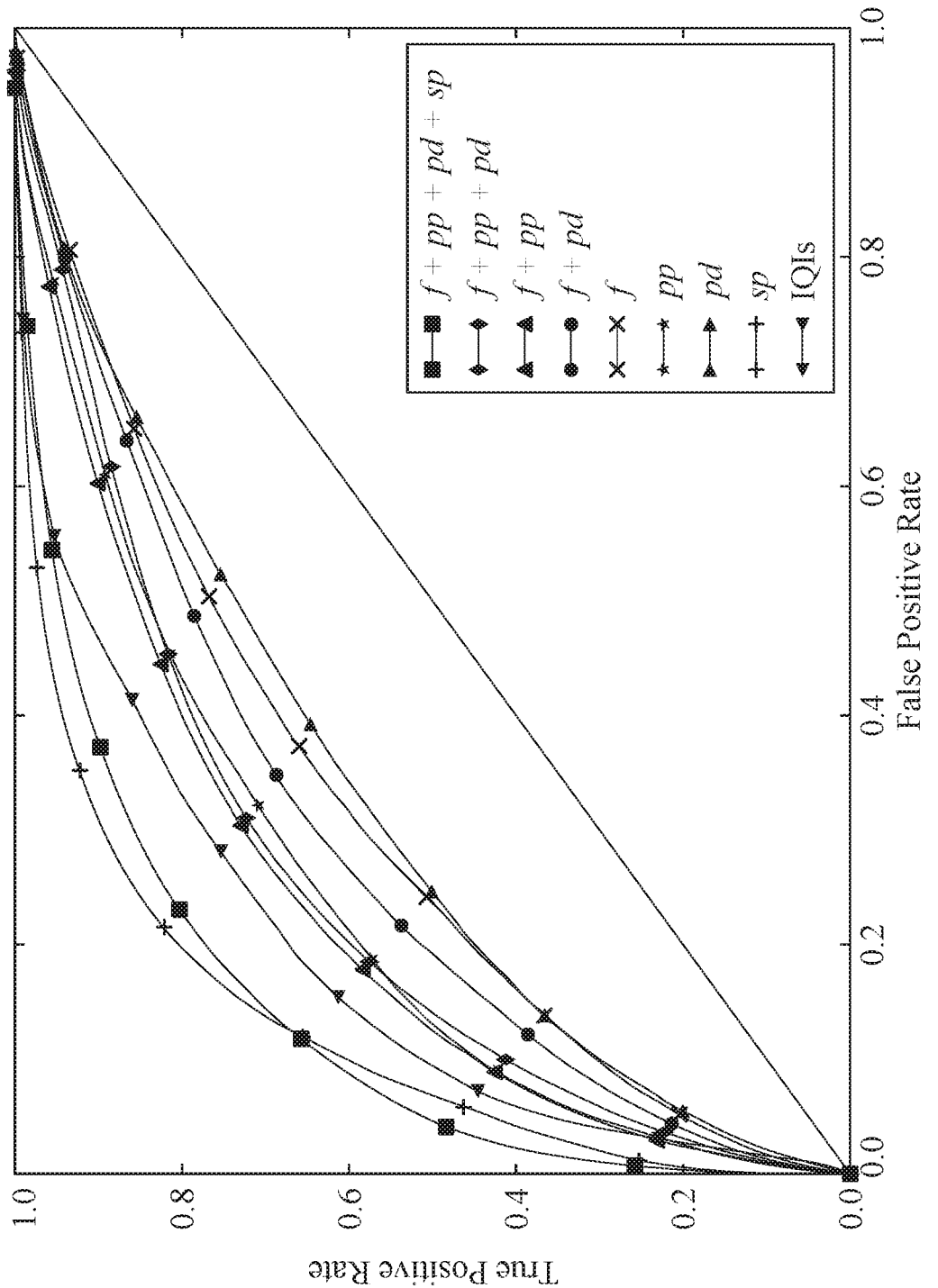
FIG. 17 illustrates the Receiver Operating Characteristic (ROC) curves for the binary classification task using the proposed feature groups and the IQIs in accordance with an embodiment of the present invention.

Receiver Operating Characteristic (ROC) curves for the binary classification task using the proposed feature groups and the IQIs are shown in FIG. 17 in accordance with an embodiment of the present invention. The areas under the ROC curves are provided in Table V of FIG. 18 in accordance with an embodiment of the present invention. The proposed NSS-based feature groups, except for sp and combinations of sp, achieved worse performance as compared to the IQIs for this discrimination task. Specifically, the sp performed significantly above the IQIs providing the largest discrimination capability both alone and when combined with f, pp, and pd feature groups.

The steerable pyramid transform provides directionality of distortion which provides a great deal of information especially for the provided halo effect patches. Most objects in a scene are not circularly symmetric, thus their associated halo effect will not be symmetric. The steerable pyramid provides smooth directional features which are highly useful for the task.

A discussion Concerning the Targeting Task Performance (TTP) of firefighters and hazards is now deemed appropriate.

Researchers at NIST conducted a study involving firefighters whose task was two-fold. First, given an LWIR image, the expert determined whether a hazard was present. Second, if a hazard was present, the expert was asked to identify the location of the hazard. This study was broken up into two phases. The phase 1 study used 4,500 images. These images were created by degrading 180 pristine images. Five different levels of degradation corresponding to each IQI were generated and 25 sets of the four IQIs were used (for a total of 100 unique arrangements of the five values of each of the four IQIs). These 25 sets were deemed sufficient to represent the defined IQI space ($5^4$). Phase 2 used 55 sets of the four IQIs (for a total of 9,900 images). The larger number of sets served also to extend the range of IQIs to include more extreme values. Note that the IQIs in this study were used as distortion-generating settings thereby allowing for direct measurement of distortion with TTP.

In the study, the experts were given a stimulus image, and tasked to either identify the location of the environmental hazard by clicking on it, or by indicating that there is no distortion. To better isolate detectability, the dataset was converted into patches centered about the hazards. Images with no hazards were discarded. Next, only the scores of observers that attempted to identify the location of the present environmental hazard were kept. Hits and misses were measured depending on whether the cursor click was near the hazard. The probability of hit was computed over all observers. By modifying the dataset in this way, SRCC and LCC correlations between target quality and target detectability could be more directly measured.

Using the probability of hit, the NSS quality features, and the IQIs, a SVR was used to estimate TTP. As a way of comparing the features, the median SRCC and LCC coefficients are reported in Table VI of FIG. 19 from 1,000 iterations in accordance with an embodiment of the present invention. Combinations of features provide the best estimators of TTP, with the combination of all natural features providing the highest correlations for TTP. Note that the IQIs in Table VI of FIG. 19 use the 13 features, while the degradations to the images provided in the study made modifications based on the original 4 parameters.

Concerning the blind image quality assessment of LWIR Images, a lengthy and sizeable human study was conducted, the results of which were used to assess how well NSS-based blind image quality prediction models designed for LWIR images correlate with subjective quality scores. A collection of 28 indoor and outdoor images were selected from the NIST and KASER databases as "pristine" images. Artificial blur and noise distortions were applied to the pristine images. Three levels of blur, three levels of noise, and combinations of blur and noise produced a total of 252 distorted images.

Figures 20, 21:
FIG. 20 depicts subjects that were presented with a single stimulus image for 10 seconds in accordance with an embodiment of the present invention.
FIG. 21 illustrates presenting a continuous sliding quality bar with the labels "Bad," "Poor," "Fair," "Good," or "Excellent" at the end of the 10 seconds in accordance with an embodiment of the present invention.

The subject test procedure was written using Matlab and the PsychToolbox. Each subject was first presented with a training session in which 10 images were shown before the main testing session, to give them an understanding of how to score images. Two testing sessions were performed with each session containing a unique set of 126 images. Subjects were presented with a single stimulus image for 10 seconds as depicted in FIG. 20 in accordance with an embodiment of the present invention. At the end of the 10 seconds, a continuous sliding quality bar with the labels "Bad," "Poor," "Fair," "Good," or "Excellent" was presented, as shown in FIG. 21 in accordance with an embodiment of the present invention.

Each image was scored by 24 subjects with each score discretized to integers on [0, 100]. In order to account for differences in image content, the Difference Mean Opinion Scores (DMOS) was computed. Let sijk be the opinion score given by subject i, on image j during session k={1, 2}. Then the difference score for subject i, image j, and session k is given by $$d_{ijk} = s_{ij_{ref}k} - s_{ijk}, s_{ij_{ref}k} \neq s_{ijk},$$

where $sij_{ref}k$ is the score given to the (hidden) pristine image corresponding to the distorted one. The difference scores from each session were then converted to Z-scores:

$$z_{ijk} = \frac{d_{ijk} - \mu_{ik}}{\sigma_{ik}}$$

where $$\mu_{ik} = \frac{1}{N_{ik}} \sum_{j=1}^{N_{ik}} d_{ijk}$$

and $$\sigma_{ik} = \sqrt{\frac{1}{N_{ik} - 1} \sum_{j=1}^{N_{ik}} (d_{ijk} - \mu_{ik})^2}$$

and where $N_{ik}$ is the number of test images seen by subject i in session k.

The subject rejection procedure specified in the ITU-R BT 500.11 recommendation is useful for discarding scores from unreliable subjects. Z-scores are considered normally distributed if their kurtosis falls between the values of 2 and 4. The recommendation is to reject if more than 5 percent of the Z-scores lie outside two standard deviations of the mean. Using this procedure, all except one subject was found to be acceptable. The one outlier chose the same value of 50 for all images. Thus only one subject was rejected.

After the subject rejection procedure, the values of $z_{ijk}$ fell into a range on [−3, 3]. A linear rescaling was used to remap the scores onto [0, 100] using $$z'_{ij} = \frac{100(z_{ij} + 3)}{6}$$

Finally the Difference Mean Opinion Score (DMOS) of each image was computed as the mean of the M=24 rescaled Z-scores:

$$DMSO_j = \frac{1}{M} \sum_{i=1}^{M} z'_{ij}.$$

Figures 22, 23:
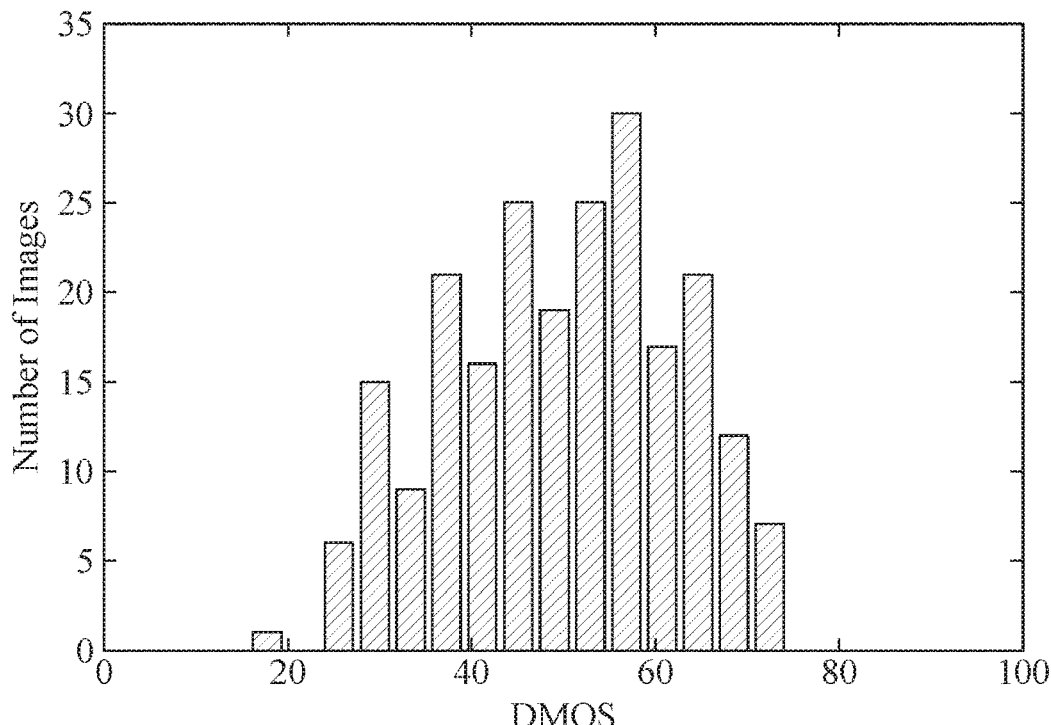
FIG. 22 is a plot of the histogram of the DMOS scores in accordance with an embodiment of the present invention.
FIG. 23 is a table, Table VII, which shows the Spearman's Rank Correlation Coefficient (SRCC) and (Pearson's) linear correlation coefficient (LCC) between the subjective scores and the model predictions for NR feature groups in accordance with an embodiment of the present invention.

A plot of the histogram of the DMOS scores is shown in FIG. 22 in accordance with an embodiment of the present invention, indicating a reasonably broad distribution of the DMOS scores.

Table VII of FIG. 23 shows the Spearman's Rank Correlation Coefficient (SRCC) and (Pearson's) linear correlation coefficient (LCC) between the subjective scores and the model predictions for NR feature groups in accordance with an embodiment of the present invention. The results were computed using 1,000 iterations of randomly sampled training and testing groups. As in the previous sections, 80 percent of the data is used for training and the remainder for testing. Care was taken to not overlap training and testing on the same content in any iteration since such an overlap could inflate performance results by training on the content rather than distortion. An SVR was used to fit the NSS feature parameters to the DMOS scores.

It has been observed that the steerable pyramid group features provide the highest correlation with the human subjective scores which is only a slight improvement over the BRISQUE model, f+pp. The combinations of feature groups perform worse compared to the individual groups indicating possible overfitting with the training set. For these blur and AWN distortions, the directional feature groups provide the highest correlation with DMOS scores with the IQIs and NU distortion models providing comparatively low correlation. The proposed models provide a great deal of predictive capability with human opinion scores, but there appears to be additional variation not accounted for in the models proposed herein.

Figure 24:
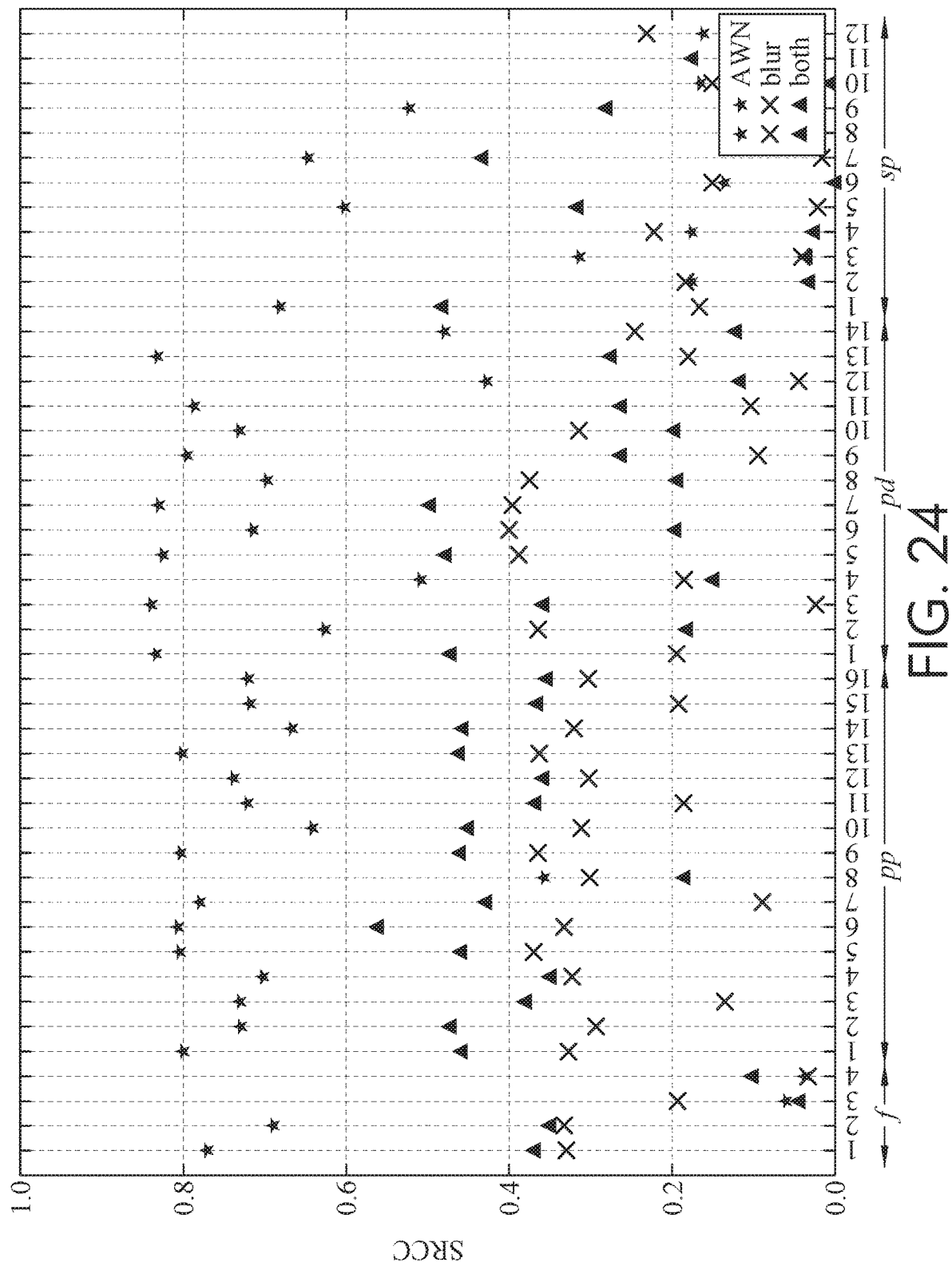
FIG. 24 depicts the SRCC of each feature's value with the human opinion scores in accordance with an embodiment of the present invention.

FIG. 24 depicts the SRCC of each feature's value with the human opinion scores in accordance with an embodiment of the preset invention. The highest individual feature correlations occur in the paired Log-derivative feature group, pd, but Table VII of FIG. 23 indicates that individual feature correlations are not as powerful as groups of features for predicting quality scores.

In fact, the sp feature group provides the highest correlations with DMOS scores when used together in a regression, but individually, they appear to make poor predictors.

Local distortion maps can be useful for identifying local distorted regions, which can occur as particular local distortions, such as hotspots or halos, or they may arise from some unknown (combination of) distortions. It is possible to automatically find local distorted regions of LWIR images using NSS-based features.

A distortion map can be generated using a sliding window to capture patches from the image being analyzed. In one embodiment, a 96×96 sliding square window was scanned along the image in 12 pixel step increments (strides). Thus each captured patch overlapped with 87.5 percent of the last patch in sequence. Each patch was classified using multiple probabilistic SVCs, one per distortion type, to determine the likelihood that the patch belonged to that distorted class or to the natural image class. The probabilities of distortion were gathered and mapped into an image which highlights distorted areas. Example distortion maps are shown in FIG. 25 in accordance with an embodiment of the present invention. Some distortion maps, such as JPEG, appear to provide false positives, but this is an artifact of relative probability within the map and full-scale contrast stretching. This technique could be useful for both identifying likely distortions, and localizing them in an LWIR image.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for measuring non-uniformity noise produced in infrared images or videos, the method comprising:
   capturing infrared images or videos;
   utilizing, by a processor, a model of scene statistics to measure said non-uniformity noise in said captured infrared images or videos by exploiting exhibited characteristics for non-uniformity noise in said captured infrared images or videos; and
   generating a number signifying a magnitude of non-uniformity for each infrared image or video frame.

2. The method as recited in claim 1 further comprising:
   accumulating said generated numbers to provide a summary of said non-uniformity in an entire infrared video.

3. The method as recited in claim 1, wherein said exhibited characteristics comprise a shape and a variance.

4. The method as recited in claim 1, wherein said scene statistics are natural scene statistics.

5. A computer program product for measuring non-uniformity noise produced in infrared images or videos, the computer program product comprising a computer readable storage medium having program code embodied therewith, the program code comprising the programming instructions for:
   capturing infrared images or videos;
   utilizing a model of scene statistics to measure said non-uniformity noise in said captured infrared images or videos by exploiting exhibited characteristics for non-uniformity noise in said captured infrared images or videos; and
   generating a number signifying a magnitude of non-uniformity for each infrared image or video frame.

6. The computer program product as recited in claim 5, wherein the program code further comprises the programming instructions for:
   accumulating said generated numbers to provide a summary of said non-uniformity in an entire infrared video.

7. The computer program product as recited in claim 5, wherein said exhibited characteristics comprise a shape and a variance.

8. The computer program product as recited in claim 5, wherein said scene statistics are natural scene statistics.

9. A system, comprising:
   a memory unit for storing a computer program for measuring non-uniformity noise produced in infrared images or videos; and
   a processor coupled to the memory unit, wherein the processor is configured to execute the program instructions of the computer program comprising:
      capturing infrared images or videos;
      utilizing a model of scene statistics to measure said non-uniformity noise in said captured infrared images or videos by exploiting exhibited characteristics for non-uniformity noise in said captured infrared images or videos; and
      generating a number signifying a magnitude of non-uniformity for each infrared image or video frame.

10. The system as recited in claim 9, wherein the program instructions of the computer program further comprise:

accumulating said generated numbers to provide a summary of said non-uniformity in an entire infrared video.

11. The system as recited in claim 9, wherein said exhibited characteristics comprise a shape and a variance.

12. The system as recited in claim 9, wherein said scene statistics are natural scene statistics.

13. A method for measuring non-uniformity noise produced in images or videos, the method comprising:
capturing images or videos;
utilizing, by a processor, a model of scene statistics to measure said non-uniformity noise in said captured images or videos by exploiting exhibited characteristics for non-uniformity noise in said captured images or videos; and
generating a number signifying a magnitude of non-uniformity for each image or video frame.

14. The method as recited in claim 13 further comprising:
accumulating said generated numbers to provide a summary of said non-uniformity in an entire video.

15. The method as recited in claim 13, wherein said exhibited characteristics comprise a shape and a variance.

16. The method as recited in claim 13, wherein said scene statistics are natural scene statistics.

17. The method as recited in claim 13, wherein said captured images or videos are one of the following: X-ray images or videos, magnetic resonance imaging images or videos, millimeter wave images or videos and visible light images or videos.

18. A computer program product for measuring non-uniformity noise produced in images or videos, the computer program product comprising a computer readable storage medium having program code embodied therewith, the program code comprising the programming instructions for:
capturing images or videos;
utilizing a model of scene statistics to measure said non-uniformity noise in said captured images or videos by exploiting exhibited characteristics for non-uniformity noise in said captured images or videos; and
generating a number signifying a magnitude of non-uniformity for each image or video frame.

19. The computer program product as recited in claim 18, wherein the program code further comprises the programming instructions for:
accumulating said generated numbers to provide a summary of said non-uniformity in an entire video.

20. The computer program product as recited in claim 18, wherein said exhibited characteristics comprise a shape and a variance.

21. The computer program product as recited in claim 18, wherein said scene statistics are natural scene statistics.

22. The computer program product as recited in claim 18, wherein said captured images or videos are one of the following: X-ray images or videos, magnetic resonance imaging images or videos, millimeter wave images or videos and visible light images or videos.

23. A system, comprising:
a memory unit for storing a computer program for measuring non-uniformity noise produced in images or videos; and
a processor coupled to the memory unit, wherein the processor is configured to execute the program instructions of the computer program comprising:
capturing images or videos;
utilizing a model of scene statistics to measure said non-uniformity noise in said captured images or videos by exploiting exhibited characteristics for non-uniformity noise in said captured images or videos; and
generating a number signifying a magnitude of non-uniformity for each image or video frame.

24. The system as recited in claim 23, wherein the program instructions of the computer program further comprise:
accumulating said generated numbers to provide a summary of said non-uniformity in an entire video.

25. The system as recited in claim 23, wherein said exhibited characteristics comprise a shape and a variance.

26. The system as recited in claim 23, wherein said scene statistics are natural scene statistics.

27. The system as recited in claim 23, wherein said captured images or videos are one of the following: X-ray images or videos, magnetic resonance imaging images or videos, millimeter wave images or videos and visible light images or videos.

* * * * *